United States Patent
Watanabe et al.

(10) Patent No.: US 9,992,728 B2
(45) Date of Patent: Jun. 5, 2018

(54) INFORMATION PROCESSING DEVICE AND INFORMATION PROCESSING METHOD

(71) Applicant: SONY CORPORATION, Tokyo (JP)

(72) Inventors: Nobuhiko Watanabe, Kanagawa (JP); Kazuyuki Sakoda, Chiba (JP); Chihiro Fujita, Kanagawa (JP); Yoshihiko Ikenaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 14/914,641

(22) PCT Filed: Jul. 3, 2014

(86) PCT No.: PCT/JP2014/067741
§ 371 (c)(1),
(2) Date: Feb. 26, 2016

(87) PCT Pub. No.: WO2015/029593
PCT Pub. Date: Mar. 5, 2015

(65) Prior Publication Data
US 2016/0269975 A1 Sep. 15, 2016

(30) Foreign Application Priority Data

Aug. 27, 2013 (JP) .................................. 2013-175287

(51) Int. Cl.
*H04W 40/30* (2009.01)
*H04W 40/24* (2009.01)
*H04L 12/26* (2006.01)
*H04W 72/10* (2009.01)
*H04W 40/12* (2009.01)
*H04L 12/721* (2013.01)
(Continued)

(52) U.S. Cl.
CPC ............ *H04W 40/30* (2013.01); *H04L 43/16* (2013.01); *H04L 45/123* (2013.01); *H04L 47/29* (2013.01); *H04W 40/026* (2013.01); *H04W 40/125* (2013.01); *H04W 40/248* (2013.01); *H04W 72/10* (2013.01)

(58) Field of Classification Search
CPC . H04W 40/30; H04W 40/125; H04W 40/248; H04W 72/10; H04L 43/16; H04L 45/123; H04L 47/29
See application file for complete search history.

(56) References Cited

FOREIGN PATENT DOCUMENTS

| JP | 2006-081163 A | | 3/2006 | |
|---|---|---|---|---|
| JP | 2008-135914 | * | 6/2008 | ............. H04L 12/58 |

(Continued)

*Primary Examiner* — Jae Y Lee
(74) *Attorney, Agent, or Firm* — Oblon, McClelland, Maier & Neustadt, L.L.P.

(57) ABSTRACT

Generation and management of a communication path between a plurality of information processing devices are properly performed.
An information processing device is an information processing device equipped with a communication unit and a control unit. The communication unit performs exchange of a signal for generation or updating of a multi-hop communication path using wireless communication with another information processing device. In addition, the control unit performs control to change a metric value included in the signal for generation or updating of the multi-hop communication path based on a state of the information processing device.

19 Claims, 37 Drawing Sheets

(51) Int. Cl.
  *H04L 12/801* (2013.01)
  *H04W 40/02* (2009.01)

(56) References Cited

FOREIGN PATENT DOCUMENTS

| | | |
|---|---|---|
| JP | 2008-135914 A | 6/2008 |
| JP | 2009-239385 A | 10/2009 |
| JP | 2013-065957 A | 4/2013 |
| JP | 2011-501921 A | 6/2013 |
| JP | 2013-121011 A | 6/2013 |

* cited by examiner

FIG. 3
MANAGEMENT PACKET
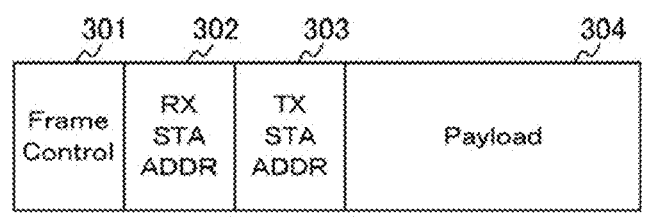
a
DATA PACKET
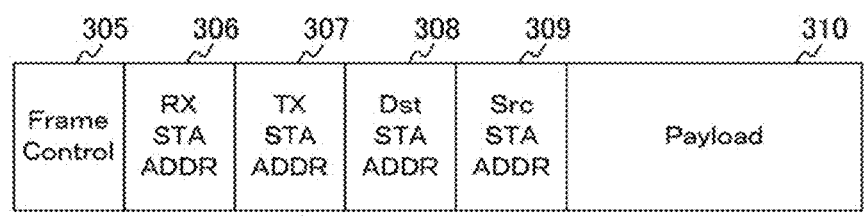
b

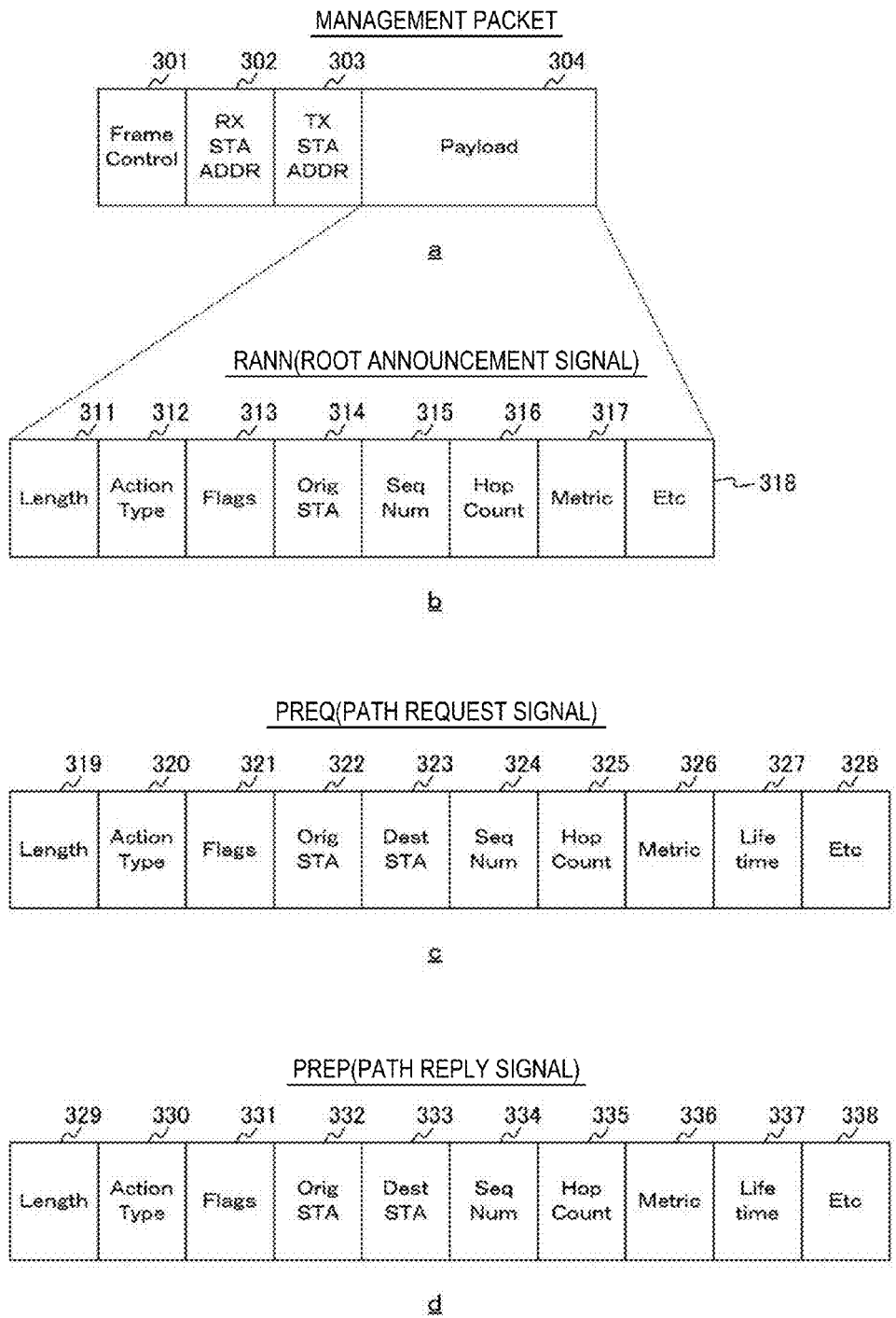

FIG. 5

RANN(ROOT ANNOUNCEMENT SIGNAL)

| | | |
|---|---|---|
| 311 | Length | INDICATES LENGTH OF PAYLOAD |
| 312 | Action Type | IDENTIFIER INDICATING THAT THIS SIGNAL IS RANN IS STORED. RECEIVER CAN RECOGNIZE THAT THIS SIGNAL IS RANN REFERRING TO THIS FIELD. |
| 313 | Flags | ATTRIBUTE OF TRANSMISSION SOURCE STATION OF RANN IS STORED. |
| 314 | OrigSTA | IDENTIFIER INDICATING WHICH INFORMATION PROCESSING DEVICE IS TRANSMISSION SOURCE STATION OF RANN IS STORED. ALTHOUGH RANN IS TRANSFERRED TO REMOTE SPOT IN MULTI-HOP RELAY, IT IS POSSIBLE TO RECOGNIZE WHICH INFORMATION PROCESSING DEVICE IS TRANSMISSION SOURCE STATION. |
| 315 | SeqNum | IDENTIFIER FOR IDENTIFYING RANN IS STORED. ALTHOUGH RANN IS TRANSMITTED FROM TRANSMISSION SOURCE STATION, EACH RANN CAN BE IDENTIFIED AS SeqNum IS INCREMENTED IN EACH TRANSMISSION. |
| 316 | HopCount | NUMERICAL VALUE INDICATING NUMBER OF HOPS NECESSARY FOR RANN TO BE DELIVERED FROM TRANSMISSION SOURCE STATION IS STORED. ALTHOUGH INFORMATION PROCESSING DEVICE WHICH HAS RECEIVED RANN TRANSFERS RANN IN MULTI-HOP, VALUE INCREMENTED IN EACH TRANSFER PROCESS IS STORED. |
| 317 | Metric | VALUE INDICATING METRIC VALUE THAT WAS NECESSARY FOR ARRIVAL OF RANN FROM TRANSMISSION SOURCE STATION IS STORED. ALTHOUGH INFORMATION PROCESSING DEVICE WHICH HAS RECEIVED RANN TRANSFERS RANN IN MULTI-HOP, VALUE OBTAINED BY CUMULATIVE ADDITION OF LINK METRIC VALUE IN EACH TRANSFER PROCESS IS STORED. |
| 318 | Etc | OTHER MANAGEMENT INFORMATION |

FIG. 6

PREQ(PATH REQUEST SIGNAL)

| | | |
|---|---|---|
| 319 | Length | INDICATES LENGTH OF PAYLOAD |
| 320 | Action Type | IDENTIFIER INDICATING THAT THIS SIGNAL IS PREQ IS STORED. RECEIVER CAN RECOGNIZE THAT THIS SIGNAL IS PREQ REFERRING TO THIS FIELD. |
| 321 | Flags | INFORMATION INDICATING WHETHER PREQ HAS BEEN TRIGGERED BY RECEPTION OF RANN AND TRANSMITTED (WHETHER IT IS PROACTIVE MESH PATH GENERATION PROCESS) IS STORED. |
| 322 | OrigSTA | IDENTIFIER INDICATING INFORMATION PROCESSING DEVICE SERVING AS REQUESTING SOURCE (TRANSMISSION SOURCE STATION) OF MESH PATH GENERATION IS STORED. ALTHOUGH PREQ IS TRANSFERRED TO REMOTE SPOT IN MULTI-HOP RELAY, IT IS POSSIBLE TO RECOGNIZE WHICH INFORMATION PROCESSING DEVICE IS TRANSMISSION SOURCE STATION. |
| 323 | DestSTA | IDENTIFIER INDICATING INFORMATION PROCESSING DEVICE SERVING AS REQUEST DESTINATION (DESTINATION STATION) OF MESH PATH GENERATION IS STORED. UPON RECEIVING PREQ, INFORMATION PROCESSING DEVICE SPECIFIED BY THIS IDENTIFIER REPLIES WITH PREP IN RESPONSE THERETO. ACCORDINGLY, BI-DIRECTIONAL MESH PATH IS GENERATED. |
| 324 | SeqNum | IDENTIFIER FOR IDENTIFYING PREQ IS STORED. ALTHOUGH PREQ IS TRANSMITTED FROM TRANSMISSION SOURCE STATION PLURALITY OF TIMES, EACH PREQ CAN BE IDENTIFIED AS SeqNum HAS INCREMENTED VALUE IN EACH TRANSMISSION. |
| 325 | HopCount | NUMERICAL VALUE INDICATING NUMBER OF HOPS NECESSARY FOR PREQ TO BE DELIVERED FROM TRANSMISSION SOURCE STATION IS STORED. ALTHOUGH INFORMATION PROCESSING DEVICE WHICH HAS RECEIVED PREQ TRANSFERS PREQ IN MULTI-HOP, INCREMENTED VALUE IN EACH TRANSFER PROCESS IS STORED. |
| 326 | Metric | VALUE INDICATING METRIC VALUE THAT WAS NECESSARY FOR ARRIVAL OF PREQ FROM TRANSMISSION SOURCE STATION IS STORED. ALTHOUGH INFORMATION PROCESSING DEVICE WHICH HAS RECEIVED PREQ TRANSFERS PREQ IN MULTI-HOP, VALUE OBTAINED BY CUMULATIVE ADDITION OF LINK METRIC VALUE IN EACH TRANSFER PROCESS IS STORED. |
| 327 | Lifetime | INFORMATION FOR DESIGNATING LIFETIME OF MESH PATH IS STORED. |
| 328 | Etc | OTHER MANAGEMENT INFORMATION |

FIG. 7

PREP(PATH REPLY SIGNAL)

| | | |
|---|---|---|
| 329 | Length | INDICATES LENGTH OF PAYLOAD |
| 330 | Action Type | IDENTIFIER INDICATING THAT THIS SIGNAL IS PREP IS STORED. RECEIVER CAN RECOGNIZE THAT THIS SIGNAL IS PREP REFERRING TO THIS FIELD. |
| 331 | Flags | ATTRIBUTE OF TRANSMISSION SOURCE OF PREP IS STORED. |
| 332 | OrigSTA | IDENTIFIER INDICATING INFORMATION PROCESSING DEVICE SERVING AS REQUESTING SOURCE OF MESH PATH GENERATION IS STORED.<br>IDENTIFIER OF INFORMATION PROCESSING DEVICE STORED IN OrigSTA OF PREQ IS TRANSCRIBED. |
| 333 | DestSTA | IDENTIFIER INDICATING INFORMATION PROCESSING DEVICE SERVING AS REQUEST DESTINATION OF MESH PATH GENERATION IS STORED.<br>IDENTIFIER OF INFORMATION PROCESSING DEVICE STORED IN DestSTA OF PREQ IS TRANSCRIBED. |
| 334 | SeqNum | IDENTIFIER FOR IDENTIFYING PREP IS STORED.<br>ALTHOUGH PREP IS TRANSMITTED FROM TRANSMISSION SOURCE STATION PLURALITY OF TIMES, EACH PREP CAN BE IDENTIFIED AS SeqNum IS INCREMENTED IN EACH TRANSMISSION. |
| 335 | HopCount | NUMERICAL VALUE INDICATING NUMBER OF HOPS NECESSARY FOR PREP TO BE DELIVERED FROM TRANSMISSION SOURCE STATION IS STORED. ALTHOUGH INFORMATION PROCESSING DEVICE WHICH HAS RECEIVED PREP TRANSFERS PREP IN MULTI-HOP, VALUE INCREMENTED IN EACH TRANSFER PROCESS IS STORED. |
| 336 | Metric | VALUE INDICATING METRIC VALUE THAT WAS NECESSARY FOR ARRIVAL OF PREP FROM TRANSMISSION SOURCE STATION IS STORED. ALTHOUGH INFORMATION PROCESSING DEVICE WHICH HAS RECEIVED PREP TRANSFERS PREP IN MULTI-HOP, VALUE OBTAINED BY CUMULATIVE ADDITION OF LINK METRIC VALUE IN EACH TRANSFER PROCESS IS STORED. |
| 337 | Lifetime | INFORMATION FOR DESIGNATING LIFETIME OF MESH PATH IS STORED. |
| 338 | Etc | OTHER MANAGEMENT INFORMATION |

FIG. 8

MESH PATH TABLE 340

| | Dest | XXX |
|---|---|---|
| a | NextHop | YYY |
| b | Metric | 999 |
| c | SeqNum | 111 |
| d | ExpTime | 222 |

341 — Dest row
342 — a
343 — b
344 — c
345 — d a

CONTENT EXAMPLE OF MESH PATH TABLE

| Index (346) | DATA NAME (347) | MEANING (348) |
|---|---|---|
| a (342) | NextHop | IDENTIFIER OF INFORMATION PROCESSING DEVICE FOR SPECIFYING INFORMATION PROCESSING DEVICE TO WHICH DATA IS TO BE TRANSFERRED NEXT IN ORDER TO DELIVER DATA TO DESTINATION STATION |
| b (343) | Metric | PATH METRIC VALUE FROM SELF-STATION TO DESTINATION STATION OF MESH PATH |
| c (344) | SeqNum | VALUE OF SeqNum OF PREQ OR PREP USED IN GENERATION OF MESH PATH |
| d (345) | ExpTime | EXPIRATION TIME OF MESH PATH DECIDED BASED ON Lifetime OF PREQ OR PREP USED IN CREATION OF MESH PATH | b

FIG. 9
GENERATION EXAMPLE OF MESH PATH
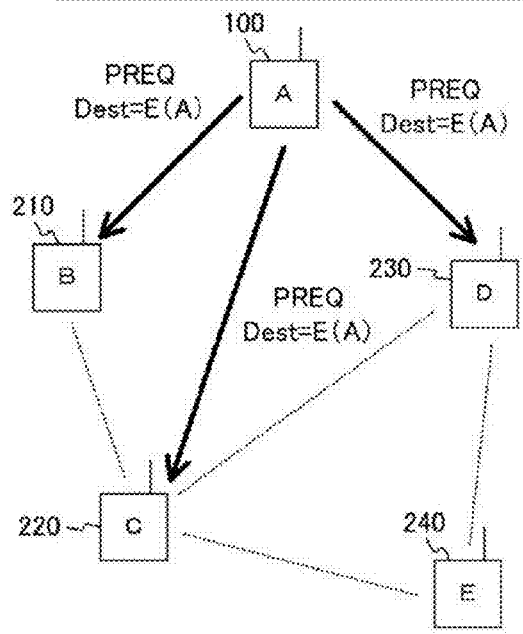
a
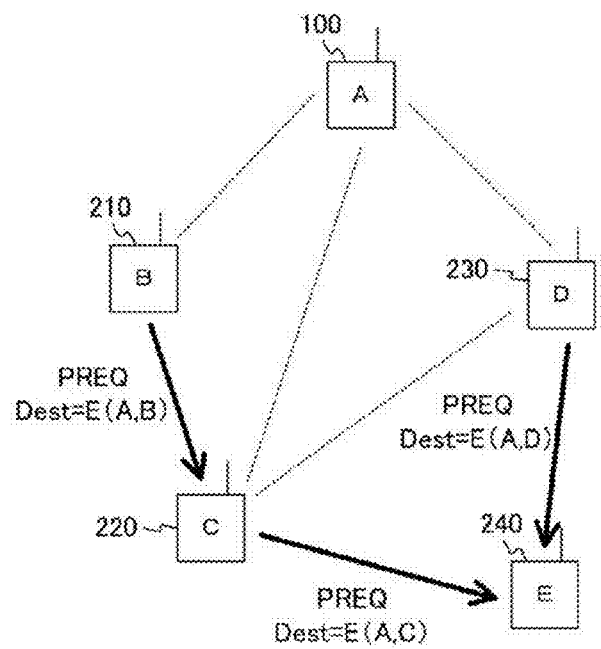
b

FIG. 10
GENERATION EXAMPLE OF MESH PATH
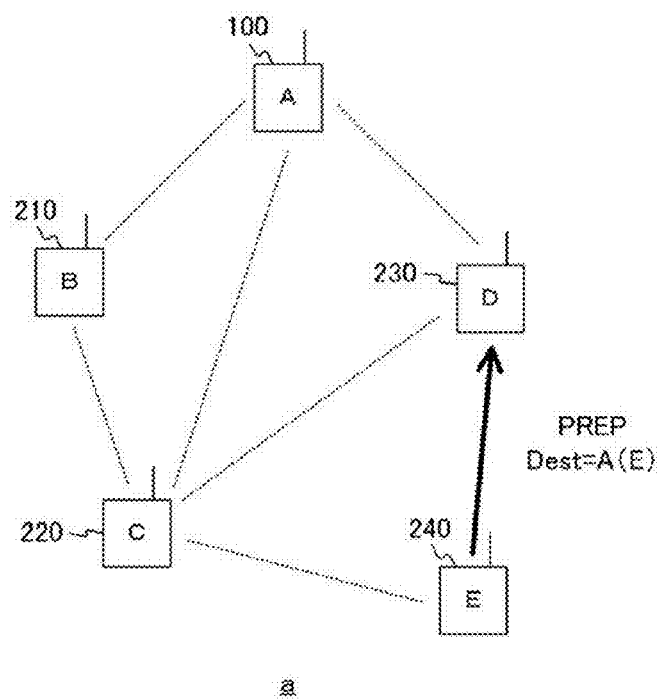
a
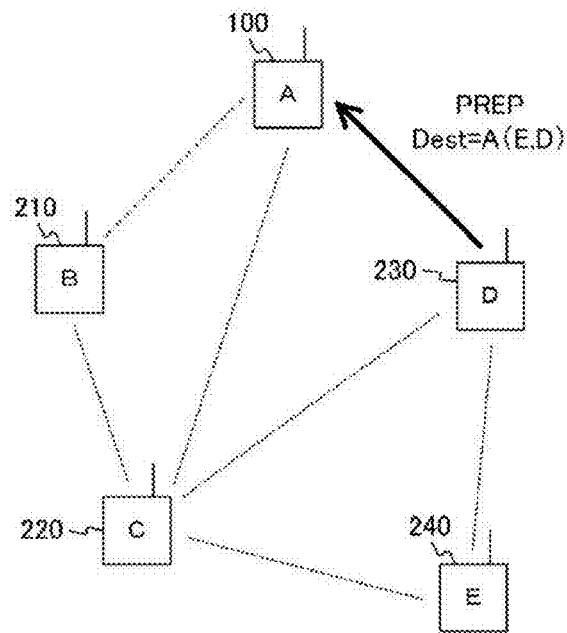
b

FIG. 11

MESH PATH TABLE 350

| Dest | XXX |
|---|---|---|
| a | NextHop | YYY |
| b | Metric | 999 |
| c | SeqNum | 111 |
| d | ExpTime | 222 |
| e | LifeTime | 333 |
| f | HopCount | 4 | a

CONTENT EXAMPLE OF MESH PATH TABLE

| Index | DATA NAME | MEANING |
|---|---|---|
| a | NextHop | IDENTIFIER OF INFORMATION PROCESSING DEVICE FOR SPECIFYING INFORMATION PROCESSING DEVICE TO WHICH DATA IS TO BE TRANSFERRED NEXT IN ORDER TO DELIVER DATA TO DESTINATION STATION |
| b | Metric | PATH METRIC VALUE FROM SELF-STATION TO DESTINATION STATION OF MESH PATH |
| c | SeqNum | VALUE OF SeqNum OF PREQ OR PREP USED IN GENERATION OF MESH PATH |
| d | ExpTime | UPDATING EXPIRATION TIME OF MESH PATH DECIDED BASED ON Lifetime OF PREQ OR PREP USED IN CREATION OF MESH PATH |
| e | LifeTime | EXPIRATION TIME OF MESH PATH |
| f | HopCount | NUMERICAL VALUE INDICATING NUMBER OF HOPS NECESSARY FOR DELIVERING PREP FROM TRANSMISSION SOURCE STATION | b

FIG. 12

STORAGE EXAMPLE OF MESH PATH TABLE OF TRANSMISSION SOURCE STATION OF PREQ

| | | | |
|---|---|---|---|
| 341 | | Dest | IDENTIFIER OF DestSTA FIELD OF PREQ |
| 342 | a | NextHop | UNDEFINED |
| 343 | b | Metric | UNDEFINED |
| 344 | c | SeqNum | VALUE OF PREVIOUS SeqNum FIELD+1 |
| 345 | d | ExpTime | CURRENT TIME+T1 (Lifetime OF PREQ)−T2 |
| 351 | e | LifeTime | CURRENT TIME+T1 (Lifetime OF PREQ) |
| 352 | f | HopCount | UNDEFINED | a

STORAGE EXAMPLE OF MESH PATH TABLE OF RELAY STATION OF PREQ

| | | | |
|---|---|---|---|
| 341 | | Dest | IDENTIFIER OF OrigSTA FIELD OF PREQ |
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)−T2 |
| 351 | e | LifeTime | RECEPTION TIME OF PREQ+T1 (Lifetime OF PREQ) |
| 352 | f | HopCount | HopCount OF PREQ | b

STORAGE EXAMPLE OF MESH PATH TABLE OF DESTINATION STATION OF PREQ

| | | | |
|---|---|---|---|
| 341 | | Dest | IDENTIFIER OF OrigSTA FIELD OF PREQ |
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)−T2 |
| 351 | e | LifeTime | RECEPTION TIME OF PREQ+T1 (Lifetime OF PREQ) |
| 352 | f | HopCount | HopCount OF PREQ | c

FIG. 13

STORAGE EXAMPLE OF MESH PATH TABLE OF TRANSMISSION SOURCE STATION OF PREQ

| 341 | | Dest | IDENTIFIER OF DestSTA FIELD OF PREQ |
|---|---|---|---|
| 342 | a | NextHop | UNDEFINED |
| 343 | b | Metric | UNDEFINED |
| 344 | c | SeqNum | VALUE OF PREVIOUS SeqNum FIELD+1 |
| 345 | d | ExpTime | CURRENT TIME+T1 (Lifetime OF PREQ)-T2 |
| 351 | e | LifeTime | CURRENT TIME+T1 (Lifetime OF PREQ) |
| 352 | f | HopCount | UNDEFINED | a

STORAGE EXAMPLE OF MESH PATH TABLE OF RELAY STATION OF PREQ

| 341 | | Dest | IDENTIFIER OF OrigSTA FIELD OF PREQ |
|---|---|---|---|
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)-T5 |
| 351 | e | LifeTime | RECEPTION TIME OF PREQ+T1 (Lifetime OF PREQ) |
| 352 | f | HopCount | HopCount OF PREQ | b

STORAGE EXAMPLE OF MESH PATH TABLE OF DESTINATION STATION OF PREQ

| 341 | | Dest | IDENTIFIER OF OrigSTA FIELD OF PREQ |
|---|---|---|---|
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)-T3 |
| 351 | e | LifeTime | RECEPTION TIME OF PREQ+T1 (Lifetime OF PREQ) |
| 352 | f | HopCount | HopCount OF PREQ | c

FIG. 14

STORAGE EXAMPLE OF MESH PATH TABLE OF RELAY STATION OF PREP

| | | | |
|---|---|---|---|
| 341 | | Dest | IDENTIFIER OF DestSTA FIELD OF PREP |
| 342 | a | NextHop | IDENTIFIER OF TX STA ADDR FIELD OF PREPQ |
| 343 | b | Metric | Metric OF PREP+METRIC VALUE OF LINK BETWEEN INFORMATION PROCESSING DEVICE OF TX STA ADDR OF PREP AND SELF-STATION |
| 344 | c | SeqNum | VALUE OF SeqNum FIELD OF PREP |
| 345 | d | ExpTime | RECEPTION TIME OF PREP+T1 (Lifetime OF PREP)-T4 |
| 351 | e | LifeTime | RECEPTION TIME OF PREP+T1 (Lifetime OF PREP) |
| 352 | f | HopCount | HopCount OF PREP |

FIG. 15

STORAGE EXAMPLE OF MESH PATH TABLE OF TRANSMISSION SOURCE STATION OF PREQ

| | | | |
|---|---|---|---|
| 341 | | Dest | IDENTIFIER OF DestSTA FIELD OF PREQ |
| 342 | a | NextHop | UNDEFINED |
| 343 | b | Metric | UNDEFINED |
| 344 | c | SeqNum | VALUE OF PREVIOUS SeqNum FIELD+1 |
| 345 | d | ExpTime | CURRENT TIME+T6-T2 |
| 351 | e | LifeTime | CURRENT TIME+T6 |
| 352 | f | HopCount | UNDEFINED | a

STORAGE EXAMPLE OF MESH PATH TABLE OF RELAY STATION OF PREQ

| | | | |
|---|---|---|---|
| 341 | | Dest | IDENTIFIER OF OrigSTA FIELD OF PREQ |
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)-T5 |
| 351 | e | LifeTime | RECEPTION TIME OF PREQ+T1 (Lifetime OF PREQ) |
| 352 | f | HopCount | HopCount OF PREQ | b

STORAGE EXAMPLE OF MESH PATH TABLE OF DESTINATION STATION OF PREQ

| | | | |
|---|---|---|---|
| 341 | | Dest | IDENTIFIER OF OrigSTA FIELD OF PREQ |
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)-T3 |
| 351 | e | LifeTime | RECEPTION TIME OF PREQ+T1 (Lifetime OF PREQ) |
| 352 | f | HopCount | HopCount OF PREQ | c

FIG. 16

STORAGE EXAMPLE OF MESH PATH TABLE OF RELAY STATION OF PREP

| | | | |
|---|---|---|---|
| 341 | | Dest | IDENTIFIER OF DestSTA FIELD OF PREP |
| 342 | a | NextHop | IDENTIFIER OF TX STA ADDR FIELD OF PREPQ |
| 343 | b | Metric | Metric OF PREP+METRIC VALUE OF LINK BETWEEN INFORMATION PROCESSING DEVICE OF TX STA ADDR OF PREP AND SELF-STATION |
| 344 | c | SeqNum | VALUE OF SeqNum FIELD OF PREP |
| 345 | d | ExpTime | RECEPTION TIME OF PREP+T1 (Lifetime OF PREP)-T4 |
| 351 | e | LifeTime | RECEPTION TIME OF PREP+T1 (Lifetime OF PREP) |
| 352 | f | HopCount | HopCount OF PREP |

CONTENT EXAMPLE OF MESH PATH TABLE

FIG. 18

STORAGE EXAMPLE OF MESH PATH TABLE OF TRANSMISSION SOURCE STATION OF PREQ

| | | | |
|---|---|---|---|
| 341 | | Dest | IDENTIFIER OF DestSTA FIELD OF PREQ |
| 342 | a | NextHop | UNDEFINED |
| 343 | b | Metric | UNDEFINED |
| 344 | c | SeqNum | VALUE OF PREVIOUS SeqNum FIELD+1 |
| 345 | d | ExpTime | CURRENT TIME+T10−T2 |
| 351 | e | LifeTime | CURRENT TIME+T10 |
| 352 | f | HopCount | UNDEFINED | a

STORAGE EXAMPLE OF MESH PATH TABLE OF RELAY STATION OF PREQ

| | | | |
|---|---|---|---|
| 341 | | Dest | IDENTIFIER OF OrigSTA FIELD OF PREQ |
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)−T5 |
| 351 | e | LifeTime | RECEPTION TIME OF PREQ+T1 (Lifetime OF PREQ) |
| 352 | f | HopCount | HopCount OF PREQ | b

STORAGE EXAMPLE OF MESH PATH TABLE OF DESTINATION STATION OF PREQ

| | | | |
|---|---|---|---|
| 341 | | Dest | IDENTIFIER OF OrigSTA FIELD OF PREQ |
| 342 | a | NextHop | IDENTIFIER OF TX STA ADDR FIELD OF PREQ |
| 343 | b | Metric | Metric OF PREQ+METRIC VALUE OF LINK BETWEEN INFORMATION PROCESSING DEVICE OF TX STA ADDR OF PREQ AND SELF-STATION |
| 344 | c | SeqNum | VALUE OF SeqNum FIELD OF PREQ |
| 345 | d | ExpTime | RECEPTION TIME OF PREQ+T1 (Lifetime OF PREQ)−T3 |
| 351 | e | LifeTime | RECEPTION TIME OF PREQ+T1 (Lifetime OF PREQ) |
| 352 | f | HopCount | HopCount OF PREQ | c

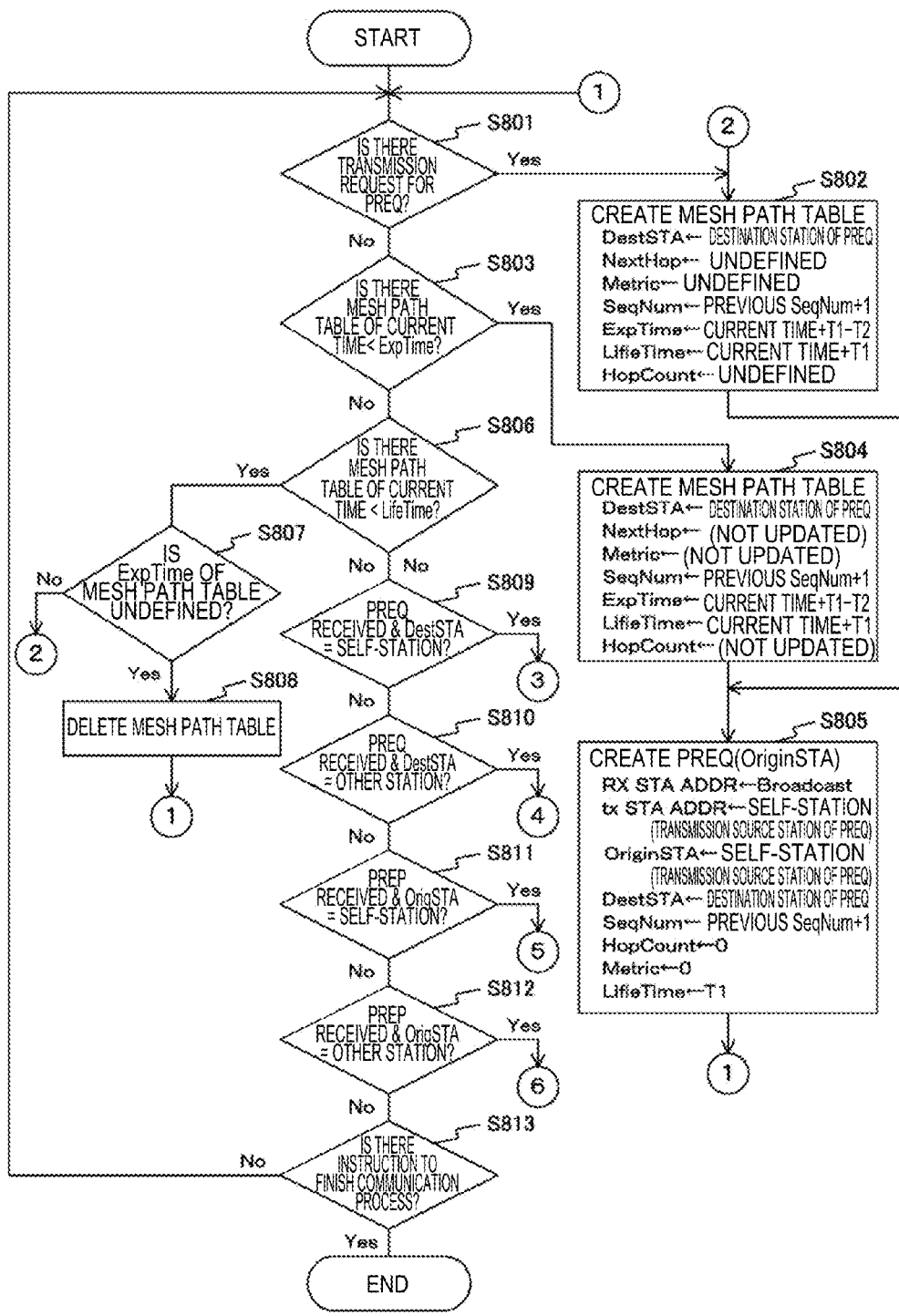

FIG. 28

CONTENT EXAMPLE OF MESH PATH TABLE

MESH PATH TABLE
370

| Index | DATA NAME | MEANING |
|---|---|---|
| a | NextHop | IDENTIFIER OF INFORMATION PROCESSING DEVICE FOR SPECIFYING INFORMATION PROCESSING DEVICE TO WHICH DATA IS TO BE TRANSFERRED NEXT IN ORDER TO DELIVER DATA TO DESTINATION STATION |
| b | Metric | PATH METRIC VALUE FROM SELF-STATION TO DESTINATION STATION OF MESH PATH |
| c | SeqNum | VALUE OF SeqNum OF PREQ OR PREP USED IN GENERATION OF MESH PATH |
| d | ExpTime | UPDATING EXPIRATION TIME OF MESH PATH DECIDED BASED ON Lifetime OF PREQ OR PREP USED IN CREATION OF MESH PATH |
| e | LifeTime | EXPIRATION TIME OF MESH PATH |
| f | HopCount | NUMERICAL VALUE INDICATING NUMBER OF HOPS NECESSARY FOR DELIVERING PREP FROM TRANSMISSION SOURCE STATION |
| g | TxTime | TIME AT WHICH DATA IS FINALLY TRANSMITTED TO NextHop |
| h | RSSI TXack | ELECTRIC FIELD INTENSITY OF ACKNOWLEDGEMENT OF PACKET ON WHICH DATA IS FINALLY TRANSMITTED TO NextHop |

FIG. 30
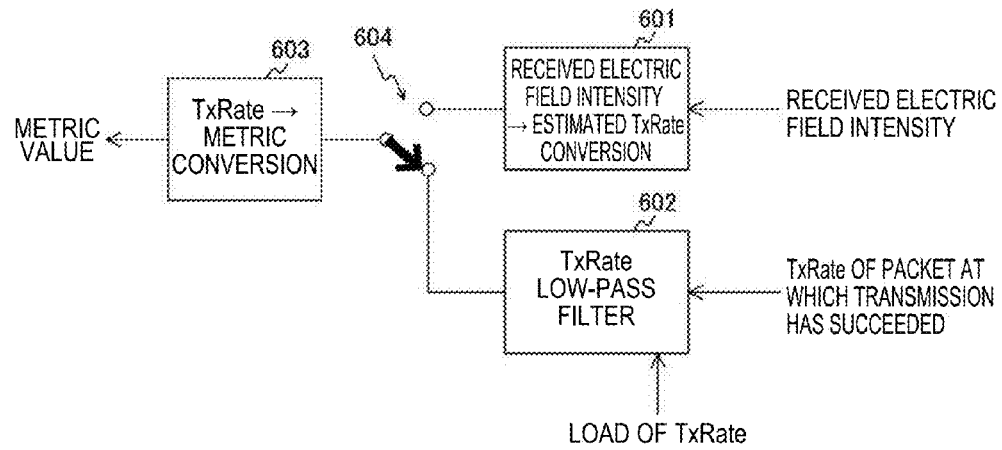
a
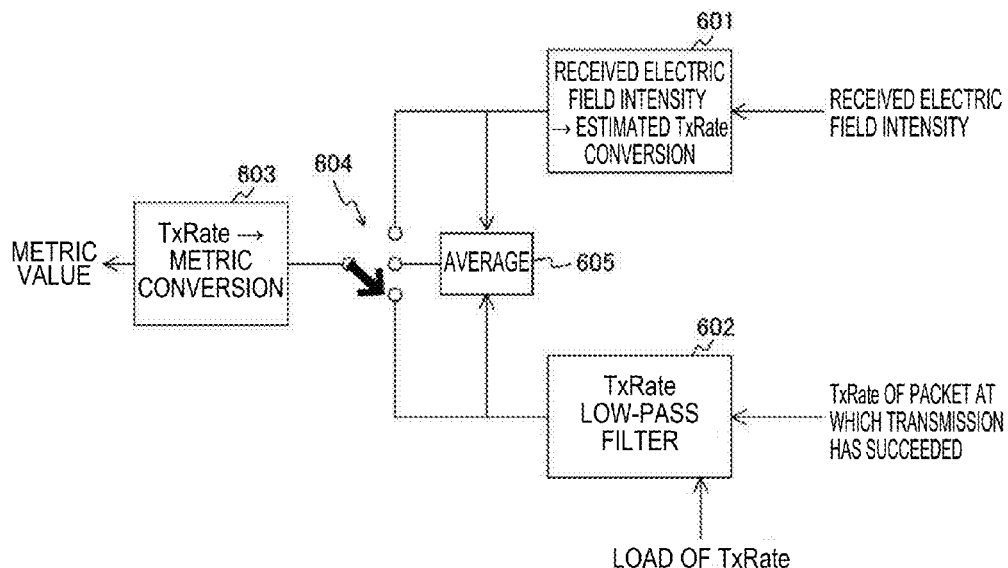
b

FIG. 33

CONTENT EXAMPLE OF MESH PATH TABLE

MESH PATH TABLE 380

| Index | DATA NAME | MEANING |
|---|---|---|
| a | NextHop | IDENTIFIER OF INFORMATION PROCESSING DEVICE FOR SPECIFYING INFORMATION PROCESSING DEVICE TO WHICH DATA IS TO BE TRANSFERRED NEXT IN ORDER TO DELIVER DATA TO DESTINATION STATION |
| b | Metric | PATH METRIC VALUE FROM SELF-STATION TO DESTINATION STATION OF MESH PATH |
| c | SeqNum | VALUE OF SeqNum OF PREQ OR PREP USED IN GENERATION OF MESH PATH |
| d | ExpTime | UPDATING EXPIRATION TIME OF MESH PATH DECIDED BASED ON Lifetime OF PREQ OR PREP USED IN CREATION OF MESH PATH |
| e | LifeTime | EXPIRATION TIME OF MESH PATH |
| f | HopCount | NUMERICAL VALUE INDICATING NUMBER OF HOPS NECESSARY FOR DELIVERING PREP FROM TRANSMISSION SOURCE STATION |
| g | NextHopHy | IDENTIFIER OF INFORMATION PROCESSING DEVICE WHICH IS SMALLER THAN METRIC OF NextHop BUT WHOSE DIFFERENCE DOES NOT BECOME THRESHOLD VALUE H1 |
| h | HyCount | NUMBER OF CONSECUTIVE TIMES "WHICH IS SMALLER THAN METRIC OF NextHop BUT WHOSE DIFFERENCE DOES NOT BECOME THRESHOLD VALUE" |
| i | NewNextCount | NUMBER OF TIMES IN WHICH PATH DIFFERENT FROM PREVIOUS ONE IS SELECTED |

FIG. 35

FOUR ACCESS CATEGORIES (ACS) OF EDCA

| PRIORITY | AC | Traffice Type |
|---|---|---|
| 1 (HIGH) | AC_VO | Voice |
| 2 | AC_VI | Video |
| 3 | AC_BE | Best Effort |
| 4 (LOW) | AC_BK | Back Ground |

INFORMATION PROCESSING DEVICE AND INFORMATION PROCESSING METHOD

TECHNICAL FIELD

The present technology relates to an information processing device. Particularly, the technology relates to an information processing device and an information processing method for dealing with information regarding wireless communication.

BACKGROUND ART

In the related art, there are wireless communication technologies for exchanging various kinds of data using wireless communication. For example, a communication method for making an autonomous connection with a nearby information processing device (for example, ad hoc communication or an ad hoc network) has been proposed (for example, see Patent Literature 1).

CITATION LIST

Non-Patent Literature

Patent Literature 1: JP 2009-239385A

SUMMARY OF INVENTION

Technical Problem

According to the technology of the related art mentioned above, various kinds of data can be exchanged between two information processing devices using wireless communication, without connection on a wired network. In addition, on such a network, each information processing device can perform communication with a nearby information processing device, without depending on a master station such as a control device. Furthermore, on an ad hoc network, when a new information processing device appears nearby, this new information processing device can also freely participate in the network. Thus, network coverage can be widened in accordance with an increase of nearby information processing devices.

In addition, on top of such an autonomous connection with a nearby information processing device, each information processing device can also transfer information to be exchanged with another information processing device in a bucket brigade manner (which is so-called multi-hop relay). In addition, a network using multi-hop is generally known as a mesh network.

As described above, on an ad hoc network or a mesh network, it is possible to freely communicate with nearby information processing devices. In addition, the network can be expanded while connections with information processing devices around are being made. In this case, it is important to appropriately generate and manage a communication path between the plurality of information processing devices.

The present technology takes the above circumstances into consideration, and aims to properly generate and manage a communication path between a plurality of information processing devices.

Solution to Problem

The present technology has been made in order to solve the above-mentioned issues. According to a first aspect of the present technology, there is provided an information processing device, an information processing method, and a program causing a computer to execute the method, the information processing device including: a communication unit configured to perform exchange of a signal for generation or updating of a multi-hop communication path using wireless communication with another information processing device; and a control unit configured to perform control to change a metric value included in the signal based on a state of the information processing device. Accordingly, an effect of changing a metric value based on a state of an information processing device is exhibited.

According to the first aspect, when the information processing device is moving, the control unit may set the metric value to be large. Accordingly, an effect of setting a metric value to be large when the information processing device is moving is exhibited.

According to the first aspect, when an amount of traffic of the information processing device is larger than a threshold value, the control unit may set the metric value to be large. Accordingly, an effect of setting a metric value to be large when an amount of traffic of the information processing device is larger than the threshold value is exhibited.

According to the first aspect, when an error rate of each link is lower than a threshold value, the control unit may compute the metric value using the error rate, and when the error rate is higher than the threshold value, the control unit may compute the metric value without using the error rate. Accordingly, an effect that, when an error rate of each link is lower than the threshold value, a metric value is computed using the error rate and when the error rate is higher than the threshold value, the metric value is computed without using the error rate is exhibited.

According to the first aspect, when a time elapsed from a final data transmission time to an information processing device which is designated as a next transmission destination on the communication path is longer than a threshold value, or when a difference between an electric field intensity at the time of the final data transmission to the information processing device and a current electric field intensity is larger than a threshold value, the control unit may estimate the metric value based on the current electric field intensity. Accordingly, an effect that, when a time elapsed from the final data transmission time to the information processing device which is designated as a next transmission destination is longer than the threshold value or when the difference between the electric field intensity at the time of the final data transmission to the information processing device and a current electric field intensity is larger than the threshold value, a metric value is estimated based on the current electric field intensity is exhibited.

According to the first aspect, when data transmission to the information processing device which is designated as the next transmission destination on the communication path is performed, the control unit may compute the metric value using a value obtained by averaging a rate of the data using a low-pass filter, and when the metric value is estimated based on the current electric field intensity and a rate of the data at which transmission has succeeded has been acquired, the control unit may compute the metric value using the rate of the data as an initial value of the low-pass filter. Accordingly, an effect that, when data transmission to the information processing device which is designated as the next transmission destination is performed, a metric value is computed using the value obtained by averaging the rate of the data using the low-pass filter, and when the metric value is estimated based on the current electric field intensity and a rate of the data at which transmission has succeeded has been acquired, the metric value is computed using the rate of the data as the initial value of the low-pass filter is exhibited.

According to the first aspect, when the rate of the data is used as the initial value of the low-pass filter, the control unit may use a metric value estimated based on the current electric field intensity after the setting of the initial value, then use an average value of the estimated metric value and an output value of the low-pass filter, and then use the output value of the low-pass filter. Accordingly, an effect that, when the rate of the data is used as the initial value of the low-pass filter, the metric value estimated based on the current electric field intensity is used after the setting of the initial value, then the average value of the estimated metric value and an output value of the low-pass filter is used, and then the output value of the low-pass filter is used is exhibited.

According to the first aspect, when link broken is set if an error rate of each link is higher than a threshold value, the control unit may lower the error rate each time a predetermined period of time elapses from the link broken. Accordingly, an effect that, when link broken is set if an error rate of each link is higher than the threshold value, the error rate is lowered each time the predetermined period of time elapses from link broken is exhibited.

According to the first aspect, when there is a communication path set based on a magnitude of the metric value, and there is another communication path having a metric value which is a metric value smaller than the metric value relating to the communication path and whose difference with the metric value relating to the communication path is higher than a metric threshold value, the control unit may set the other communication path as a new communication path. Accordingly, an effect that, when there is the communication path set based on the magnitude of a metric value, and there is another communication path having a metric value which is a metric value smaller than the metric value relating to the communication path and whose difference with the metric value relating to the communication path is higher than the metric threshold value, the other communication path is set as a new communication path is exhibited.

According to the first aspect, when there are a plurality of other communication paths, the control unit may set a communication path having a smallest metric value among the plurality of communication paths as the new communication path. Accordingly, an effect that, when there are a plurality of other communication paths, a communication path having the smallest metric value among the plurality of communication paths is set as a new communication path is exhibited.

According to the first aspect, when there is the communication path set based on the magnitude of the metric value, and there is another communication path having a metric value which is a metric value smaller than the metric value relating to the communication path and whose difference with the metric value relating to the communication path is not higher than a metric threshold value, the control unit may set the other communication path as the new communication path on a condition that this state continues for a predetermined period of time or a predetermined number of times. Accordingly, an effect that, when there is a communication path set based on the magnitude of a metric value and there is another communication path having a metric value which is a metric value smaller than the metric value relating to the communication path and whose difference with the metric value relating to the communication path is higher than the metric threshold value, the other communication path is set as a new communication path on the condition that the state continues for the predetermined period of time or the predetermined number of times is exhibited.

According to the first aspect, when the information processing device is moving, the control unit may set the metric threshold value to be small. Accordingly, an effect that, when the information processing device is moving, the metric threshold value is set to be small is exhibited.

According to the first aspect, when the information processing device is moving, the control unit may set a value relating to the predetermined period of time or the predetermined number of times to be small. Accordingly, an effect that, when the information processing device is moving, the value relating to the predetermined period of time or the predetermined number of times is set to be small is exhibited.

According to the first aspect, when priority of communication performed using the communication path is high, the control unit may set the metric threshold value to be large, and when the priority is low, the control unit may set the metric threshold value to be small. Accordingly, an effect that, when priority of communication performed using a communication path is high, the metric threshold value is set to be large, and when the priority is low, the metric threshold value is set to be small is exhibited.

According to the first aspect, when priority of communication performed using the communication path is high, the control unit may set a value relating to the predetermined period of time or the predetermined number of times to be large, and when the priority is low, the control unit may set the value relating to the predetermined period of time or the predetermined number of times to be small. Accordingly, an effect that, when priority of communication performed using a communication path is high, the value relating to the predetermined period of time or the predetermined number of times is set to be large, and when the priority is low, the value relating to the predetermined period of time or the predetermined number of times is set to be small is exhibited.

According to the first aspect, when the number of information processing devices on the communication path is larger than a hop threshold value, the control unit may set the metric threshold value to be small. Accordingly, an effect that, when the number of information processing devices on a communication path is larger than the threshold value of hop, the metric threshold value is set to be small is exhibited.

According to the first aspect, when the number of information processing devices on the communication path is larger than a hop threshold value, the control unit may set a value relating to the predetermined period of time or the predetermined number of times to be small. Accordingly, an effect that, when the number of information processing devices on a communication path is larger than the hop threshold value, the value relating to the predetermined period of time or the predetermined number of times is set to be small is exhibited.

According to the first aspect, when the number of times the communication path is changed is larger than a threshold value of the change, the control unit may set the metric threshold value to be small. Accordingly, an effect that, when the number of times of the communication path change is larger than the threshold value of the change, the metric threshold value is set to be small is exhibited.

According to the first aspect, the control unit may set the value relating to the predetermined period of time or the predetermined number of times to be small when the number of times of the communication path change is larger than the threshold value of the change. Accordingly, an effect that, when the number of times of the communication path change is larger than the threshold value of the change, the value relating to the predetermined period of time or the predetermined number of times is set to be small is exhibited.

Advantageous Effects of Invention

According to the present technology, the excellent effect of appropriately generating and managing communication paths between a plurality of information processing devices can be exhibited. It should be noted that the effect described here is not necessarily limitative, and any effect described in the present disclosure may be exhibited.

BRIEF DESCRIPTION OF DRAWINGS

FIG. 3 is a diagram showing an example of a signal format of a packet exchanged between information processing devices which constitute the communication system 200 according to the first embodiment of the present technology.

FIG. 4 is a diagram showing examples of signal formats of a management packet exchanged between the information processing devices which constitute the communication system 200 according to the first embodiment of the present technology.

FIG. 5 is a diagram showing an example of the content of the signal format of the management packet exchanged between the information processing devices which constitute the communication system 200 according to the first embodiment of the present technology.

FIG. 6 is a diagram showing an example of the content of the signal format of the management packet exchanged between the information processing devices which constitute the communication system 200 according to the first embodiment of the present technology.

FIG. 7 is a diagram showing an example of the content of the signal format of the management packet exchanged between the information processing devices which constitute the communication system 200 according to the first embodiment of the present technology.

FIG. 8 is a diagram schematically showing an example of a mesh path table (mesh path table 340) retained by each of information processing devices which constitute the communication system 200 according to the first embodiment of the present technology.

FIG. 9 is a diagram showing a generation example of a mesh path retained by each of the information processing devices which constitute the communication system 200 according to the first embodiment of the present technology.

FIG. 10 is a diagram showing a generation example of a mesh path retained by each of the information processing devices which constitute the communication system 200 according to the first embodiment of the present technology.

FIG. 11 is a diagram schematically showing another example of the mesh path table (mesh path table 350) retained by each of the information processing devices which constitute the communication system 200 according to the first embodiment of the present technology.

FIG. 12 is a diagram showing generation and updating examples of the mesh path table 350 retained by each of the information processing devices which constitute the communication system 200 according to the first embodiment of the present technology.

FIG. 13 is a diagram showing generation and updating examples of the mesh path table 350 retained by each of the information processing devices which constitute the communication system 200 according to the first embodiment of the present technology.

FIG. 14 is a diagram showing generation and updating examples of the mesh path table 350 retained by each of the information processing devices which constitute the communication system 200 according to the first embodiment of the present technology.

FIG. 15 is a diagram showing generation and updating examples of the mesh path table 350 retained by each of the information processing devices which constitute the communication system 200 according to the first embodiment of the present technology.

FIG. 16 is a diagram showing generation and updating examples of the mesh path table 350 retained by each of the information processing devices which constitute the communication system 200 according to the first embodiment of the present technology.

FIG. 18 is a diagram showing generation and updating examples of the mesh path table 350 retained by each of the information processing devices which constitute the communication system 200 according to the first embodiment of the present technology.

FIG. 19 is a flowchart showing an example of the procedure of signal processing by the information processing device 100 according to the first embodiment of the present technology.

FIG. 28 is a diagram schematically showing still another example of the mesh path table (mesh path table 370) retained by each of the information processing devices which constitute the communication system 200 according to the second embodiment of the present technology.

FIG. 30 is diagram schematically showing a computation process of a metric value by the information processing device 100 according to the second embodiment of the present technology.

FIG. 33 is a diagram schematically showing still another example of the mesh path table (mesh path table 380) retained by each of the information processing devices which constitute the communication system 200 according to the second embodiment of the present technology.

FIG. 35 is a diagram showing four access categories (ACs) of IEEE 802.11e-Enhanced Distributed Channel Access (EDCA).

DESCRIPTION OF EMBODIMENTS

Hereinafter, embodiments for implementing the present technology (which will be referred to hereinafter as embodiments) will be described. Description will be provided in the following order.

1. First embodiment (Example in which an expiration time and updating expiration time of a path metric are set)
2. Second embodiment (example in which a path metric value is changed)
3. Application example <1. First Embodiment>
[Configuration Example of a Communication System]

Figure 1:
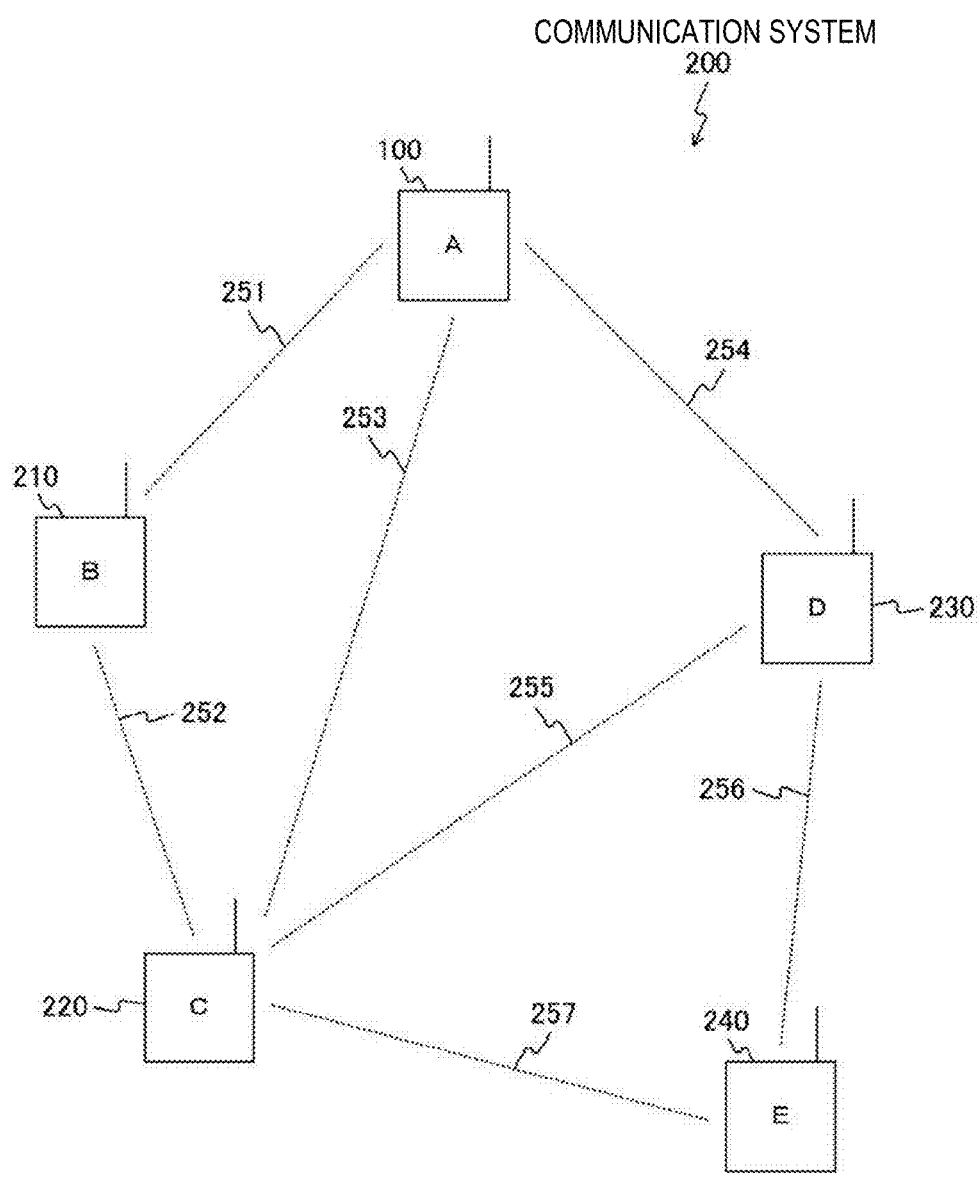
FIG. 1 is a diagram showing a system configuration example of a communication system 200 according to a first embodiment of the present technology.

FIG. 1 is a diagram showing a system configuration example of a communication system 200 according to a first embodiment of the present technology.

The communication system 200 includes a plurality of information processing devices (an information processing device 100, an information processing device 210, an information processing device 220, an information processing device 230, and an information processing device 240). Each of the information processing devices constituting the communication system 200 is, for example, a portable type information processing device or a fixed type information processing device with a wireless communication function. It should be noted that portable type information processing devices include wireless communication devices, for example, smartphones, mobile telephones, tablet terminals, and fixed type information processing devices include information processing devices such as printers, personal computers, and the like.

In FIG. 1 rectangles representing the information processing devices are labeled with reference symbols (A to E) for identifying the respective information processing devices. In other words, the rectangle representing the information processing device 100 is labeled "A," the rectangle representing the information processing device 210 is labeled "B," the rectangle representing the information processing device 220 is labeled "C," the rectangle representing the information processing device 230 is labeled "D," and the rectangle representing the information processing device 240 is labeled "E." In addition, the reference symbols A to E are used to display the content of signals exchanged between the information processing devices as shown in FIGS. 9, 10, and the like.

In addition, FIG. 1 shows communication paths between the information processing device 100 and the information processing devices 210, 220, and 230 using dotted lines 251, 253, and 254. In addition, communication paths between the other information processing devices are likewise indicated using dotted lines 252 and 255 to 257.

Here, as a communication method for autonomously connecting with a nearby information processing device, ad hoc communication, an ad hoc network, and the like are known. On such a network, each information processing device can perform communication with a nearby information processing device without depending on a master station (for example, a control device). Thus, in this embodiment of the present technology, an ad hoc network will be exemplified as a communication method for autonomously connecting with a nearby information processing device When a new nearby information processing device is added on an ad hoc network, this new information processing device can freely participate in the network. For example, a case in which, among the information processing devices shown in FIG. 1, only the information processing device 100, the information processing device 210, the information processing device 220 first participate in the ad hoc network is assumed. In this case, the information processing device 230 and the information processing device 240 are assumed to be added in order. In this case, as the number of the information processing devices (nearby information processing devices) increases, coverage of the network can be widened. That is, according to the addition of the information processing device 230 and the information processing device 240 in order, coverage of the network can be widened.

Here, on top of autonomous connection with a nearby information processing device, each information processing device can also transfer information to be exchanged with another information processing device in a bucket brigade manner.

It is assumed that, for example, the information processing device 100 can directly communicate with each of the information processing devices 210, 220, and 230, but is not able to directly communicate with the information processing device 240 for a reason such as radio waves failing to reach the device.

When direct communication is not possible as described above, the information processing devices which can directly communicate with the information processing device 100 (the information processing devices 210, 220, and 230) can transfer data of the information processing device 100 to the information processing device 240. Thus, such transfer of data enables the information processing device 100 and the information processing device 240 which does not directly communicate with the information processing device 100 to exchange information via any of the information processing devices 210, 220, and 230.

This method of performing data transfer between devices (so-called bucket brigade) as described above to cause information to reach a remote information processing device is called multi-hop relay. In addition, a network which performs multi-hop is generally known as a mesh network.

Figure 2:
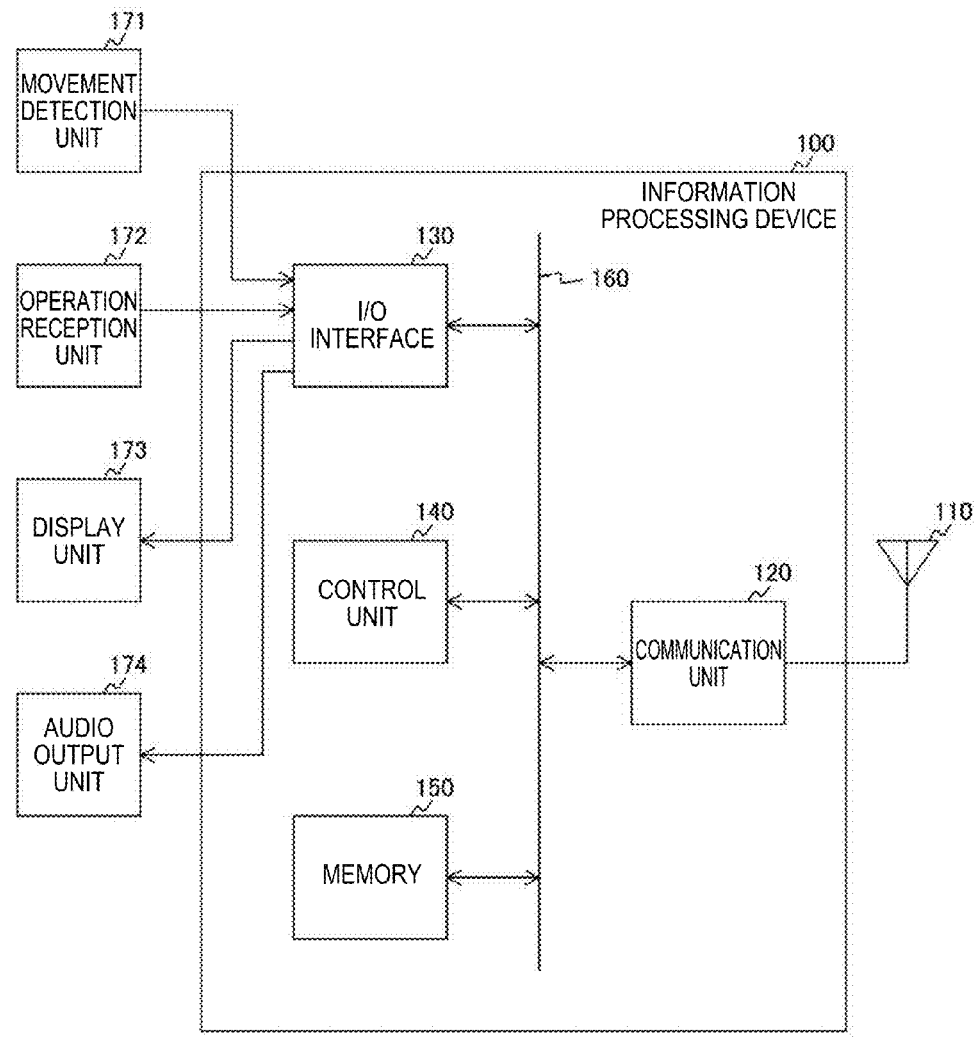
FIG. 2 is a block diagram showing an internal configuration example of an information processing device 100 according to the first embodiment of the present technology.

A configuration of an information processing device which constitutes such an ad hoc network or a mesh network is shown in FIG. 2. In addition, multi-hop relay will be described in more detail with reference to FIGS. 4, 10, and the like.

In addition, among the information processing devices which constitute the communication system 200 in the embodiments of the present technology, an information processing device which serves as a reference (for example, an information processing device which receives a signal) will be referred to as a self-station, and other information processing devices will be referred to as a transmitting station, a receiving station, a transmission source station, a destination station, and a nearby station.

In more detail, an information processing device which transmits a signal received by the self-station will be referred to as a transmitting station, and an information processing device which receives a signal from the self-station will be referred to as a receiving station. In addition, a transmission source information processing device which first transmits a signal received by the self-station (a so-called leader of a bucket brigade) will be referred to as a transmission source station, and an information processing device which receives a signal received by the self-station in the end (a so-called terminus of the bucket brigade) will be referred to as a destination station. In addition, an information processing device which transfers a signal received by the self-station will be referred to as a relay station, and an information processing device which is near or in the vicinity of the self-station on a network will be referred to as a nearby station.

[Configuration Example of an Information Processing Device]

FIG. 2 is a block diagram showing an internal configuration example of the information processing device 100 according to the first embodiment of the present technology. Herein, only the information processing device 100 will be described because internal configurations of the other information processing devices (the information processing devices 210, 220, 230, and 240) are the same as that of the information processing device 100, and thus other information processing devices will not be described.

The information processing device 100 includes an antenna 110, a communication unit 120, an input/output (I/O) interface 130, a control unit 140, and a memory 150. In addition, these units are connected to one another via a bus 160.

The communication unit 120 is a module (for example, a modem) for performing transmission and reception of radio waves via the antenna 110. For example, the communication unit 120 can perform wireless communication through millimeter wave communication (60 GHz, etc.), a wireless local area network (LAN) of 900 MHz, 2.4 GHz, or 5 GHz, or an ultra-wide band (UWB). In addition, the communication unit 120 can perform wireless communication through, for example, visible light communication or near field communication (NFC).

For example, the communication unit 120 exchanges a signal (an RANN, a PREQ, or a PREP) for generating or updating a communication path of multi-hop using wireless communication with another information processing device based on control of the control unit 140. The RANN, PREQ, and PREP will be described in detail with reference to FIG. 4, and the like.

It should be noted that the communication unit 120 may be designed to perform wireless communication using radio waves (electromagnetic waves) or wireless communication using a medium other than radio waves (for example, wireless communication performed using a magnetic field).

In addition, the communication unit 120 performs communication with a nearby information processing device by setting up a communication link, manages the number of nearby information processing devices with which the information processing device 100 can communicate, and retains information which indicates the number of nearby communicable information processing devices (communicable device number information). Furthermore, the communication unit 120 regularly or irregularly observes a degree of use of a channel used in wireless communication, and retains information which indicates a level of congestion of a communication line around the information processing device 100 (congestion level information). In addition, the communication unit 120 observes link quality (reception power, a transmittable data rate, etc.) with a nearby information processing device performing wireless communication therewith, and retains information which indicates a bandwidth which makes wireless communication with a nearby information processing device possible (communication state information). Then, the communication unit 120 supplies the information to the control unit 140.

The I/O interface 130 is an interface with an external device such as a sensor actuator which operates in linkage with the information processing device 100. FIG. 2 shows an example in which, for example, a movement detection unit 171, an operation reception unit 172, a display unit 173, and an audio output unit 174 are connected with the I/O interface 130 as external devices. In addition, FIG. 2 shows the example in which the movement detection unit 171, the operation reception unit 172, the display unit 173, and the audio output unit 174 are provided outside the information processing device 100, but all or some of the units may be installed inside the information processing device 100.

The movement detection unit 171 detects a movement of the information processing device 100 by detecting acceleration, a motion, an inclination, or the like of the information processing device 100, and outputs movement information regarding the detected movement to the control unit 140 via the I/O interface 130. For example, the movement detection unit 171 retains movement information which indicates whether or not the information processing device 100 is moving to a different place (a log (or real-time information regarding the movement)), and supplies the information to the control unit 140. As the movement detection unit 171, for example, an acceleration sensor, a gyro sensor, or the Global Positioning System (GPS) can be used. The movement detection unit 171 can compute a movement distance of the information processing device 100 (for example, a movement distance per unit time) using, for example, position information (for example, latitude and longitude) detected using the GPS.

The operation reception unit 172 is an operation reception unit which receives an operation input performed by a user, and outputs operation information according to the received operation input to the control unit 140 via the I/O interface 130. The operation reception unit 172 is realized with, for example, a touch panel, a keyboard, or a mouse.

The display unit 173 is a display unit on which various kinds of information are displayed based on control of the control unit 140. As the display unit 173, for example, a display panel such as an organic electro luminescence (EL) panel, or a liquid crystal display (LCD) can be used. The operation reception unit 172 and the display unit 173 can be configured to be integrated using a touch panel on which operations can be input by a user bringing his or her finger in contact with or close to its display plane.

The audio output unit 174 is an audio output unit (for example, a speaker) which outputs various kinds of sounds based on control of the control unit 140.

The control unit 140 controls each unit of the information processing device 100 based on a control program stored in the memory 150. The control unit 140 performs, for example, signal processing of transmitted and received information. In addition, the control unit 140 is realized with a central processing unit (CPU).

The memory 150 is a memory which stores various kinds of information. For example, the memory 150 stores various kinds of information necessary for the information processing device 100 to perform a desired operation (for example, the control program). In addition, the memory 150 stores, for example, the mesh path table 350 shown in FIG. 11. Furthermore, the memory 150 stores various kinds of content such as music content and image content (for example, dynamic image content and still image content).

When data is transmitted using wireless communication, for example, the control unit 140 processes information read from the memory 150, a signal input from the I/O interface 130, or the like, and generates a mass of data to be actually transmitted (transmission packets). Successively, the control unit 140 outputs the generated transmission packets to the communication unit 120. In addition, the communication unit 120 converts the transmission packets in a format of a communication scheme for actual transfer or the like, and transmits the converted transmission packets to the outside from the antenna 110.

In addition, when data is received using wireless communication, for example, the communication unit 120 extracts reception packets of radio waves received via the antenna 110 through signal processing performed by a receiver inside the communication unit 120. Then, the control unit 140 analyzes the extracted reception packets. When the packets are determined to be data to be retained as a result of the analysis, the control unit 140 writes the data in the memory 150. In addition, when the packets are determined to be data to be transferred to another information processing device, the control unit 140 outputs the data to the communication unit 120 as transmission packets to be transmitted to another information processing device. Furthermore, when the packets are determined to be data to be transferred to an external actuator, the control unit 140 outputs the packets to the outside (for example, the display unit 173) from the I/O interface 130.

The control unit 140 can, for example, provide various kinds of content stored in the memory 150 to another information processing device using wireless communication.

It should be noted that, when the information processing device 100 is driven by a battery, a battery is mounted (installed or loaded) in the information processing device 100. In this case, the control unit 140 has a function of estimating a remaining battery amount, and thus can acquire the estimated remaining battery amount as needed.

[Example of a Signal Format]

FIG. 3 is a diagram showing an example of a signal format of a packet exchanged between information processing devices which constitute the communication system 200 according to the first embodiment of the present technology.

Here, each of the information processing devices constituting the communication system 200 exchanges signals in a packet form during communication. The signal in the packet form includes at least two types including a management packet and a data packet. Thus, a of FIG. 3 shows an example of the signal format of a management packet and b of FIG. 3 shows the signal format of a data packet.

The management packet shown in a of FIG. 3 is a packet used for generating and retaining a network.

As shown in a of FIG. 3, the transmission signal of the management packet is composed of a header part (301 to 303) and a payload part 304. In addition, there are three fields in the header part. These three fields are a Frame Control field 301, an RX STA ADDR field 302, and a TX STA ADDR field 303.

In the leading part of the header part, there is the Frame Control field 301 in which an attribute of a signal including this header and the like are stored. Each information processing device can acquire information of whether a packet is a data packet or a management packet for control and management and the like with reference to the Frame Control field 301.

In the RX STA ADDR field 302, an identifier (address) indicating a packet receiving station is stored. Each information processing device can know which information processing device is supposed to receive the signal (packet) with reference to the RX STA ADDR field 302. An information processing device which has received the signal (packet) starts a reception process of the received signal (packet) when, for example, content of the RX STA ADDR field 302 is its own identifier (address) or a broadcast address.

In the TX STA ADDR field 303, an identifier (address) of a packet transmitting station. Each information processing device can recognize which information processing device has transmitted the signal with reference to the TX STA ADDR field 303.

The data packet shown in b of FIG. 3 is a packet used when application data or the like is transmitted.

As shown in b of FIG. 3, the transmission signal of the data packet is composed of a header part (305 to 309) and a payload part 310. In addition, there are 5 fields in the header part. These 5 fields are a Frame Control field 305, an RX STA ADDR field 306, a TX STA ADDR field 307, a Dst STA ADDR field 308, and an Src STA ADDR field 309.

In the leading part of the header part, there is the Frame Control field 305 in which an attribute of a signal including this header and the like are stored. Each information processing device can acquire information of whether a packet is a data packet or a management packet for control and management and the like with reference to the Frame Control field 305.

In the RX STA ADDR field 306, an identifier (address) indicating a packet receiving station is stored. Each information processing device can know which information processing device is supposed to receive the signal (packet) with reference to the RX STA ADDR field 306. An information processing device which has received the signal (packet) starts a reception process of the received signal (packet) when, for example, content of the RX STA ADDR field 306 is its own identifier (address) or a broadcast address.

In the TX STA ADDR field 307, an identifier (address) of a packet transmitting station. Each information processing device can recognize which information processing device has transmitted the signal with reference to the TX STA ADDR field 307.

In the Dst STA ADDR field 308, an identifier (address) indicating a packet destination station (an information processing device which is supposed to receive the packet in the end) is stored. Each information processing device can know to which information processing device the signal is supposed to be transmitted in the end with reference to the Dst STA ADDR field 308. An information processing device which has received the signal performs a transfer process to transmit the received signal to a destination station when, for example, the Dst STA ADDR field 308 does not include its own identifier (address).

In the Src STA ADDR field 309, an identifier (address) of a packet transmission source station (an information processing device which first transmitted the packet first) is stored. For example, each information processing device can recognize which information processing device has transmitted the signal with reference to the Src STA ADDR field 309.

Here, when data destined for a specific information processing device is transferred through the above-described multi-hop relay, it is necessary to decide a path on which the data is to be relayed before the data is transferred. This procedure is called path selection. In addition, in this path selection, a communication path is decided by exchanging a management signal between information processing devices for selecting a path. It should be noted that a communication path on a mesh network is called a mesh path. In FIGS. 4 to 7, types and formats of management signals used for generating this mesh path are shown.

[Examples of Signal Formats]

FIG. 4 is a diagram showing an example of a signal format of a management packet exchanged between the information processing devices which constitute the communication system 200 according to the first embodiment of the present technology.

FIGS. 5 to 7 are diagrams showing examples of the content of the signal formats of the management packet exchanged between the information processing devices which constitute the communication system 200 according to the first embodiment of the present technology. In other words, FIGS. 5 to 7 show the examples of the content of the signal formats of the management packets shown in FIG. 4.

a of FIG. 4 shows the management packet. This management packet is the same as that of a of FIG. 3. As described above, the Frame Control field 301 of the management packet stores the fact that the signal is a management packet. b to d of FIG. 4 show a configuration example of the payload part 304 of the management packet shown in a of FIG. 4. Specifically, b of FIG. 4 shows a configuration example of a case in which the management packet is an RANN (root announcement signal). In addition, c of FIG. 4 shows a configuration example of a case in which the management packet is a PREQ (path request signal). Also, d of FIG. 4 shows a configuration example of a case in which the management packet is a PREP (path reply signal).

The RANN (root announcement signal) shown in b of FIG. 4 is a signal used for proactively generating a mesh path regardless of presence of transmission data. Here, the case in which a mesh path is proactively generated is a case in which, regardless of necessity of data transfer, a mesh path between a specific information processing device and another information processing device on a network is generated beforehand.

As shown in b of FIG. 4, there are a plurality of fields (311 to 318) in the RANN.

In the Length field 311, information indicating the length of the payload is stored.

In the ActionType field 312, an identifier indicating that the signal is an RANN is stored. An information processing device which has received the signal can recognize that the received signal is an RANN with reference to the ActionType field 312.

In the Flags field 313, an attribute of a transmission source station of the RANN (information processing device which has transmitted the RANN first) is stored. This attribute is information indicating, for example, a role of the information processing device. For example, when the information processing device which has transmitted the RANN first (transmission source station) is a device for causing another information processing device to be connected to the Internet, the Flags field 313 stores that fact.

In the OrigSTA field 314, an identifier (address) indicating which information processing device is the transmission source station of the RANN (information processing device which has transmitted the RANN first) is stored. Here, although the RANN is transferred to a remote spot through multi-hop relay, an information processing device which has received the RANN can recognize which information processing device is the transmission source station of the received RANN with reference to OrigSTA field 314.

In the SeqNum field 315, an identifier for identifying the RANN is stored. For example, each time the RANN is transmitted from the transmission source station, an incremented value is stored in the SeqNum field 315. In other words, as the RANN is regularly or irregularly transmitted from the transmission source station, an information processing device which has received the RANN can recognize whether or not the received RANN is the same RANN as that received before with reference to the SeqNum field 315.

In the HopCount field 316, a numerical value indicating the number of hops necessary for the RANN to be delivered from the transmission source station (information processing device which has transmitted the RANN first) is stored. An information processing device which has received the RANN transfers the received RANN in multi-hop, and an incremented value is stored in the HopCount field 316 with each the transfer process.

In the Metric field 317, a value indicating a metric value that was necessary for arrival of the RANN from the transmission source station (information processing device which has transmitted the RANN first) is stored. An information processing device which has received the RANN transfers the received RANN in multi-hop, and the Metric field 317 stores a value obtained by cumulatively adding metric values of a link between information processing devices with each transfer process.

Here, a metric value of a link between information processing devices is a value indicating, for example, at how many Mbps transfer is possible on that link. In the IEEE standard 802.11-2012, for example, a metric value ca can be obtained from the following expression 1.

$$ca = [O + (Bt/r)]/[1/(1-ed)] \qquad \text{Expression 1}$$

Here, r is a value indicating a data rate (Mb/s). In addition, of is a value indicating a frame error rate. Further, Bt is a value indicating a frame size. Also, O is an intrinsic value of a physical layer (PHY).

In the Etc field 318, other management information is stored.

The PREQ (path request signal) shown in c of FIG. 4 is a signal used for requesting generation of a mesh path destined for a specific information processing device.

As shown in c of FIG. 4, there are a plurality of fields (319 to 328) in the PREQ.

In the Length field 319, information indicating the length of the payload is stored.

In the ActionType field 320, an identifier indicating that the signal is a PREQ is stored. An information processing device which has received the signal can recognize that the received signal is a PREQ with reference to the ActionType field 320.

In the Flags field 321, information indicating whether the PREQ has been transmitted triggered by reception of the RANN (whether this is a proactive mesh path generation process) is stored.

In the OrigSTA field 322, an identifier (address) indicating an information processing device serving as a requesting source of mesh path generation (transmission source station) is stored. Here, although the PREQ is transferred to a remote spot through multi-hop relay, an information processing device which has received the PREQ can recognize which information processing device is the transmission source station of the received PREQ with reference to the OrigSTA field 322.

In the DestSTA field 323, an identifier indicating an information processing device serving as a request destination of mesh path generation (destination station) is stored. When an information processing device specified with the identifier stored in the DestSTA field 323 (destination station) receives the PREQ, the device replies with a PREP in response thereto. Accordingly, a bidirectional mesh path is generated.

In the SeqNum field 324, an identifier for identifying the PREQ is stored. For example, each time the PREQ is transmitted from the transmission source station, an incremented value is stored in the SeqNum field 324. In other words, there are cases in which, although the PREQ is transmitted from the transmission source station a plurality of times, an information processing device which has received the PREQ can recognize whether or not the received PREQ is the same one as a PREQ received before with reference to the SeqNum field 324.

In the HopCount field 325, a numerical value indicating the number of hops necessary for the PREQ to be delivered from the transmission source station (information processing device which has transmitted the PREQ first) is stored. An information processing device which has received the PREQ transfers the received PREQ in multi-hop, and an incremented value is stored in the HopCount field 325 with each the transfer process.

In the Metric field 326, a value indicating a metric value that was necessary for arrival of the PREQ from the transmission source station (information processing device which has transmitted the PREQ first) is stored. An information processing device which has received the PREQ transfers the received PREQ in multi-hop, and the Metric field 326 stores a value obtained by cumulatively adding metric values of a link between information processing devices with each transfer process.

In the Lifetime field 327, information indicating a lifetime of a mesh path is stored. In other words, when a mesh path generation request succeeds, a valid mesh path (active mesh path) is generated, and a value for specifying the lifetime of the mesh path is stored in the Lifetime field 327.

In the Etc field 328, other management information is stored.

The PREP (path reply signal) shown in d of FIG. 4 is a signal used for reply to a request to generate a mesh path destined for a specific information processing device.

As shown in d of FIG. 4, there are a plurality of fields (329 to 338) in the PREP.

In the Length field 329, information indicating the length of the payload is stored.

In the ActionType field 330, an identifier indicating that the signal is a PREP is stored. An information processing device which has received the signal can recognize that the received signal is a PREP with reference to the ActionType field 330.

In the Flags field 331, an attribute of a transmission source station of the PREP (an information processing device which has transmitted the PREP first) is stored.

In the OrigSTA field 332, an identifier indicating an information processing device serving as a requesting source for generating a mesh path is stored. Here, the identifier of the information processing device stored in the OrigSTA field 322 of the PREQ (transmission source station of the PREQ) is transcribed in the OrigSTA field 332.

In the DestSTA field 333, an identifier indicating an information processing device serving as a request destination for generation of the mesh path is stored. Here, the identifier of the information processing device stored in the DestSTA field 323 of the PREQ (destination station of the PREQ) is transcribed in the DestSTA field 333.

In the SeqNum field 334, an identifier for identifying the PREP is stored. For example, each time the PREP is transmitted from the transmission source station, an incremented value is stored in the SeqNum field 334. In other words, there are cases in which, although the PREP is transmitted from the transmission source station a plurality of times, a destination station which has received the PREP can recognize whether or not the received PREP is the same one as a PREP received before with reference to the SeqNum field 334.

In the HopCount field 335, a numerical value indicating the number of hops necessary for the PREP to be delivered from the transmission source station of the PREP is stored. An information processing device which has received the PREP transfers the received PREP in multiple-hop, and an incremented value is stored in the HopCount field 335 with each transfer process.

In the Metric field 336, a value indicating a metric value that was necessary for arrival of the PREP from the transmission source station is stored. An information processing device which has received the PREP transfers the received PREP in multi-hop, and the Metric field 336 stores a value obtained by cumulatively adding metric values of a link between information processing devices with each transfer process.

In the Lifetime field 337, information indicating a lifetime of a mesh path is stored. In other words, when a mesh path generation request succeeds, a valid mesh path (active mesh path) is generated, and a value for designating the lifetime of the mesh path is stored in the Lifetime field 337.

In the Etc field 338, other management information is stored.

The information processing devices constituting the communication system 200 generate path information (also referred to as transfer information or mesh path information) necessary during multi-hop communication by exchanging the RANN, the PREQ, and the PREP. For example, the information processing devices generates a multi-hop communication path at a fixed time interval or irregularly by exchanging the RANN, the PREQ, and the PREP. In addition, the path information is path information for specifying the next information processing device to which packets should be transferred in order to deliver the packets to a destination information processing device. This path information is retained inside each information processing device as a mesh path table. In addition, when transmitting data packets to a specific information processing device, each information processing device decides an information processing device to be designated as a receiving station to transmit the packets with reference to the mesh path table. In other words, when transmitting data packets to a specific information processing device, each information processing device decides what information processing device should be designated in the RX STA ADDR field 302 to transmit the packets with reference to the mesh path table. This mesh path table will be described in detail with reference to FIGS. 8, 11, and the like.

[Configuration Example of a Mesh Path Table]

FIG. 8 is a diagram schematically showing an example of a mesh path table (mesh path table 340) retained by each information processing device which constitutes the communication system 200 according to the first embodiment of the present technology.

a of FIG. 8 schematically shows a configuration of the mesh path table 340, and b of FIG. 8 shows an example of the content of the mesh path table 340. Specifically, b of FIG. 8 shows an Index 346, a data name 347, and a meaning 348 as the example of the content of the mesh path table 340.

As shown in a of FIG. 8, the mesh path table 340 is recorded in the memory 150 in a record form. In addition, the mesh path table 340 is designed such that each record can be extracted therefrom using the address (Dest 341) of a destination station as a key. In addition, as records of the mesh path table 340, a NextHop 342, a Metric 343, a SeqNum 344, and an ExpTime 345 are stored. It should be noted that, in b of FIG. 8, reference symbols a to d for identifying each of the records are given in the Index 346.

In the NextHop 342 of "a" of the Index 346, an identifier of an information processing device indicating to what information processing device data should be transferred next in order to deliver the data to a destination station is stored. In other words, the NextHop 342 stores an identifier of a transmitting station.

In the Metric 343 of "b" of the Index 346, a path metric value from a self-station to the destination station of the mesh path is stored. A computation method for this path metric value will be shown in FIGS. 9, 10, etc.

In the SeqNum 344 of "c" of the Index 346, the value of SeqNum of the PREQ or the PREP (for example, the SeqNum fields 324 and 334 shown in c and d of FIG. 4) used to generate the mesh path is stored.

In the ExpTime 345 of "d" of the Index 346, the expiration time of the mesh path is stored. The expiration time of the mesh path is decided based on the Lifetime fields 327 and 337 of the PREQ or the PREP (shown in c and d of FIG. 4) used to generate the mesh path.

Each information processing device constituting the communication system 200 generates path information at the time of a request of generation of a path or a reply thereto, and writes the generated path information in the mesh path table 340. In addition, when transferring data, based on the address (Dest 341) of a destination station to which the data is to be delivered, each information processing device constituting the communication system 200 extracts a record corresponding to the destination station from the mesh path table 340. In addition, the information processing device performs a transfer process for transferring the data to a transmitting station corresponding to the NextHop 342 of the extracted record.

[Generation Example of a Mesh Path]

FIGS. 9 and 10 are diagrams showing a generation example of a mesh path retained by each information processing device constituting the communication system 200 according to the first embodiment of the present technology.

In FIGS. 9 and 10, the procedure for generating the mesh path table 340 using a PREQ and a PREP will be described. Specifically, in FIGS. 9 and 10, a case in which, when the information processing device 100 attempts to transmit data destined for the information processing device 240 in the topology shown in FIG. 1, the information processing device 100 requests generation of a mesh path between the information processing device 240 will be described.

As shown in a of FIG. 9, the information processing device 100 transmits a PREQ in which the information processing device 240 has been designated in the Dest STA field 323 (shown in c of FIG. 4). A configuration of the PREQ has been shown in c of FIG. 4 and FIG. 6. In addition, when the PREQ is transmitted, the control unit 140 of the information processing device 100 stores zero as an initial value in the HopCount field 325 and the Metric field 326 of the PREQ to be transmitted. Furthermore, the control unit 140 of the information processing device 100 stores a value obtained by incrementing the value stored in the PREQ that was transmitted the previous time in the SeqNum field 324 of the PREQ to be transmitted. In addition, the control unit 140 of the information processing device 100 sets a broadcast address for designating each information processing device located nearby as a receiving station in the RX STA ADDR field 303 (shown in a of FIG. 4) of the management packet of the PREQ to be transmitted.

It should be noted that, in a of FIG. 9, the flow of the PREQ transmitted from the information processing device 100 to each information processing device is schematically shown with thick-line arrows. In addition, the name of the signal (PREQ), the reference symbol of the destination station (Dest=E), and the reference symbol of the transmission source station and relay station (including the transmitting station) of the PREQ (A) are given to the thick-line arrows.

For example, PREQ Dest=E(A) shown in a of FIG. 9 means that it is a PREQ of which the destination station is the information processing device 240 and the transmission source station and the relay station (including the transmitting station) are the information processing device 100. It should be noted that the same applies to the names and reference symbols of thick-line arrows in the following drawings.

As shown in a of FIG. 9, the information processing devices 210, 220, and 230 receive the PREQ transmitted from the information processing device 100. Upon receiving the PREQ, the information processing devices 210, 220, and 230 generate path information destined for an information processing device (destined for the information processing device 100) of which the identifier is stored in the OrigSTA field 322 of the received PREQ. In addition, the information processing devices 210, 220, and 230 records the generated path information in the mesh path table 340 as path information destined for the information processing device 100.

In this case, each information processing device stores the identifier (address) of the information processing device 100 in the Dest 341 of the mesh path table 340. In addition, each information processing device stores the identifier (address) of the TX STA ADDR field 303 of the received PREQ in the NextHop 342 of "a" of the Index 346 of the mesh path table 340.

Furthermore, each of the information processing devices acquires a metric value of a link between a transmitting station of the received PREQ and the self-device. For example, the information processing device 210 acquires a metric value of a link between the transmitting station (the information processing device 100) of the received PREQ and the self-device (the information processing device 210). Subsequently, each information processing device computes a path metric value by adding the acquired metric value of the link to the value stored in the Metric field 326 of the received PREQ. Then, each information processing device stores the computed path metric value in the Metric 343 of "b" of the Index 346 of the mesh path table 340.

Here, the transmitting station of the received PREQ is the information processing device corresponding to the identifier stored in the TX STA ADDR field 303, and is the information processing device 100 in the example shown in FIG. 9. In addition, the metric value of the link between the transmitting station of the received PREQ and the self-device is, for example, a value which indicates at how many Mbps transfer is possible on that link.

Furthermore, each information processing device stores the value of the SeqNum field 324 of the received PREQ in the SeqNum 344 of "c" of the Index 346 of the mesh path table 340.

In addition, each information processing device stores the value obtained by adding the value stored in the Lifetime field 327 of the PREQ to the reception time of the PREQ (expiration time) in the ExpTime 345 of "d" of the Index 346 of the mesh path table 340. The mesh path generated in that manner is referred to as a value mesh path until the expiration time stored in the ExpTime 345 of "d" of the Index 346 of the mesh path table 340.

In this manner, the information processing devices 210, 220, and 230 generate the mesh path destined for the information processing device 100.

Furthermore, as shown in b of FIG. 9, the respective information processing devices 210, 220, and 230 which have received the PREQ transfer the received PREQ because the identifier of the DestSTA field 323 of the received PREQ is not theirs. At the time of this transfer, the information processing devices 210, 220, and 230 increment the value of the HopCount field 325 of the received PREQ. Then, the previously calculated path metric value is stored in the Metric field 326, and the value of the received PREQ is transcribed in the field of another PREQ. In addition, the information processing devices 210, 220, and 230 set a broadcast address for designating each information processing device located nearby as a receiving station in the RX STA ADDR field 302.

Upon receiving the transferred PREQ, for example, the information processing device 240 generates path information destined for the information processing device (destined for the information processing device 100) of which the identifier is stored in the OrigSTA field 322 of the received PREQ in the above-described procedure. Then, the information processing device 240 records the generated path information in the mesh path table 340 as path information of which the recipient is set to the information processing device 100.

Here, as shown in b of FIG. 9, the information processing device 240 receives such PREQ from the information processing devices 220 and 230. When the PREQ has received from a plurality of information processing devices in this manner, the information processing device 240 selects a path having a low path metric value as a valid mesh path, and discards a PREQ having a high path metric value.

In the example shown in FIG. 9, a case in which the path metric value of the PREQ transferred from the information processing device 230 is lower than the path metric value of the PREQ transferred from the information processing device 220 is assumed. In this case, the information processing device 240 generates a mesh path of which the NextHop 342 is set to the information processing device 230 as a mesh path designed for the information processing device 100.

In addition, since the information processing device 240 designates self-device as the DestSTA field 323 of the received PREQ, the device generates a PREP for replying to this PREQ. Thus, as shown in a of FIG. 10, the information processing device 240 transmits the generated PREP by designating the NextHop destined for the OrigSTA field 322 of the PREQ as a receiving station.

In this case, the information processing device 240 transcribes the values stored in the PREQ in the OrigSTA field 332 and the DestSTA field 333, and stores zero as an initial value in the HopCount field 335 and the Metric field 336. In addition, the information processing device 240 stores in the SeqNum 344 the value obtained by incrementing the value stored in the previously transmitted PREQ or PREP. In addition, the information processing device 240 sets the NextHop destined for OrigSTA of the PREQ (the information processing device 230 in this case) in the RX STA ADDR field 302 for transmission to the information processing device 230 in unicast.

Upon receiving the PREP transmitted from the information processing device 240, the information processing device 230 generates path information destined for an information processing device (destined for the information processing device 240) of which the identifier is stored in the DestSTA field 333 of the received PREP in the above-described procedure. Then, the information processing device 230 records the generated path information in the mesh path table 340 as path information of which the destination is set to the information processing device 240. In this manner, upon receiving the PREP transmitted from the information processing device 240, the information processing device 230 generates a mesh path destined for the information processing device 240.

As shown in b of FIG. 10, the identifier of the OrigSTA field 332 of the received PREP is not of the information processing device 230 which has received the PREP. For this reason, the information processing device 230 transfers the received PREP to the information processing device which corresponds to the identifier of the OrigSTA field 332 of the received PREP. At the time of this transfer, the information processing device 230 increments the value of the HopCount field 335 of the received PREP. Then, a path metric value calculated in the above-described procedure is stored by the information processing device 203 in the Metric field 336, and the value of the received PREP is transcribed in the field of another PREP. In addition, in order to transmit the PREP in unicast, the information processing device 230 sets the address of the NextHop 342 of the mesh path destined for the information processing device 100 (the address of the information processing device 100) in the RX STA ADDR field 302. Accordingly, unicast transmission of the PREP from the information processing device 230 to the information processing device 100 is performed as shown in b of FIG. 10.

Upon receiving the PREP transmitted from the information processing device 230, the information processing device 100 generates path information destined for the information processing device of which the identifier is stored in the DestSTA field 333 of the received PREP (destined for the information processing device 240) in the above-described procedure. Then, the information processing device 100 records the generated path information in the mesh path table 340 as path information of which the destination is set to the information processing device 240.

In this manner, the information processing device 100 generates a mesh path destined for the information processing device 240. In addition, since the identifier of the OrigSTA field 332 of the received PREP is of the information processing device 100, the device finishes the bi-directional mesh path generation procedure between the information processing device 100 and the information processing device 240 without performing a successive transfer process.

Thereafter, the mesh path records generated and retained in each of the information processing devices can be referred to before the expiration time (ExpTime 345) of the generated mesh path elapses. For this reason, before the expiration time elapses, when data is exchanged between the information processing device 100 and the information processing device 240, the mesh path records retained in each of the information processing devices can be referred to to perform communication in multi-hop relay.

When there is a mesh path of which the expiration time has arrived, each information processing device destroys the mesh path of which the expiration time has arrived, and re-generates a mesh path destined for the information processing device of which the expiration time has arrived.

It should be noted that, although the mesh path can be generated by exchanging another signal (for example, RANN), description thereof is omitted here.

[Regarding Generation and Maintenance Management of a Mesh Path]

As described above, each of the information processing devices which constitute the communication system 200 exchanges signals (PREQ, PREP, and RANN) to generate and perform maintenance management of a mesh path. Thus, it is important to more appropriately perform generation and maintenance management of a mesh path by making a change or addition to each of the processes. This point will be described below.

[Regarding a Mesh Path Updating Timing]

When there is a mesh path of which the expiration time has arrived, each of the information processing devices which constitute the communication system 200 destroys the mesh path (path information) of which the expiration time has arrived, as described above. Thus, it is not possible to transmit a next data packet for the time until a mesh path is generated again.

Thus, in the first embodiment of the present technology, an example in which a mesh path is updated before the mesh path is destroyed will be shown.

[Regarding a Mesh Path Updating Timing]

When there is a mesh path of which the expiration time has arrived, each of the information processing devices which constitute the communication system 200 destroys the mesh path of which the expiration time has arrived, as described above. Then, generation of a mesh path to a destination station is started. In this case, because a number of PREQs and PREPs are transmitted from the plurality of information processing devices substantially at the same timing, there is concern of radio waves being congested.

Therefore, in the first embodiment of the present technology, an example in which different mesh path generation timings are set for the plurality of information processing devices will be shown.

[Regarding a Value of LifeTime]

Here, a situation of a mesh path is assumed to change due to movement of an information processing device, appearance of a new information processing device, or the like. However, when a situation of a mesh path is not likely to change, for example, if a value of LifeTime is constant, there is concern of the mesh path being unnecessarily updated. On the other hand, when a situation of a mesh path is likely to change, if the value of LifeTime is constant, there is concern of updating of the mesh path being delayed. Thus, it is important to appropriately update a mesh path by appropriately setting the value of LifeTime.

Therefore, in the first embodiment of the present technology, an example in which the value of LifeTime is changed according to a state (for example, a movement state, or a communication state) of an information processing device will be shown.

[Regarding a Metric Value]

The metric value ca can be obtained using the following Expression 1 in, for example, the IEEE 802.11-2012 standard, as described above.

$$ca = [O \pm (Bt/r)]/[1/(1-ef)] \qquad \text{Expression 1}$$

Here, when there is no data communication performed for a long period of time, there are cases in which a data rate is not updated and it is not possible to deal with a change in a situation. In addition, when data communication is performed only for obtaining a metric value, unnecessary traffic occurs.

Thus, in a second embodiment of the present technology, an example in which a metric value is obtained by appropriately using an error rate will be shown.

[Regarding Comparison of Metric Values when a Mesh Path is to be Selected]

A case in which, when a mesh path is to be selected, the metric values of two or more paths are similar is also assumed. In such a case, there is concern of paths being switched each time a mesh path is switched and parameters which are affected by the paths being easily changed.

Therefore, in the second embodiment of the present technology, an example in which frequent switching of mesh paths is prevented by applying hysteresis to selection of a mesh path will be shown.

It should be noted that, as a technology for configuring such a wireless network system described above, the IEEE standard 802.11-2012 (IEEE Standard for Information Technology—Telecommunications and information exchange between systems—Local and metropolitan area networks—Specific requirements Part 11: Wireless LAN Medium Access Control (MAC) and Physical Layer (PHY) Specifications) is widely known.

[Configuration Example of a Mesh Path Table]

FIG. 11 is a diagram schematically showing an example of a mesh path table (mesh path table 350) retained by each information processing device which constitutes the communication system 200 according to the first embodiment of the present technology.

a of FIG. 11 schematically shows a configuration of a mesh path table 350, and b of FIG. 11 shows an example of the content of the mesh path table 350. Specifically, in b of FIG. 11, the Index 346, the data name 347, and the meaning 348 are shown as the example of the content of the mesh path table 350. It should be noted that the mesh path table 350 shown in a and b of FIG. 11 is obtained by changing a part of the mesh path table 340 shown in FIG. 8 and adding new information thereto. Specifically, it is information in which the mesh path expiration time of ExpTime 345 indicated by reference symbol d is set for an updating expiration time for a mesh path and information of reference symbols e and f are newly added. Thus, same reference symbols are given to portions of a and b of FIG. 11 which are the same as those in the mesh path table 340 shown in a and b of FIG. 8 and a part of description thereof will be omitted. In addition, a of FIG. 11 corresponds to a of FIG. 8, and b of FIG. 11 to b of FIG. 8.

As shown in FIG. 11a, the mesh path table 350 is recorded in the memory 150 in a record form. For the sake of facilitating description in the embodiment of the present technology, an example in which the mesh path table 350 produced by adding new information to the mesh path table 340 shown in FIG. 8 is managed as one table is shown. The newly added information (the information of the reference symbols e and f), however, may be managed as a separate table (or in a separate memory) from the mesh path table 340.

In the ExpTime ((ExpireTime)) 345 of "d" of the Index 346, an updating expiration time of the mesh path is stored. This updating expiration time of the mesh path is decided based on the LifeTime fields 327 and 337 (shown in c and d of FIG. 4) of a PREQ or a PREP used in generation of the mesh path.

In the LifeTime 351 of "e" of the Index 346, a lifetime of the mesh path is stored. The lifetime of the mesh path is decided based on the LifeTime fields 327 and 337 (shown in c and d of FIG. 4) of the PREQ or the PREP used in generation of the mesh path.

In the HopCount 352 of "f" of the Index 346, a numerical value indicating the number of hops necessary for delivering a PREP from a transmission source station (an information processing device which has transmitted the PREP first).

[Example in which ExpTime is to Set to be Shorter than LifeTime]

FIG. 12 is a diagram showing generation and updating examples of the mesh path table 350 retained by each of the information processing devices which constitute the communication system 200 according to the first embodiment of the present technology. This generation and updating will be described in detail with reference to FIGS. 9 and 10.

In addition, in this example, an example in which a value of the ExpTime 345 ("d" of the Index 346) (updating expiration time of the mesh path) of the mesh path table 350 shown in FIG. 11 is set to be shorter than a value of LifeTime ("e" of the Index 346) (lifetime of the mesh path) is shown.

Here, a case in which, when the information processing device 100 transmits data to the information processing device 240, the information processing device 100 requests generation of a mesh path between the information processing device 240 will be described with reference to FIGS. 9 and 10.

As shown in a of FIG. 9, the information processing device 100 transmits a PREQ in which the information processing device 240 is designated in the DestSTA field 323 (shown in c of FIG. 4). This PREQ is the same as in the example shown in a of FIG. 9, and thus description thereof will be omitted here.

In addition, when there is no mesh path destined for the information processing device 240, the control unit 140 of the information processing device 100 generates path information of which the destination is the destination station of the PREQ. Here, the destination station of the PREQ is the information processing device of which the identifier is stored in the DestSTA field 323 (shown in c of FIG. 4), which is the information processing device 240 in this example.

For example, the control unit 140 of the information processing device 100 stores the identifier of the information processing device 240 in the Dest 341 as shown in a of FIG. 12. In addition, the control unit 140 of the information processing device 100 stores the sum of the current time (transmission time of the PREQ) and the value (T1) stored in the LifeTime field 327 of the PREQ in the LifeTime 351 ("e" of the Index 346).

In addition, the control unit 140 of the information processing device 100 stores the value obtained by subtracting T2 from the sum of the current time (transmission time of the PREQ) and T1 in the ExpTime 345 ("d" of the Index 346).

Here, when the value stored in the LifeTime field 327 of the PREQ is set to T1, T2 is a value satisfying the following condition.

$$T1 > T2 > 0$$

In addition, the control unit 140 of the information processing device 100 stores the value obtained by adding 1 to the value of the SeqNum field 324 of the PREQ which has been transmitted in the previous round in the SeqNum 344 ("c" of the Index 346).

In addition, the control unit 140 of the information processing device 100 leaves each of the NextHop 342 ("a" of the Index 346), the Metric 343 ("b" of the Index 346), and the HopCount 352 ("f" of the Index 346) undefined.

In this manner, the control unit 140 of the information processing device 100 generates a mesh path destined for the information processing device 240.

In addition, as shown in a of FIG. 9, the information processing devices 210, 220, and 230 receive the PREQ transmitted from the information processing device 100. Upon receiving the PREQ as above, the information processing devices 210, 220, and 230 generate path information destined for the information processing device (destined for the information processing device 100) of which the identifier is stored in the OrigSTA field 322 of the received PREQ. In other words, the information processing devices 210, 220, and 230 record the generated path information in the mesh path table 350 as path information whose destination is the information processing device 100.

As shown in b of FIG. 12, the identifier stored in the OrigSTA field 322 (shown in c of FIG. 4) (the identifier of the information processing device 100) is stored in the Dest 341 of the mesh path table 350 of each of the information processing devices. In addition, the content shown in b of FIG. 12 is stored in each of the NextHop 342, the Metric 343, and the SeqNum 344 of "a" to "c" of the Index 346 of the mesh path table 350.

In addition, each of the information processing devices stores the following value in the LifeTime 351 of "e" of the Index 346 of the mesh path table 350 as shown in b of FIG. 12.

Reception Time of PREQ+T1(value stored in Life-
Time field 327 of PREQ)

Here, when the time stored in the LifeTime 351 arrives, each of the information processing devices destroys the mesh path corresponding thereto and updates the destroyed mesh path. In other words, when the time stored in the LifeTime 351 arrives, each of the information processing devices destroys each record corresponding thereto among records of the mesh path table 350, and updates the destroyed record.

In addition, each of the information processing devices stores the following value in the ExpTime 345 of "d" of the Index 346 of the mesh path table 350 as shown in b of FIG. 12.

Reception time of PREQ+T1(value stored in Life-
Time field 327 of PREQ)−T2

In other words, T1−T2 is set in the ExpTime 345 of "d" of the Index 346 of the mesh path table 350.

In addition, when the time stored in the ExpTime 345 arrives, each of the information processing devices updates the mesh path corresponding thereto. In other words, when the time stored in the ExpTime 345 arrives, each of the information processing devices updates each record corresponding thereto among the records of the mesh path table 350.

In addition, each of the information processing devices stores the value stored in the HopCount field 325 of the PREQ in the HopCount 352 of "f" of the Index 346 of the mesh path table 350 as shown in b of FIG. 12.

In this manner, each of the relay stations (the information processing devices 210, 220, and 230) generates a mesh path destined for the information processing device 100.

In addition, each of the information processing devices 210, 220, and 230 which have received the PREQ transfers the received PREQ as shown in b of FIG. 9 because the identifier in the DestSTA field 323 of the received PREQ is not its own identifier. Since this PREQ to be transferred is the same as in the example shown in b of FIG. 9, description thereof is omitted here.

Upon receiving the PREQ transferred as above, for example, the information processing device 240 generates path information destined for the information processing device (destined for the information processing device 100) of which the identifier is stored in the OrigSTA field 322 of the received PREQ in the above-described procedure. In other words, the information processing device 240 records the generated path information in the mesh path table 350 as path information whose destination is the information processing device 100.

Here, the information processing device 240 receives the PREQ from each of the information processing devices 220 and 230 as shown in b of FIG. 9. Upon receiving the PREQs from the plurality of information processing devices, the information processing device 240 selects a path with a low path metric value as a valid mesh path, and discards the PREQ with a high path metric value.

In this example, the case in which the path metric value of the PREQ transferred from the information processing device 230 is lower than the path metric value of the PREQ transferred from the information processing device 220 is assumed as described above. Thus, the information processing device 240 generates a mesh path for which the NextHop 342 is set to the information processing device 230 as a mesh path destined for the information processing device 100.

In addition, since the information processing device 240 is designated as the DestSTA field 323 of the received PREQ, the device itself generates a PREP to respond to the PREQ. Then, the information processing device 240 transmits the generated PREP by designating the NextHop destined for the OrigSTA field 322 of the PREQ as a receiving station as shown in a of FIG. 10. Since the PREP generated in this case as a transmission target is the same as in the example shown in a of FIG. 10, description thereof is omitted here.

In addition, the identifier stored in the DestSTA field 323 (shown in c of FIG. 4) (the identifier of the information processing device 100) is stored in the Dest 341 of the mesh path table 350 of the information processing device 240. In addition, the content shown in c of FIG. 12 is stored in each of the NextHop 342, the Metric 343, and the SeqNum 344 of "a" to "c" of the Index 346 of the mesh path table 350.

In addition, the information processing device 240 stores the following value in the LifeTime 351 of "e" of the Index 346 of the mesh path table 350 as shown in c of FIG. 12.

Reception time of PREQ+T1(value stored in Life-
Time field 327 of PREQ)

In addition, the information processing device 240 stores the following value in the ExpTime 345 of "d" of the Index 346 of the mesh path table 350 as shown in c of FIG. 12.

Reception time of PREQ+T1(value stored in Life-
Time field 327 of PREQ)−T2

In addition, when the time stored in the LifeTime 351 arrives, the information processing device 240 destroys the mesh path corresponding thereto and updates the destroyed mesh path as described above. In addition, when the time stored in the ExpTime 345 arrives, the information processing device 240 updates the mesh path corresponding thereto.

In addition, the information processing device 240 stores the value stored in the HopCount field 325 of the PREQ in the HopCount 352 of "f" of the Index 346 of the mesh path table 350 as shown in c of FIG. 12.

In addition, the information processing device 240 transmits the generated PREP by designating the NextHop 342 destined for the OrigSTA field 322 of the PREQ as a receiving station. Since the PREP generated in this case as a transmission target is the same as in the example shown in a of FIG. 10, description thereof is omitted here.

In addition, since generation of a mesh path of each of the information processing devices which have received the PREP is the same as in the example shown in a and b of FIG. 10 except for the point that the content of "d" to "f" of the Index 346 of the mesh path table 350 is different, description thereof is omitted here. In addition, since the content of "d" to "f" of the Index 346 of the mesh path table 350 is the same as in the example of each of the information processing devices which has received the above-described PREQ, description thereof is omitted here.

Each of the information processing devices updates the content of the mesh path table 350 as described above. In addition, when the time stored in the LifeTime 351 arrives, each of the information processing devices destroys the mesh path corresponding thereto and updates the destroyed mesh path. However, at the timing at which the earlier time than the time stored in the LifeTime 351 (the time stored in the ExpTime 345) has arrived, each of the information processing devices can update the mesh path corresponding thereto.

In other words, before the path information regarding the mesh path (communication path) set through exchange of the signals such as the PREQ and the PREP is destroyed, the control unit 140 performs control to update the path information. Specifically, the control unit 140 decides an effective time (expiration time) for specifying a time at which the path information is destroyed based on expiration time information included in the signals such as the PREQ and the PREP. In addition, based on the expiration time information included in the signals such as the PREQ and the PREP, the control unit 140 decides an updating time (updating expiration time) for specifying a time during which the path information is updated to be a time shorter than the effective time.

Accordingly, when a multi-hop communication path is generated through the exchange of the signals such as the PREQ and PREP, updating of a mesh path that has already been generated (path information) can be started before the mesh path is destroyed.

[Example in which ExpTime is Changed According to a Position on a Path]

The example in which ExpTime is set to be shorter than LifeTime has been shown above. Here, an example in which ExpTime is changed according to a position on a path will be shown. For example, an interval of updating times of a transmission source station which has transmitted a path setting request (for example, a PREQ) first is set to be the shortest, and an interval of updating times of a destination station of the path setting request is set to be the second shortest. Furthermore, intervals of updating times of relay stations are set to be shorter according to their positions in the order of hopping from the transmission source station.

It should be noted that, in this example, a part of the example in which the above-described ExpTime is set to be shorter than LifeTime is modified, and a part of the mesh path table 350 to be generated (or to be updated) is different. Specifically, the generated content (or updated content) of the ExpTime 345 ("d" of the Index 346) of the mesh path table 350 is different. Thus, the difference will be mainly described below, and a part of description regarding common portions to the above-described example will be omitted.

FIGS. 13 and 14 are diagrams showing generation and updating examples of the mesh path table 350 retained by each of the information processing devices which constitute the communication system 200 according to the first embodiment of the present technology. It should be noted that a of FIG. 13 is the same as the example shown in a of FIG. 12.

Each of relay stations (the information processing devices 210, 220, and 230) stores the next value in the ExpTime 345 of "d" of the Index 346 of the mesh path table 350 as shown in b of FIG. 13.

Reception time of PREQ+T1(value stored in Life-
Time field 327 of PREQ)−T5

Here, when the value stored in the LifeTime field 327 of the PREQ is set to T1, T5 is a value which satisfies the following condition.

$T1>T2>T3>T4 \geq T5>0$

It should be noted that T3 and T4 will be shown below.

As described above, each of the relay stations (the information processing devices 210, 220, and 230) generates a mesh path destined for the information processing device 100.

In addition, the destination station (the information processing device 240) stores the following value in the ExpTime 345 of "d" of the Index 346 of the mesh path table 350.

Reception time of PREQ+T1(value stored in Life-
Time field 327 of PREQ)−T3

Here, when the value stored in the LifeTime field 327 of the PREQ is set to T1, T3 is a value which satisfies the above condition (T1>T2>T3>T4≥T5>0).

In addition, the information processing device 240 transmits the generated PREP by designating the NextHop 342 destined for the OrigSTA field 322 of the PREQ as a receiving station. Since the PREP generated to be transmitted in this case is the same as in the example shown in a of FIG. 10, description thereof is omitted here.

In addition, generation of a mesh path of the relay station (the information processing device 230) which has received the PREP from the information processing device 240 is the same as in the example shown in a and b of FIG. 10 except for the point that the content of the ExpTime 345 ("d" of the Index 346) is different.

Specifically, the relay station (the information processing device 230) stores the following value in the ExpTime 345 of "d" of the Index 346 of the mesh path table 350 as shown in FIG. 14.

Reception time of PREP+T1(value stored in Life-
Time field 337 of PREP)−T4

Here, when the value stored in the LifeTime field 337 of the PREQ is assumed to be T1, T4 is a value satisfying the above-described condition (T1>T2>T3>T4≥T5>0) and the following conditions.

$T4=T3-T5 \times \text{HopCount}(\text{if}(T3-T5 \times (\text{PREP HopCount}+1))>T5)$ $T4=T5(\text{if}(T3-T5 \times (\text{PREP HopCount}+1)) \leq T5)$ As described above, the control unit 140 changes an updating time (updating period) of a mesh path (communication path) based on the position of the information processing device 100 on the mesh path (communication path). In this case, when the information processing device 100 is an information processing device located at an end of the mesh path (communication path), the control unit 140 sets the updating time (updating expiration time) to be shorter than that of another information processing device on the mesh path (communication path). Specifically, the control unit 140 sets the updating time (updating expiration time) to be the shortest when the information processing device 100 is the transmission source station, and sets the updating time (updating expiration time) to be the second shortest when the information processing device 100 is the destination station.

In this manner, for example, the interval of the updating time of the transmission source station which has transmitted the path setting request (for example, a PREQ) first is set to be the shortest, and the interval of the updating time of the destination station of the path setting request is set to be the second shortest. In addition, for example, the interval of the updating time of the relay stations can be set to be shorter according to the orders of hops of the relay stations from the transmission source station.

[Example in which LifeTime is Changed According to the Total Number of Hops]

The example in which ExpTime is changed according to a position on a path has been shown above. Here, an example in which LifeTime is changed according to the total number of hops will be shown.

It should be noted that, in this example, a part of the example in which the above-described ExpTime is set to be shorter than LifeTime is modified, and a part of the mesh path table 350 to be generated (or to be updated) is different. Specifically, the content of generation (or content of updating) of the ExpTime 345 ("d" of the Index 346) and the LifeTime 351 ("e" of the Index 346) of the mesh path table 350 is different. Thus, the differences will be mainly described below, and a part of description regarding common portions to the above-described example will be omitted.

FIGS. 15 and 16 are diagrams showing generation and updating examples of the mesh path table 350 retained by each of the information processing devices which constitute the communication system 200 according to the first embodiment of the present technology.

As shown in a of FIG. 9, the information processing device 100 transmits the PREQ for which the information processing device 240 is designated in the DestSTA field 323 (shown in c of FIG. 4). In this case, when there is no mesh path destined for the information processing device 240, the control unit 140 of the information processing device 100 generates path information of which the destination is set to the destination station of the PREQ.

As shown in a of FIG. 15, for example, the control unit 140 of the information processing device 100 stores the sum of the current time (transmission time of the PREQ) and T6 in the LifeTime 351 ("e" of the Index 346).

In addition, the control unit 140 of the information processing device 100 stores the value obtained by subtracting T2 from the sum of the current time (transmission time of the PREQ) and T6 in the ExpTime 345 ("d" of the Index 346).

Here, when the value stored in the LifeTime field 327 of the PREQ is assumed to be T1, T6 is the value satisfying the following condition.

$$T6=T1>T2>0$$

In this manner, the control unit 140 of the information processing device 100 generates a mesh path destined for the information processing device 240.

In addition, when there is a mesh path destined for the information processing device 240, the value of T6 may be changed according to the value of the HopCount 352 as shown in the following Expression 2.

$$T6=T5\times(HopCount+1) \qquad \text{Expression 2}$$

In this case, in order to prevent the value of ExpTime 345 from being excessively short, an upper limit may be set for the value of T6.

In this manner, the control unit 140 of the information processing device 100 updates the mesh path destined for the information processing device 240.

Each of the relay stations (information processing devices 210, 220, and 230) stores the following value in the ExpTime 345 of "d" of the Index 346 of the mesh path table 350 as shown in b of FIG. 15.

Reception time of PREQ+T1(value stored in Life-
Time field 327 of PREQ)-T5

Here, when the value stored in the LifeTime field 327 of the PREQ is assumed to be T1, T5 is a value satisfying the following condition.

$$T6>T2>T3\geq T4\geq T5>0$$

In this manner, each of the relay stations (information processing devices 210, 220, and 230) generates a mesh path destined for the information processing device 100.

In addition, the destination station (information processing device 240) stores the following value in the ExpTime 345 of "d" of the Index 346 of the mesh path table 350.

Reception time of PREQ+T1(value stored in the
LifeTime field 327 of PREQ)-T3

Here, T3 may be changed according to the value of T6. For example, T3=T7 (a constant) is possible.

In addition, the information processing device 240 transmits the generated PREP by designating the NextHop 342 destined for the OrigSTA field 322 of the PREQ as a receiving station. Since the PREP generated to be transmitted in this case is the same as in the example shown in a of FIG. 10, description thereof is omitted here.

In addition, generation of a mesh path by a relay station (information processing device 230) which has received the PREP from the information processing device 240 is the same as in the example shown in a and b of FIG. 10 except for the point that the content of the ExpTime 345 ("d" of the Index 346) is different.

Specifically, the relay station (information processing device 230) stores the following value in the ExpTime 345 of "d" of the Index 346 of the mesh path table 350 as shown in FIG. 16.

Reception time of PREP+T1(value stored in the
LifeTime field 337 of the PREP)-T4

Here, T4 is set to be a value satisfying the above-described condition (T6>T2>T3>T4≥T5>0) and the following conditions.

$$T4=T3-T5\times HopCount(if(T3-T5\times(PREP\ HopCount+1))>T5)$$

$$T4=T5(if(T3-T5\times(PREP\ HopCount+1))\leq T5)$$

In this manner, the control unit 140 changes the lifetime (expiration time) of the mesh path (communication path) based on the number of relay stations.

[Example in which the LifeTime is Changed According to a Situation of a Path]

The example in which the ExpTime is changed has been shown above.

Here, an example in which the LifeTime is changed according to a situation of a path will be shown. When a situation of a path is not changed (for example, adjacent similar information processing devices are consecutively selected), for example, a value of the LifeTime can be increased (the expiration time can be extended).

It should be noted that, in this example, a part of the example in which the above-described ExpTime is set to be shorter than LifeTime is modified, and a part of the mesh path table 350 to be generated (or to be updated) is different. Thus, the differences will be mainly described below, and a part of description regarding common portions to the above-described example will be omitted.

[Configuration Example of a Mesh Path Table]

Figure 17:
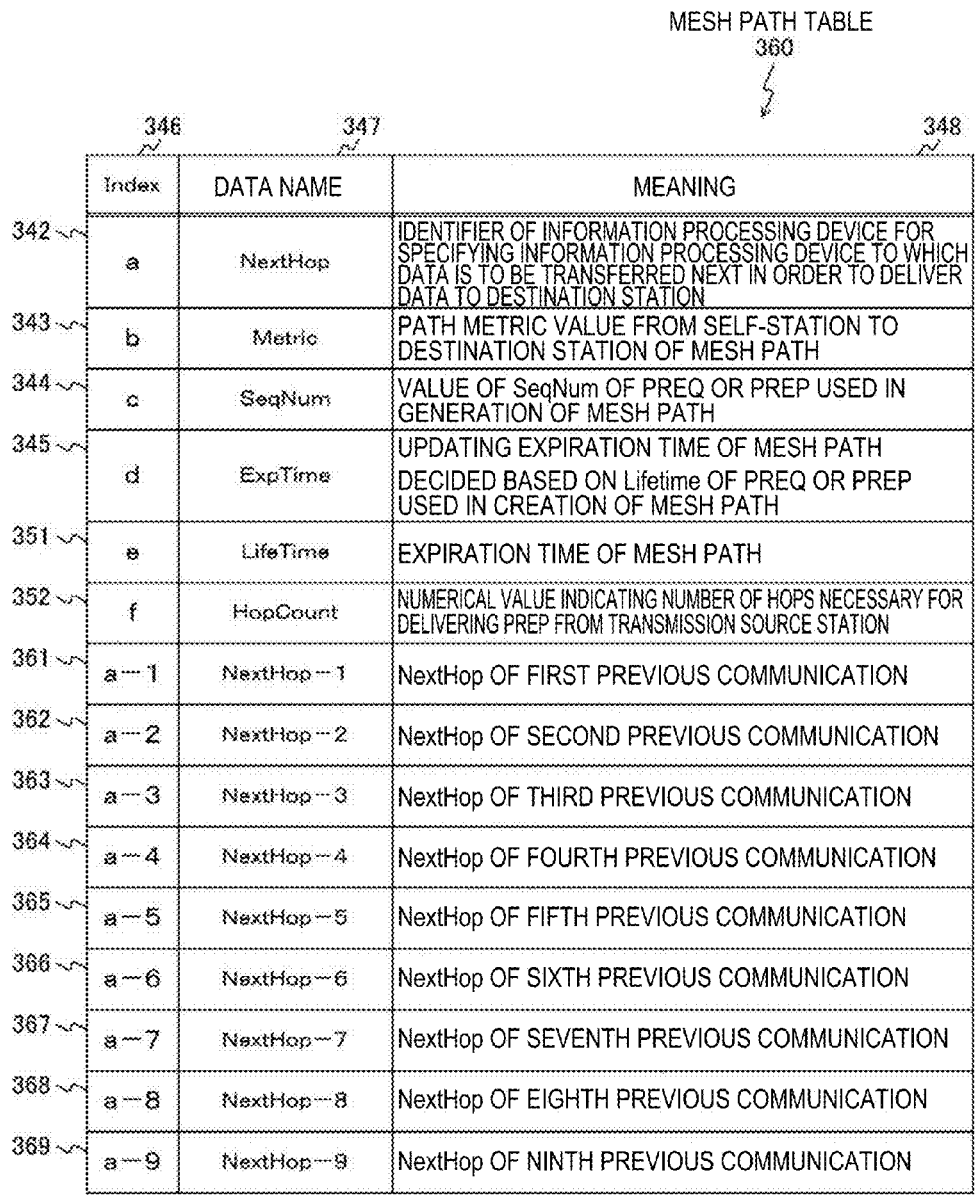
FIG. 17 is a diagram schematically showing still another example of the mesh path table (mesh path table 360) retained by each of the information processing devices which constitute the communication system 200 according to the first embodiment of the present technology.
Figure 20:
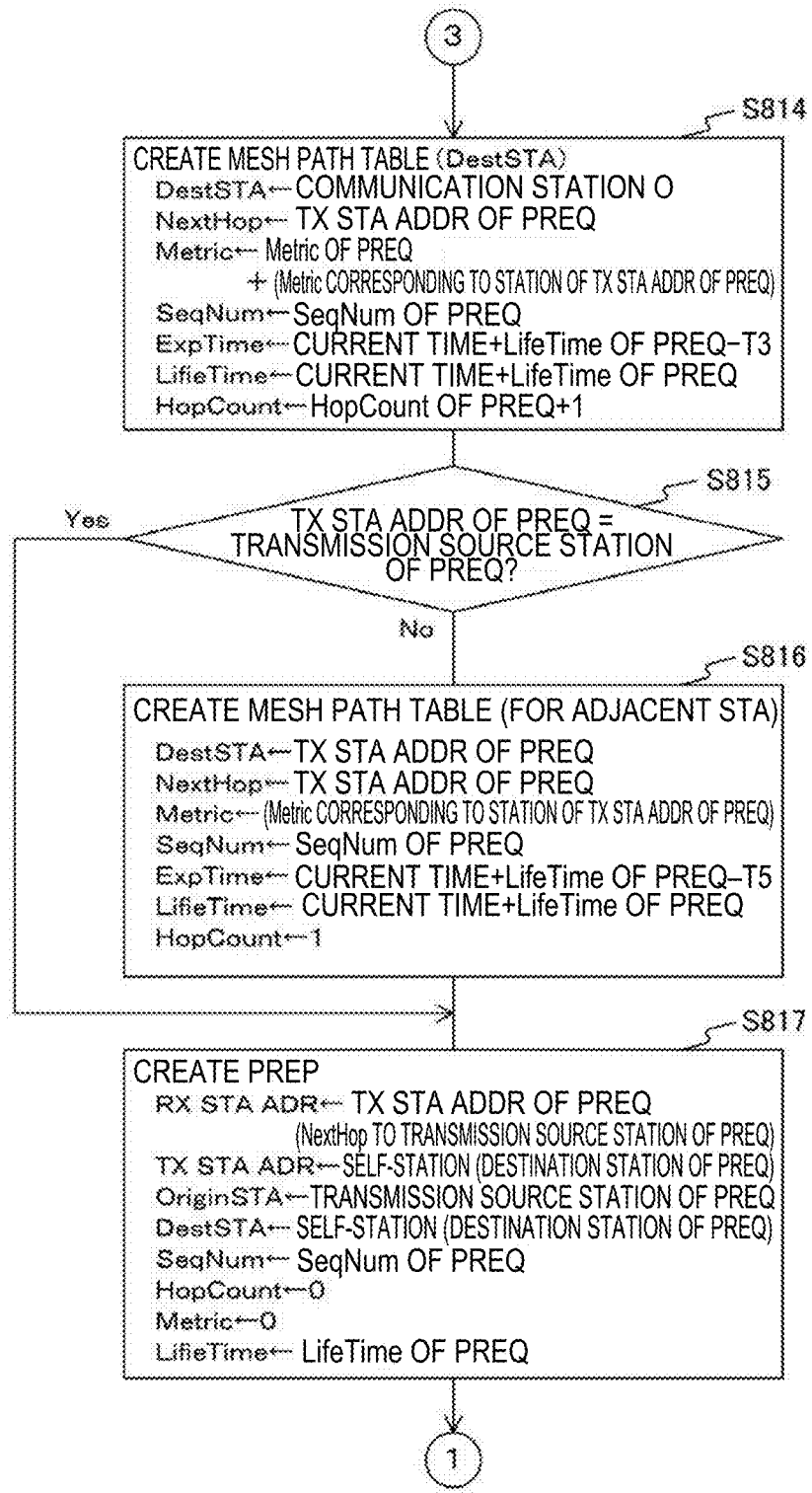
FIG. 20 is a flowchart showing an example of the procedure of signal processing by the information processing device 100 according to the first embodiment of the present technology.
Figure 21:
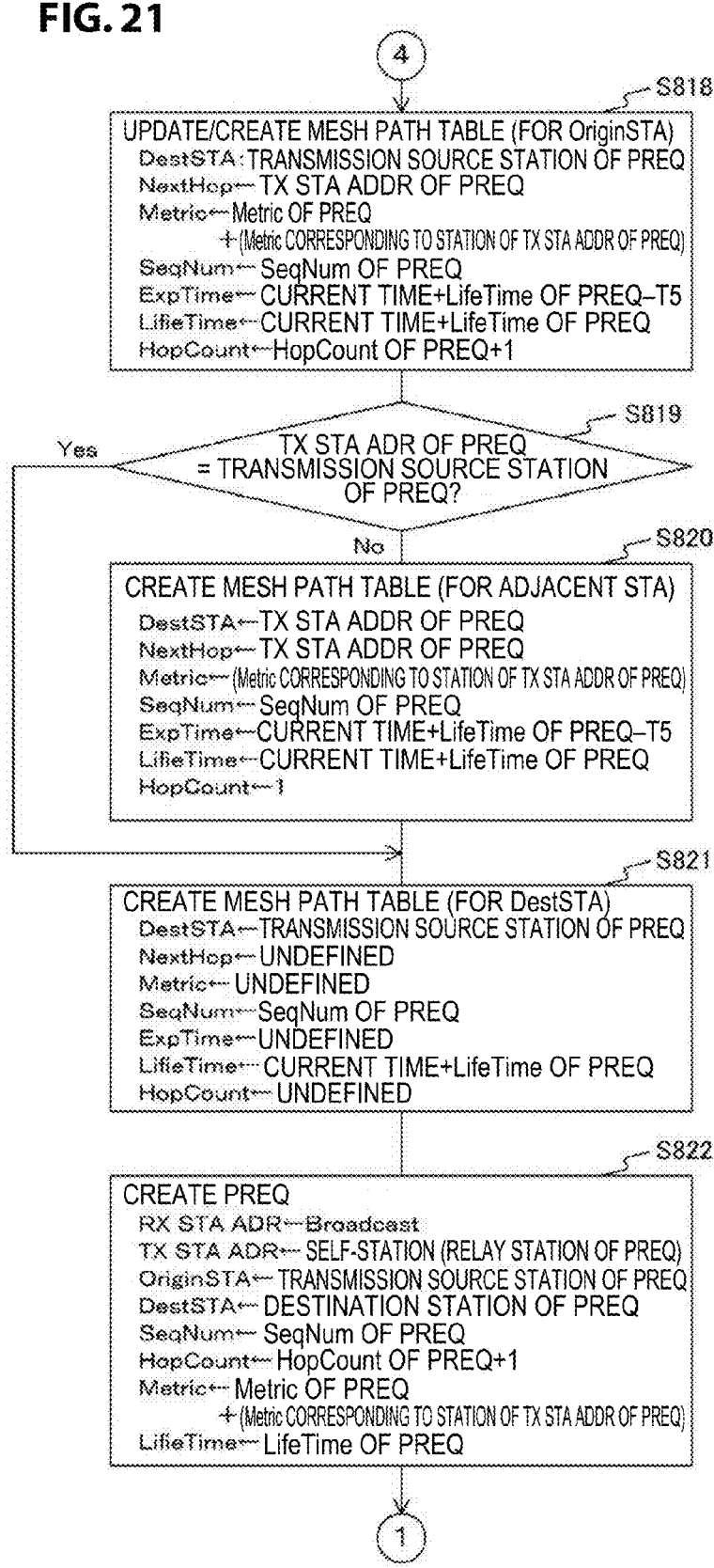
FIG. 21 is a flowchart showing an example of the procedure of signal processing by the information processing device 100 according to the first embodiment of the present technology.
Figure 22:
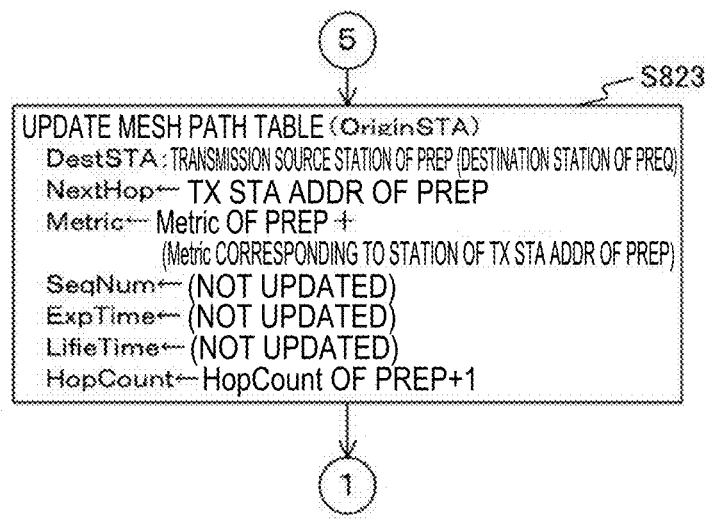
FIG. 22 is a flowchart showing an example of the procedure of signal processing by the information processing device 100 according to the first embodiment of the present technology.
Figure 23:
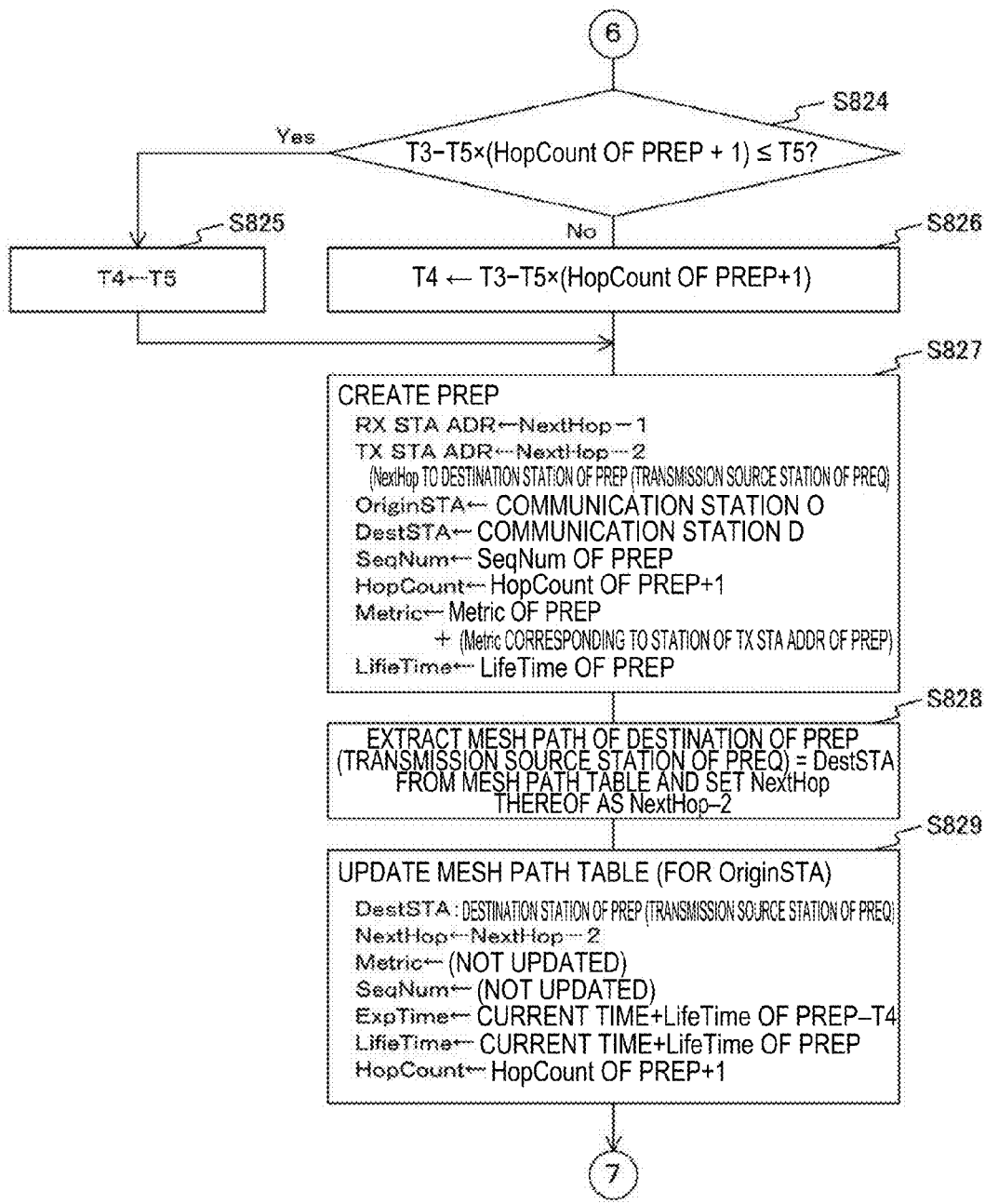
FIG. 23 is a flowchart showing an example of the procedure of signal processing by the information processing device 100 according to the first embodiment of the present technology.

FIG. 17 is a diagram schematically showing still another example of the mesh path table (mesh path table 360) retained by each of the information processing devices which constitute the communication system 200 according to the first embodiment of the present technology. Since a configuration of the mesh path table 360 has the same form as in the example shown in a of FIG. 11, illustration thereof is omitted here.

In addition, in FIG. 17, the Index 346, the data name 347, and the meaning 348 are shown as examples of the content of the mesh path table 360. The mesh path table 360 shown in FIG. 17 is obtained by adding new information to the mesh path table 350 shown in FIG. 11. Specifically, information of reference symbols a-1 to a-9 is newly added information. Thus, in FIG. 17, the same reference symbols are given to portions common to those of the mesh path table 350 shown in FIG. 11 and part of description thereof will be omitted. Furthermore, FIG. 17 corresponds to b of FIG. 11.

In a NextHop-1 (361) of "a-1" of the Index 346, the identifier of the NextHop 342 of "a" of the Index 346 stored just before is stored. In other words, in the NextHop-1 (361) of "a-1" of the Index 346, the identifier of the NextHop 342 of 1 previous communication is stored.

Likewise in a NextHop-2 (362) to a NextHop-9 (369) of "a-2" to "a-9" of the Index 346, the identifiers of the NextHop 342 of "a" of the Index 346 previously stored are stored. In other words, in the NextHop-2 (362) to the NextHop-9 (369) of "a-2" to "a-9" of the Index 346, the identifiers of the NextHop 342 of 2 to 9 previous communications are stored.

It should be noted that the initial values of the NextHop-1 (361) to the NextHop-9 (369) of "a-1" to "a-9" of the Index 346 are set to 0.

[Generation and Updating Examples of a Mesh Path Table]

FIG. 18 is a diagram showing generation and updating examples of the mesh path table 350 retained by each of the information processing devices which constitute the communication system 200 according to the first embodiment of the present technology.

As shown in a of FIG. 9, the information processing device 100 transmits the PREQ by designating the information processing device 240 in the DestSTA field 323 (shown in c of FIG. 4). In this case, when there is no mesh path destined for the information processing device 240, the control unit 140 of the information processing device 100 generates path information of which the destination is set to the destination station of the PREQ.

Here, when there is a mesh path destined for the information processing device 240, the control unit 140 of the information processing device 100 extracts the same identifiers as those stored in the current NextHop 342 from the identifiers stored in the past NextHop 342 and counts the number. In other words, the control unit 140 of the information processing device 100 compares each of the identifiers stored in the NextHop-1 (361) to the NextHop-9 (369) to the identifier stored in the NextHop 342. Then, the control unit 140 of the information processing device 100 extracts identifiers which coincide with each other from the identifiers and counts the number.

Subsequently, the control unit 140 of the information processing device 100 sets a value T10 which relates to the expiration time to be stored in the LifeTime 351 according to the number of coinciding identifiers. For example, when the number of coinciding identifiers is 3 or lower, T10=T1 (value stored in the LifeTime field 337 of the PREP) is set. In addition, when the number of coinciding identifiers is 4 or higher and 7 or lower, T10=T1×2 is set. In addition, when the number of coinciding identifiers is 8 or higher, T10=T1×3 is set. T10, however, is set to be a value satisfying the following condition.

$$T10 > T2 > 0$$

The control unit 140 of the information processing device 100, for example, stores the sum of the current time (transmission time of the PREQ) and T10 in the LifeTime 351 ("e" of the Index 346) as shown in a of FIG. 18.

In addition, the control unit 140 of the information processing device 100 stores the value obtained by subtracting T2 from the sum of the current time (transmission time of the PREQ) and T10 in the ExpTime 345 ("d" of the Index 346).

It should be noted that, although the example in which the identifier of the NextHop 342 of the 9 previous communications is retained has been shown in this example, the identifiers of the NextHop 342 of a value other than the 9 previous communications (8 previous communications or less and 10 previous communications or more) may be retained and used.

In addition, although the example in which T10 is set based on the number of coinciding identifiers among those of the NextHop 342 of a plurality of previous communications has been shown in this example, T10 may be set based on the number of consecutive identifiers among those of the NextHop 342 of the plurality of previous communications.

In this manner, the control unit 140 of the information processing device 100 updates the mesh path destined for the information processing device 240.

It should be noted that b and c of FIG. 18 are the same as the example shown in b and c of FIG. 15 except for the point that the conditions for T3 to T5 are different. In addition, the content of updating the relay station which has received the PREP (FIG. 16) is the same as the example shown in FIG. 16 except for the point that the condition of T4 is different. Thus, description thereof is omitted here.

It should be noted that T3 to T5 are set to have values satisfying the following condition.

$$T10 > T2 > T3 > T4 \geq T5 > 0$$

As described above, when the same communication path is consecutively selected as a mesh path (communication path) updated through exchange of signals such as the PREQ and the like, the control unit 140 lengthens the effective time (expiration time) and updating time (updating expiration time). Likewise, when a rate of selection of the same mesh path (communication path) is higher than a predetermined value, the control unit 140 lengthens the effective time (expiration time) and updating time (updating expiration time).

It should be noted that the control unit 140 of the information processing device 100 may transmit a PREQ by setting the value of the LifeTime field 327 to be T10. In this case, the updating expiration time and expiration time of a relay station and the destination station of the PREQ are decided with reference to T10.

[Example in which the LifeTime is Changed According to a Situation of a Link]

The example in which the LifeTime is changed according to a situation of a path has been shown above. Here, an example in which the LifeTime is changed according to a situation of a link will be shown. When a situation of a link is good (for example, the electric field intensity of an information processing device designated as a next hop destination is higher than a threshold value), for example, the value of the LifeTime can be set to be high (the expiration time can be delayed). In addition, when a situation of a link is bad (for example, the electric field intensity of an information processing device designated as a next hop destination is equal to or lower than the threshold value), for example, the value of the LifeTime can be set to be low (the expiration time can be advanced).

It should be noted that, in this example, a part of the example in which the above-described ExpTime is set to be shorter than LifeTime is modified, and a part of the mesh path table 350 to be generated (or to be updated) is different. Thus, the differences will be mainly described, and a part of description regarding common portions to the above-described example will be omitted.

In addition, since the content of updating is the same as that of FIG. 18, it will be described with reference to FIG. 18 in this example.

As shown in a of FIG. 9, the information processing device 100 transmits the PREQ by designating the information processing device 240 in the DestSTA field 323 (shown in c of FIG. 4). In this case, when there is no mesh path destined for the information processing device 240, the control unit 140 of the information processing device 100 generates path information of which the destination is set to the destination station of the PREQ as described above.

Here, when there is a mesh path destined for the information processing device 240, the control unit 140 of the information processing device 100 sets a value of the LifeTime according to the value of the electric field intensity of the information processing device of the NextHop 342. Here, the electric field intensity is, for example, a Received Signal Strength Indicator (RSSI).

When the RSSI is lower than −70 dBm, for example, the control unit 140 of the information processing device 100 sets T10=T1×0.8. In addition, when the RSSI is −70 dBm or greater and lower than −60 dBm, the control unit 140 of the information processing device 100 sets T10=T1. Furthermore, when the RSSI is −60 dBm or greater and lower than −40 dBm, the control unit 140 of the information processing device 100 sets T10=T1×2. In addition, when the RSSI is −40 dBm or greater, the control unit 140 of the information processing device 100 sets T10=T1×3.

In other words, T10 is set as follows.

$T10=T1\times 0.8$ if RSSI<−70 dBm $T10=T1$ if −70 dBm≤RSSI<−60 dBm $T10=T1\times 2$ if −60 dBm≤RSSI<−40 dBm $T10=T1\times 3$ if −40 dBm≤RSSI Here, T10 is set to be a value satisfying the following condition.

$T10>T2>0$

It should be noted that, when there is no mesh path destined for the information processing device 240, the control unit 140 of the information processing device 100 may set T10=T1.

The control unit 140 of the information processing device 100 stores, for example, the sum of the current time (transmission time of the PREQ) and T10 in the LifeTime 351 ("e" of the Index 346) as shown in a of FIG. 18.

In addition, the control unit 140 of the information processing device 100 stores the value obtained by subtracting T2 from the sum of the current time (transmission time of the PREQ) and T10 in the ExpTime 345 ("d" of the Index 346).

In this manner, the control unit 140 of the information processing device 100 generates or updates the mesh path destined for the information processing device 240.

It should be noted that generation or updating of a mesh path of a relay station and the destination station of the PREQ and a relay station of the PREP is the same as in the example in which the LifeTime is changed according to a situation of a path. Thus, description thereof is omitted here.

As described above, when the electric field intensity of an information processing device set as a next transmission destination on a mesh path (communication path) is set to be higher than the threshold value, the control unit 140 lengthens the effective time (expiration time) and the updating time (updating expiration time). On the other hand, when the electric field intensity of an information processing device set as a next transmission destination is set to be lower than the threshold value, the control unit 140 shortens the effective time (expiration time) and the updating time (updating expiration time).

[Example in which the LifeTime is Changed According to a Movement State of an Information Processing Device]

The examples in which the LifeTime is changed according to situations of a path and a link have been described above. An example in which the LifeTime is changed according to a movement state of an information processing device will be shown here. In a state in which an information processing device is moving, for example, a value of the LifeTime is set to be small (the expiration time is advanced).

It should be noted that, in this example, a part of the example in which the above-described ExpTime is set to be shorter than the LifeTime is modified, and a part of the mesh path table 350 to be generated (or to be updated) is different. Thus, the differences will be mainly described below, and a part of description regarding common portions to the above-described example will be omitted.

In addition, since the content of updating is the same as in FIG. 18, it will be described with reference to FIG. 18 in this example.

As shown in a of FIG. 9, the information processing device 100 transmits the PREQ by designating the information processing device 240 in the DestSTA field 323 (shown in c of FIG. 4). In this case, when there is no mesh path destined for the information processing device 240, the control unit 140 of the information processing device 100 generates path information of which the destination is set to the destination station of the PREQ as described above. In addition, when there is a mesh path destined for the information processing device 240, the control unit 140 of the information processing device 100 updates the path information of which the destination is set to the destination station of the PREQ as described above.

Here, the control unit 140 of the information processing device 100 determines whether or not movement of the information processing device 100 has been detected. The control unit 140 of the information processing device 100 can detect movement of the information processing device 100 based on movement information output from, for example, the movement detection unit 171. In addition, the control unit 140 of the information processing device 100 can detect movement of the information processing device 100 based on, for example, a movement distance of the information processing device 100 computed by the movement detection unit 171. It should be noted that the control unit 140 of the information processing device 100 may detect movement of the information processing device 100 based on, for example, a change of an electric field intensity (for example, the RSSI). The control unit 140 of the information processing device 100 determines, for example, whether or not a change of the electric field intensity (a change per unit time) acquired by the information processing device 100 is equal to or greater than a predetermined value, and can detect movement of the information processing device 100 based on the determination result.

Then, the control unit 140 of the information processing device 100 sets T10 =T1×0.8 when movement of the information processing device 100 has been detected. In addition, when no movement of the information processing device 100 has been detected (i.e., movement of the information processing device 100 stops), the control unit 140 of the information processing device 100 sets T10=T1. It should be noted that T10 is set to be a value satisfying the following condition.

$T10>T2>0$

For example, the control unit 140 of the information processing device 100 stores the sum of the current time (transmission time of the PREQ) and T10 in the LifeTime 351 ("e" of the Index 346) as shown in a of FIG. 18.

In addition, the control unit 140 of the information processing device 100 stores the value obtained by subtracting T2 from the sum of the current time (transmission time of the PREQ) and T10 in the ExpTime 345 ("d" of the Index 346).

In this manner, the control unit 140 of the information processing device 100 generates or updates the mesh path destined for the information processing device 240.

It should be noted that the value of T10 may be set more finely according to a movement speed or a movement distance of the information processing device 100.

It should be noted that generation or updating of a mesh path of a relay station and the destination station of the PREQ and a relay station of the PREP is the same as in the example in which the LifeTime is changed according to a situation of a path. Thus, description thereof is omitted here.

As described above, when the information processing device 100 is moving, the control unit 140 shortens the effective time (expiration time) and updating time (updating expiration time).

[Example in which the LifeTime is Changed According to Presence or Absence of a Path Candidate]

The examples in which the LifeTime is changed according to situations of a path and a link and a movement state of the information processing device have been shown above. Here, an example in which the LifeTime is changed according to presence or absence of a path candidate of an information processing device will be shown. When an information processing device is assumed to serve as a path candidate, for example, a value of the LifeTime is set to decrease (the expiration time is advanced). Here, the case in which an information processing device is assumed to serve as a path candidate is a case in which, for example, the electric field intensity of another information processing device (an adjacent station) which is not designated as a next hop destination is higher than a threshold value.

It should be noted that, in this example, a part of the example in which the above-described ExpTime is set to be shorter than the LifeTime is modified, and a part of the mesh path table 350 to be generated (or to be updated) is different. Thus, the differences will be mainly described below, and a part of description regarding common portions to the above-described example will be omitted.

In addition, since the content of updating is the same as in FIG. 18, it will be described with reference to FIG. 18 in this example.

As shown in a of FIG. 9, the information processing device 100 transmits the PREQ by designating the information processing device 240 in the DestSTA field 323 (shown in c of FIG. 4). In this case, when there is no mesh path destined for the information processing device 240, the control unit 140 of the information processing device 100 generates path information of which the destination is set to the destination station of the PREQ as described above. In addition, when there is a mesh path destined for the information processing device 240, the control unit 140 of the information processing device 100 updates the path information of which the destination is set to the destination station of the PREQ as described above.

Here, the control unit 140 of the information processing device 100 determines, for example, whether or not the electric field intensity of an information processing device (an adjacent station) that is not designated in the NextHop 342 is higher than a threshold value. For example, the control unit 140 of the information processing device 100 determines whether or not the electric field intensity (RSSI) of an information processing device whose identifier is not stored in the NextHop 342 is equal to or higher than the threshold value (−60 dBm). Then, when the electric field intensity (RSSI) of the information processing device is less than the threshold value (−60 dBm), T10=T1 is set. In addition, when the electric field intensity (RSSI) of the information processing device is equal to or higher than the threshold value (−60 dBm), T10=T1×0.8 is set.

In other words, T10 is set as follows.

$T10=T1$ if RSSI<−60 dBm $T10=T1\times 0.8$ if −60 dBm≤RSSI

Here, T10 is set to be a value satisfying the following condition.

$T10>T2>0$

It should be noted that, in this example, the example in which the LifeTime is changed using the electric field intensity of an information processing device (adjacent station) which is not designated in the NextHop 342 is shown; however, the LifeTime may be changed using the difference between the electric field intensity of the information processing device of the NextHop 342.

For example, the difference between the electric field intensity of an information processing device that is not the NextHop 342 (RSSI OTHERS) and the electric field intensity of the information processing device of the NextHop (RSSI NEXT) is computed. Then, based on whether or not the difference is greater than a threshold value (for example, 20 dBm), the LifeTime may be changed. In other words, the LifeTime can be changed based on whether or not the electric field intensity of an information processing device that is not the NextHop 342 (RSSI OTHERS)−the electric field intensity of the information processing device of the NextHop 342 (RSSI NEXT)>20 dBm is satisfied.

For example, the control unit 140 of the information processing device 100 stores the sum of the current time (transmission time of the PREQ) and T10 in the LifeTime 351 ("e" of the Index 346) as shown in a of FIG. 18.

In addition, the control unit 140 of the information processing device 100 stores the value obtained by subtracting T2 from the sum of the current time (transmission time of the PREQ) and T10 in the ExpTime 345 ("d" of the Index 346).

In this manner, the control unit 140 of the information processing device 100 generates or updates the mesh path destined for the information processing device 240.

It should be noted that the value of T10 may be set more finely.

In addition, generation or updating of a mesh path of a relay station and the destination station of the PREQ and a relay station of the PREP is the same as in the example in which the LifeTime is changed according to a situation of a path. Thus, description thereof is omitted here.

As described above, when the electric field intensity of an information processing device which is not designated as the next transmission destination on a mesh path (communication path) is greater than the threshold value, the control unit 140 shortens the effective time (expiration time) and updating time (updating expiration time).

[Example of a Path Search Start Timing According to a Situation of a Link]

Here, an example in which a path search start timing is set according to a situation of a link will be shown. When a situation of a link is bad, for example, it is controlled to start path search.

For example, the control unit 140 of the information processing device 100 monitors packet loss of each adjacent station (each of the information processing devices (for example, the information processing devices 210, 220, and 230 shown in FIG. 1) which is directly linked to the information processing device 100). Then, the control unit 140 of the information processing device 100 determines whether or not there is one with a packet error rate exceeding a threshold value (one with the number of packet losses exceeding the threshold value) among the information processing devices whose identifiers are stored in the NextHop 342. As a result of the determination, when there is an information processing device with a packet error rate exceeding the threshold value, the control unit 140 of the information processing device 100 starts updating of a mesh path of another information processing device passing through the foregoing information processing device. In other words, the setting of the path of the other information processing device passing through the foregoing information processing device is updated.

In this manner, when there is an information processing device with the number of packet losses greater than the threshold value among information processing devices designated as the next transmission destinations on a mesh path (communication path), the control unit 140 transmits a signal (PREQ) for updating the communication path. This signal is transmitted to another information processing device (destination of the mesh path) on the mesh path (communication path) including the foregoing information processing device.

[Example of a Path Search Start Timing when a New Link has been Established]

Here, an example in which a path search start timing is set when a new link has been established will be shown.

For example, when a new link has been established with an adjacent information processing device, the control unit 140 of the information processing device 100 starts updating of a mesh path to the foregoing information processing device. In other words, a setting of the path to the information processing device is started.

In this case, the control unit 140 of the information processing device 100 may set, for example, a random delay time before updating of the mesh path is started (before a search for the path is started). Then, when the setting of the path is to be started, the control unit 140 of the information processing device 100 starts the setting of the path after the set random delay time elapses. Accordingly, the information processing devices can be caused not to simultaneously start updating of the mesh path.

In this manner, when there is an information processing device of which a new link has been established with the information processing device 100, the control unit 140 transmits a signal for updating the mesh path (communication path) to another information processing device on the mesh path (communication path) including the foregoing information processing device. In this case, the control unit 140 transmits the signal for updating the mesh path (communication path) by setting a random delay time.

[Example of a Path Search Start Timing when a Link is Disconnected]

Here, an example in which a path search start timing is set when a link is disconnected will be shown.

For example, when a link with an information processing device whose identifier is stored in the NextHop 342 is disconnected, updating of a mesh path to another information processing device passing through the foregoing information processing device is started up. In other words, a setting of the path to the other information processing device passing through the foregoing information processing device is started.

As described above, when a link with an information processing device that is the next transmission destination of a mesh path (communication path) is disconnected, the control unit 140 transmits a signal for updating the mesh path (communication path) to another information processing device on the mesh path (communication path) including the foregoing information processing device.

[Operation Example of an Information Processing Device]

Figure 24:
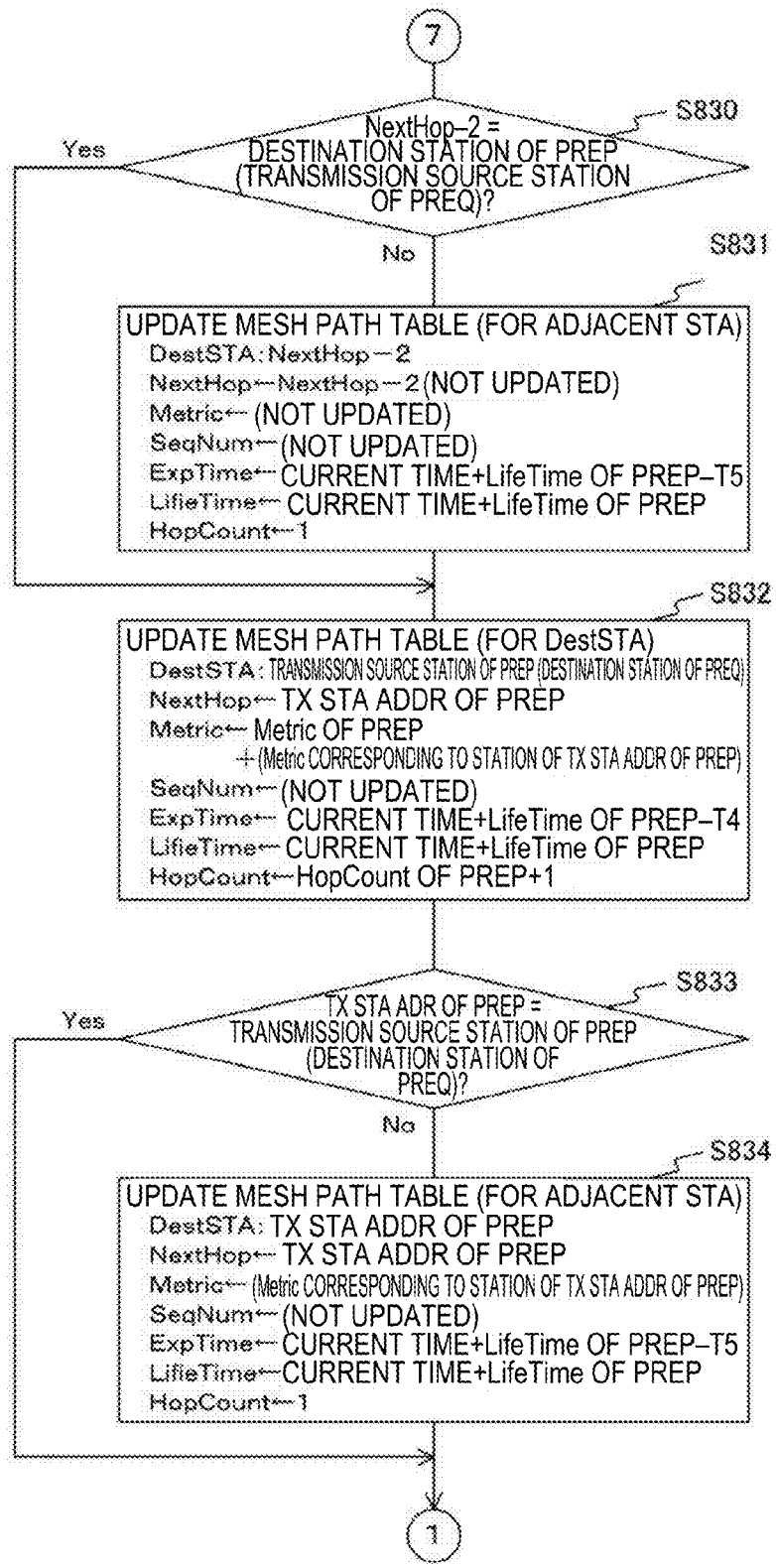
FIG. 24 is a flowchart showing an example of the procedure of signal processing by the information processing device 100 according to the first embodiment of the present technology.

FIGS. 19 to 24 are flowcharts showing an example of the procedure of signal processing by the information processing device 100 according to the first embodiment of the present technology. In FIGS. 19 and 24, a signal processing example corresponding to the example in which the ExpTime is changed according to a position on a path (shown in FIGS. 13 and 14) is shown.

First, the control unit 140 determines whether or not there is a transmission request for a PREQ (Step S801). When there is a transmission request for a PREQ (Step S801), the control unit 140 creates a mesh path table for the destination station of the PREQ (Step S802), and proceeds to Step S805.

When there is no transmission request for a PREQ (Step S801), the control unit 140 determines whether or not there is a mesh path table in which an updating expiration time stored in the ExpTime 345 is past the current time (Step S803). When there is a mesh path table in which the updating expiration time is past the current time (Step S803), the control unit 140 updates the mesh path table for the destination station (Step S804). Subsequently, the control unit 140 creates a PREQ and transmits the signal to the destination station (Step S805).

When there is no mesh path table in which the updating expiration time is past the current time (Step S803), the control unit 140 determines whether or not there is a mesh path table in which the expiration time stored in the LifeTime 351 is past the current time (Step S806). When there is a mesh path table in which the expiration time is past the current time (Step S806), the control unit 140 determines whether or not the ExpTime 345 of the mesh path table is undefined (Step S807).

Then, when the ExpTime 345 of the mesh path table is undefined (Step S807), the control unit 140 deletes the mesh path table (Step S808) and returns to Step S801. On the other hand, when the ExpTime 345 of the mesh path table is undefined (Step S807), the control unit returns to Step S802.

When there is no mesh path table in which the expiration time is past the current time (Step S806), the control unit 140 receives the PREQ and determines whether or not the identifier of the DestSTA 323 is of its own station (Step S809).

When the PREQ is unreceived or the identifier of the DestSTA 323 is not of its own station (Step S809), the control unit 140 receives the PREQ and determines whether or not the identifier of the DestSTA 323 is of another station (Step S810). It should be noted that another station refers to one of the information processing stations other than the information processing device 100.

When the PREQ is unreceived or the identifier of the DestSTA 323 is not of another station (Step S810), the control unit 140 receives a PREP and determines whether or not the identifier of the OrigSTA 332 is of its own station (Step S811).

When the PREP is unreceived or the identifier of the DestSTA 323 is not of its own station (Step S811), the control unit 140 receives the PREP and determines whether or not the identifier of the OrigSTA 332 is of another station (Step S812).

When the PREP is unreceived or the identifier of the DestSTA 323 is not of another station (Step S812), the control unit 140 does whether or not there is an instruction to finish the communication process (Step S813). Then, when there is an instruction to finish the communication process (Step S813), the operation of the communication process ends, and when there is no instruction to finish the communication process, the control unit returns to Step S801.

In addition, when the PREQ has been received and the identifier of the DestSTA 323 is of its own station (Step S809), the control unit 140 creates a mesh path table for the transmission source station of the received PREQ (Step S814).

Subsequently, the control unit 140 determines whether or not the identifier of the TX STA ADDR 303 of the received PREQ is of the transmission source station (Step S815), and when the identifier is of the transmission source station, the control unit proceeds to Step S817.

When the identifier is not of the transmission source station (Step S815), the control unit 140 creates a mesh path table for the transmitting station of the received PREQ (Step S816). Subsequently, the control unit 140 creates a PREP in response to the received PREQ, transmits the signal to the transmission source station of the received PREQ (Step S817), and returns to Step S801.

In addition, when the PREQ has been received and the identifier of the DestSTA 323 is of another station (Step S810), the control unit 140 updates or creates a mesh path table for the transmission source station of the received PREQ (Step S818).

Subsequently, the control unit 140 determines whether or not the identifier of the TX STA ADDR 303 of the received PREQ is of the transmission source station (Step S819), and when the identifier is of the transmission source station, the control unit proceeds to Step S821.

When the identifier is not of the transmission source station (Step S819), the control unit 140 creates a mesh path table for the transmitting station of the received PREQ (Step S820). Subsequently, the control unit 140 creates a mesh path table for the transmission source station of the received PREQ (Step S821). Subsequently, the control unit 140 creates a PREQ for transferring the received PREQ, transmits the PREQ in broadcast (Step S822), and returns to Step S801.

In addition, when the PREP has been received and the identifier of the OrigSTA 332 is of its own station (Step S811), the control unit 140 updates a mesh path table for the transmission source station of the received PREP (Step S823). Then, the control unit returns to Step S801.

In addition, when the PREP has been received and the identifier of the OrigSTA 332 is of another station (Step S812), the control unit 140 determines whether or not the result of T3 −T5 ×(HopCount of the PREP+1) is T5 or smaller (Step S824). When the result of T3−T5×(HopCount of the PREP+1) is T5 or smaller (Step S824), the control unit 140 sets T4=T5 (Step S825). On the other hand, when the result of T3−T5×(HopCount of the PREP+1) exceeds T5 (Step S824), the control unit 140 sets T4=T3−T5×(HopCount of the PREP+1) (Step S826).

Then, the control unit 140 creates a PREP for transferring the received PREP and transmits the PREP (Step S827).

Then, the control unit 140 extracts a mesh path for which the transmission source station of the received PREP is set to the Dest 341 from the mesh path table, and sets the NextHop 342 of the mesh path as the NextHop-2 (Step S828).

Then, the control unit 140 updates the mesh path table for the transmission source station of the received PREP (Step S829).

Then, the control unit 140 determines whether or not the NextHop-2 is the transmission source station (OrigSTA) (Step S830), and when the NextHop-2 is the transmission source station (OrigSTA), the control unit proceeds to Step S832. On the other hand, when the NextHop-2 is not the transmission source station (OrigSTA) (Step S830), the control unit 140 updates the mesh path table for the NextHop-2 (Step S831).

Subsequently, the control unit 140 updates the mesh path table for the received PREP (Step S832). Subsequently, the control unit 140 determines whether or not the identifier of the TX STA ADDR 303 of the PREP is of the transmission source station (destination station of the PREQ) (Step S833), and when the identifier is of the transmission source station (destination station of the PREQ), the control unit returns to Step S801.

When the identifier is not of the transmission source station (destination station of the PREQ) (Step S833), the control unit 140 creates a mesh path table for the transmitting station of the received PREP (Step S834), and returns to Step S801.

According to the first embodiment of the present technology described above, the updating expiration time (ExpTime) of a mesh path is set to be sooner than the expiration time (LifeTime) of the mesh path. In addition, the updating expiration time (ExpTime) of the mesh path is changed according to a position of an information processing device on the mesh path.

In addition, the expiration time (LifeTime) of the mesh path can be changed according to a state (for example, a movement state, a state of a link) of an information processing device. Accordingly, when a situation is radically changed, the path can be updated in detail. On the other hand, when a situation is not significantly changed, unnecessary updating of a mesh path can be reduced. In other words, generation and management of a communication path of a plurality of information processing devices can be properly performed.

<2. Second Embodiment>

In the first embodiment of the present technology, the examples in which the expiration time and updating expiration time of a mesh path are set have been shown. In the second embodiment of the present technology, an example in which a metric value included in a signal such as a PREQ is changed will be shown. It should be noted that a communication system of the second embodiment of the present technology is substantially the same as the communication system 200 shown in FIG. 1 and the like. Thus, the same reference numerals will be given to portions common to those of the communication system 200, and part of description thereof will be omitted.

[Example in which a Metric Value is Changed According to a Movement State of an Information Processing Device]

In this example, an example in which a metric value is changed according to a movement state of an information processing device will be shown. In other words, an example in which, in a state in which an information processing device is moving, the device is made difficult to select as a path by changing a metric value will be shown.

Figure 25:
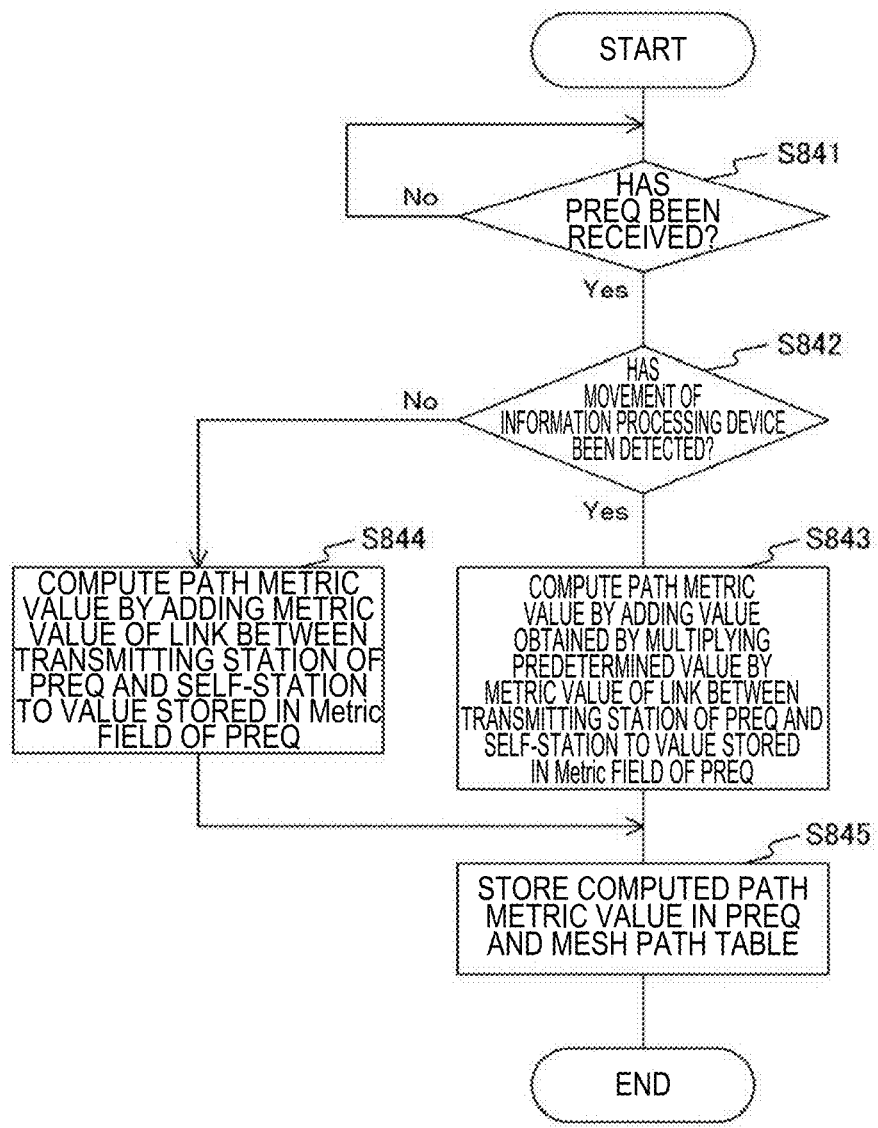
FIG. 25 is a flowchart showing an example of the procedure of signal processing by the information processing device 100 according to a second embodiment of the present technology.

FIG. 25 is a flowchart showing an example of the processing procedure of signal processing by the information processing device 100 according to the second embodiment of the present technology.

First, the control unit 140 of the information processing device 100 determines whether or not a PREQ has been received (Step S841). Then, when no PREQ has been received (Step S841), the control unit continues monitoring.

When a PREQ has been received (Step S841), the control unit 140 of the information processing device 100 determines whether or not movement of the information processing device 100 has been detected (Step S842). It should be noted that a movement detection method can be the same as that of the first embodiment of the present technology.

When movement of the information processing device 100 has been detected (Step S842), the control unit 140 of the information processing device 100 computes a multiplication value by multiplying a predetermined value (for example, 1.5) by the metric value of a link between the transmitting station of the received PREQ and the self-station (Step S843). Then, the control unit 140 of the information processing device 100 computes the path metric value by adding the computed multiplication value to the value stored in the Metric field 326 of the received PREQ (Step S845).

On the other hand, when no movement of the information processing device 100 has been detected (Step S842), the control unit 140 of the information processing device 100 computes a normal path metric value (Step S844). In other words, the control unit 140 of the information processing device 100 computes the path metric value by adding the metric value of the link between the transmitting station of the received PREQ and the self-station to the value stored in the Metric field 326 of the received PREQ (Step S844).

Subsequently, the control unit 140 of the information processing device 100 stores the computed path metric value in the PREQ to be transferred (in the Metric field 326 shown in c of FIG. 4) (Step S845). It should be noted that, since other items of the PREQ to be transferred are the same as in the first embodiment of the present technology, description thereof is omitted. In addition, the control unit 140 of the information processing device 100 stores the computed path metric value in the Metric 343 ("b" of the Index 346) of the mesh path table 350 (Step S845). It should be noted that, since other items of the mesh path table 350 are the same as in the first embodiment of the present technology, description thereof is omitted here.

In this manner, the control unit 140 controls updating of the metric value included in the signal such as the PREQ based on a state of the information processing device 100. For example, the control unit 140 controls the metric value to be great when the information processing device 100 is moving.

As described above, in a state in which the information processing device 100 is moving, a path metric value is computed by setting the metric value of a link between a transmitting station of the received PREQ and the self-station (metric value in path setting control data) to be greater than the actual value. Accordingly, the information processing device 100 can be difficult to select as a path.

[Example in which a Metric Value is Changed According to a Degree of Traffic Congestion]

In this example, an example in which a metric value is changed according to a degree of traffic congestion will be shown. In other words, an example in which, in a state of congested traffic, a device is made difficult to select as a path by changing a metric value will be shown.

Figure 26:
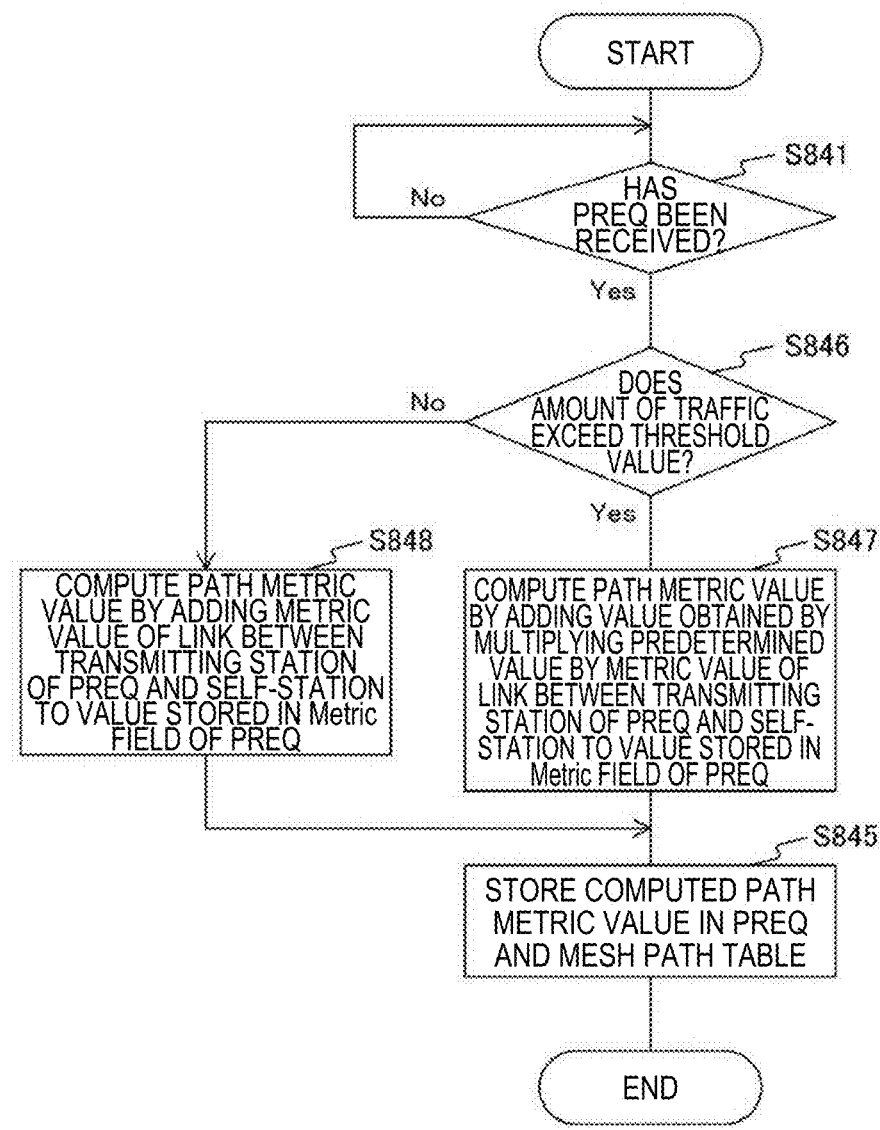
FIG. 26 is a flowchart showing an example of the procedure of signal processing by the information processing device 100 according to the second embodiment of the present technology.

FIG. 26 is a flowchart showing an example of the procedure of signal processing by the information processing device 100 according to the second embodiment of the present technology. It should be noted that FIG. 26 is obtained by modifying a part of the procedure shown in FIG. 25, and thus the same reference numerals will be given to portions common to those of FIG. 25, and part of description thereof will be omitted.

The control unit 140 of the information processing device 100 determines whether or not an amount of traffic (a value of traffic congestion) exceeds a threshold value (Step S846). Here, the amount of traffic can be set to, for example, a value obtained for each beacon interval (the sum of the times taken for the self-station to perform transmission and reception). In this case, 50% of the time of the beacon interval can be set as the threshold value. In other words, when the sum of the times taken for the self-station to perform transmission and reception exceeds 50% of the time of the beacon interval, the control unit 140 of the information processing device 100 can determine traffic to be congested.

Then, when the amount of traffic exceeds the threshold value (Step S846), the control unit 140 of the information processing device 100 computes a multiplication value by multiplying a predetermined value (for example, 1.5) by the metric value of the link between the transmitting station of the PREQ and the self-station (Step S847). Then, the control unit 140 of the information processing device 100 computes a path metric value by adding the computed multiplication value to the value stored in the Metric field 326 of the received PREQ (Step S847).

On the other hand, when the amount of traffic does not exceed the threshold value (Step S846), the control unit 140 of the information processing device 100 computes the normal path metric value (Step S848).

As described above, when an amount of traffic of the information processing device 100 is greater than the threshold value, the control unit 140 controls the metric value to be great.

As described above, when an amount of traffic of the information processing device 100 is exceeded, a path metric value is computed by setting the metric value of a link between the transmitting station of the received PREQ and the self-station (metric value in path setting control data) to be greater than the actual value. Accordingly, the information processing device 100 can be difficult to select as a path.

[Example in which a Metric Computation Method is Changed According to a TX Data Rate]

In this example, an example in which a metric computation method is changed according to a TX data rate will be shown. For example, when a data rate is low, influence of an error rate is considerable, but when a data rate is high, there is little influence of an error rate. Thus, in this example, when a TX data rate is high, influence of an error rate is reduced by not reflecting the error rate.

Figure 27:
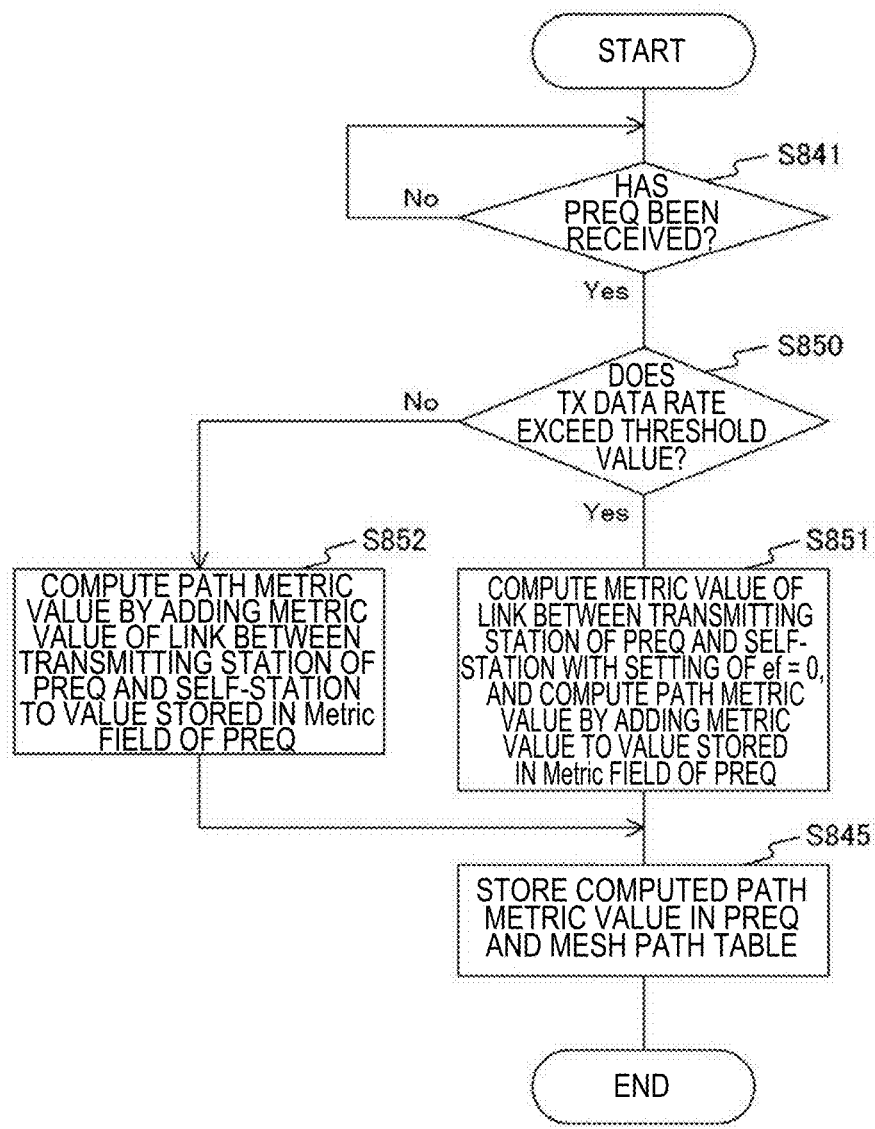
FIG. 27 is a flowchart showing an example of the procedure of signal processing by the information processing device 100 according to the second embodiment of the present technology.

FIG. 27 is a flowchart showing an example of the procedure of signal processing by the information processing device 100 according to the second embodiment of the present technology. It should be noted that FIG. 27 is obtained by modifying a part of the procedure shown in FIG. 25, and thus the same reference numerals will be given to portions common to those of FIG. 25, and part of description thereof will be omitted.

The control unit 140 of the information processing device 100 determines whether or not the TX data rate exceeds a threshold value (Step S850). As this threshold value, for example, 39 (Mbps) can be used.

Here, a metric value ca can be obtained using the following Expression 1 in, for example, the IEEE 802.11-2012 standard, as described above.

$$ca = [O \pm (Bt/r)]/[1/(1-ef)] \quad \text{Expression 1}$$

In addition, when a data rate is low, influence of an error rate is considerable, but when a data rate is high, there is little influence of an error rate, as described above. Thus, when the TX data rate exceeds the threshold value (Step S850), the control unit 140 of the information processing device 100 computes the metric value ca of the link between the transmitting station of the received PREQ and the self-station with the setting of ef of Expression 1=0 (Step S851). Then, the control unit 140 of the information processing device 100 computes a path metric value by adding the computed metric value ca to the value stored in the Metric field 326 of the received PREQ (Step S851).

On the other hand, when the TX data rate does not exceed the threshold value (Step S850), the control unit 140 of the information processing device 100 computes the normal path metric value ca (i.e., ef of Expression 1 is not set to 0) (Step S852).

As described above, when an error rate of each link is lower than the threshold value, the control unit 140 computes a metric value using the error rate, and when an error rate is higher than the threshold value, the control unit computes a metric value without using the error rate.

As described above, even when an error rate is measured for each link and a metric value is computed with the measured error rate reflected, if the TX data rate exceeds the threshold value, the error rate is not reflected in the metric value. Accordingly, the influence of the error rate can be reduced.

[Computation Example of a Metric Value when Information Regarding TX Data is not Updated]

In this example, a computation example of a metric value when information regarding TX data is not updated because there is no data transmission will be shown.

[Configuration Example of a Mesh Path Table]

FIG. 28 is a diagram schematically showing still another example of the mesh path table (mesh path table 370) retained by each of the information processing devices which constitute the communication system 200 according to the second embodiment of the present technology. It should be noted that, since a configuration of the mesh path table 370 has the same form as in the example shown in a of FIG. 11, illustration thereof will be omitted here.

Specifically, in FIG. 28, the Index 346, the data name 347, and the meaning 348 are shown as examples of the content of the mesh path table 370. The mesh path table 370 shown in FIG. 28 is obtained by adding new information to the mesh path table 350 shown in FIG. 11. Specifically, information of reference symbols g and h is newly added information. Thus, in FIG. 28, the same reference symbols are given to portions common to those of the mesh path table 350 shown in FIG. 11 and part of description thereof will be omitted. Furthermore, FIG. 28 corresponds to b of FIG. 11.

In the TxTime 371 of "g" of the Index 346, the time at which data is finally transmitted to an information processing device whose identifier is stored in the NextHop 342 is stored.

In the RSSI TXack 372 of "h" of the Index 346, the electric field intensity of acknowledgement of a packet on which data is finally transmitted to the information processing device whose identifier is stored in the NextHop 342 is stored. In other words, the electric field intensity of the beacon right before the final data transmission to the information processing device whose identifier is stored in the NextHop 342 is stored.

Figure 29:
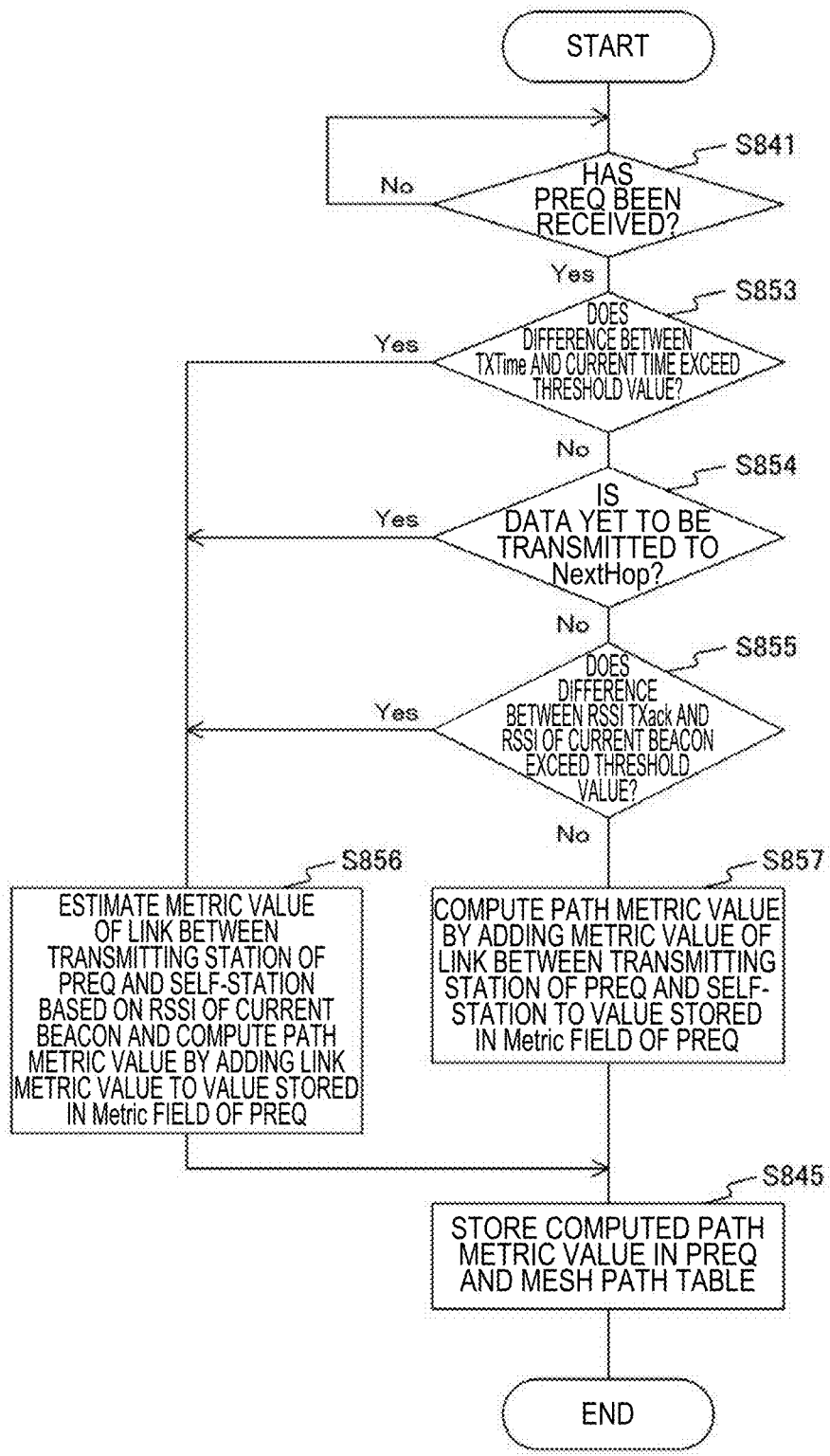
FIG. 29 is a flowchart showing an example of the procedure of signal processing by the information processing device 100 according to the second embodiment of the present technology.

FIG. 29 is a flowchart showing an example of the procedure of signal processing by the information processing device 100 according to the second embodiment of the present technology. It should be noted that FIG. 29 is obtained by modifying a part of the procedure shown in FIG. 25, and thus the same reference numerals will be given to portions common to those of FIG. 25, and part of description thereof will be omitted.

The control unit 140 of the information processing device 100 computes the difference between the time stored in the TxTime 371 of "g" of the Index 346 and the current time, and determines whether or not the difference exceeds a threshold value (Step S853). This threshold value can be set to, for example, 10 (seconds).

When the difference does not exceed the threshold value (Step S853), the control unit 140 of the information processing device 100 determines whether or not data is yet to be transmitted to the information processing device whose identifier is stored in the NextHop 342 (Step S854).

When data has been transmitted (Step S854), the control unit 140 of the information processing device 100 computes the difference between the value stored in the RSSI TXack 372 of "h" of the Index 346 and the RSSI of the current beacon (Step S855). Then, the control unit 140 of the information processing device 100 determines whether or not the computed difference exceeds a threshold value (Step S855). This threshold value can be set to, for example, 10 (dB).

When the difference between the time stored in the TxTime 371 and the current time exceeds the threshold value (Step S855), the control unit 140 of the information processing device 100 estimates the metric value of the link between the transmitting station of the received PREQ and the self-station based on the RSSI of the current beacon. Then, the control unit 140 of the information processing device 100 computes the path metric value by adding the computed metric value to the value stored in the Metric field 326 of the received PREQ (Step S856).

Here, an estimation method of a metric value will be described. For example, the control unit 140 of the information processing device 100 retains a correspondence table in which the RSSI of a beacon is associated with the metric value of the link between the transmitting station of the PREQ and the self-station. Then, the control unit 140 of the information processing device 100 extracts the metric value which corresponds to the RSSI of the current beacon from this correspondence table and sets the extracted metric value as an estimated metric value. It should be noted that the correspondence table may be appropriately changed for use according to a connection state.

In addition, also in the case of no transmission (Step S854) or when the difference between the value stored in the RSSI TXack 372 and the RSSI of the current beacon exceeds the threshold value (Step S855), a metric value is estimated in the same manner (Step S856). Further, the path metric value is computed (Step S856).

On the other hand, when the difference between the time stored in the TxTime 371 and the current time does not exceed the threshold value (Step S855), the control unit 140 of the information processing device 100 computes the normal path metric value (Step S857).

As described above, when an elapsed time from the final data transmission time to an information processing device designated as the next transmission destination on a mesh path (communication path) is longer than the threshold value, the control unit 140 estimates a metric value based on the current electric field intensity. In addition, also when the difference between the electric field intensity at the time of the final data transmission to the information processing device and the current electric field intensity is greater than the threshold value, the control unit 140 estimates a metric value based on the current electric field intensity.

As described above, the transmission time of the final data packet to an adjacent station and an electric field intensity are associated and retained, and the difference between the retained transmission time and a current time (non-transmission time) and the difference between the retained electric field intensity and a current electric field intensity (electric field intensity difference) are obtained. Then, when the non-transmission time exceeds the threshold value, or when the electric field intensity difference exceeds the threshold value, a metric value is estimated based on a received electric field intensity and used for computing a path metric value.

[Computation Example of a Metric Value] FIG. 30 is diagram schematically showing a computation process of a metric value by the information processing device 100 according to the second embodiment of the present technology. In a and b of FIG. 30, examples in which a conversion process 601 in which a received electric field intensity is converted to a TX rate and a TX-rate low-pass filter 602 for metric computation are switched with each other (604) are shown. It should be noted that the TX-rate low-pass filter 602 for metric computation is a low-pass filter for averaging TX rates. In addition, an example in which a metric value is computed (603) based on a TX rate after the switching will be shown.

In a of FIG. 30, an example in which a TX rate at which transmission has succeeded is directly loaded in the TX-rate low-pass filter 602 is shown.

When transmission has succeeded, for example, a metric value is computed using a value obtained by averaging TX rates of packets at which transmission has succeeded (the output value from the TX-rate low-pass filter 602). On the other hand, when data transmission has stopped for a long period of time, a metric value is estimated based on a received electric field intensity (601).

There are cases in which, for example, when a TX rate at which transmission has succeeded is obtained after a start of estimation of a metric value based on a received electric field intensity or when a received electric field intensity considerably fluctuates, the TX rate considerably fluctuates.

For example, since the TX-rate low-pass filter 602 is compatible with a considerably fluctuating TX rate, a time constant is set to be high. Thus, when an average value actually considerably fluctuates, a response may become late.

For example, a case in which data transmission has stopped for a long period of time and a metric value is estimated based on a received electric field intensity or a case in which a TX rate at which transmission has succeeded is obtained from a state of a received electric field intensity considerably fluctuating is assumed. In that case, the value of the TX rate at which transmission has succeeded is set to be directly loaded in the TX-rate low-pass filter 602 to accelerate convergence on the TX-rate low-pass filter 602. In other words, when the TX rate at which transmission has succeeded is obtained, the value of the TX rate at which transmission has succeeded is obtained is set to be the initial value of the TX-rate low-pass filter 602

In b of FIG. 30, an example in which a TX rate estimated from a received electric field intensity and the average value of the estimated TX rate and an output value of the TX-rate low-pass filter 602 are used for the time before convergence on the TX-rate low-pass filter 602 is shown.

When a metric value is computed after re-setting in the TX-rate low-pass filter 602, complete convergence on the TX-rate low-pass filter 602 is assumed not to occur immediately even if direct loading of the TX rate is used. Thus, a TX rate estimated from the received electric field intensity is used for the time before a given number (for example, 20) of packets are transmitted after switching (604), and thereafter, the output value of the TX-rate low-pass filter 602 may be used.

In addition, for the time before the given number of packets are transmitted after the switching (604), the average value of the TX rate estimated from the received electric field intensity and the TX-rate low-pass filter 602 (604) may be used.

For example, the TX rate estimated from the received electric field intensity is used for the time before the given number (for example, 20) of packets are transmitted after the switching (604). Subsequently, for the time before a given number (for example, 21 to 40) of packets are transmitted, the average value of the TX rate estimated from the received electric field intensity and the output value of the TX-rate low-pass filter 602 (605) is used. Subsequently, for the following packets (for example, from a $41^{st}$ packet), the output value of the TX-rate low-pass filter 602 is used.

As described above, when data transmission to an information processing device designated as the next transmission destination on a mesh path (communication path) is being performed, the control unit 140 computes the metric value using the value of the data rate thereof averaged by the low-pass filter. In addition, when a metric value has been estimated based on a current electric field intensity, and a data rate at which transmission has succeeded has been acquired, the control unit 140 computes the metric value using the data rate as the initial value of the low-pass filter. In addition, when the data rate is used as the initial value of the low-pass filter, the control unit 140 uses a metric value estimated based on a current electric field intensity after the rate is set to the initial value. Furthermore, the control unit 140 then uses the average value of the estimated metric value and an output value of the low-pass filter and then uses the output value of the low-pass filter.

[Example of Recovery to a Path]

Here, an information processing device is assumed to be in link broken when an error rate is measured for each link and the error rate exceeds a threshold value. It is not possible for this information processing device to perform transmission after link broken. In addition, when this state continues, the error rate is not updated, and the state of link broken is kept.

Thus, in the second embodiment of the present technology, when link broken is set when an error rate is measured for each link and the error rate exceeds the threshold value, the error rate is set to be lowered by a predetermined ratio each time a predetermined period of time elapses from the link broken. Here, the predetermined period of time can be, for example, 5 (seconds), and the predetermined ratio by which the error rate is lowered can be, for example, 1/2.

As described above, when link broken is set when an error rate of each link is greater than the threshold value, the control unit 140 lowers the error rate each time the predetermined period of time passes after the link broken is set.

[Example in which Hysteresis is Applied to Metric Selection]

Next, an example in which hysteresis is applied to metric selection will be shown.

[Example of Path Selection]

Figure 31:
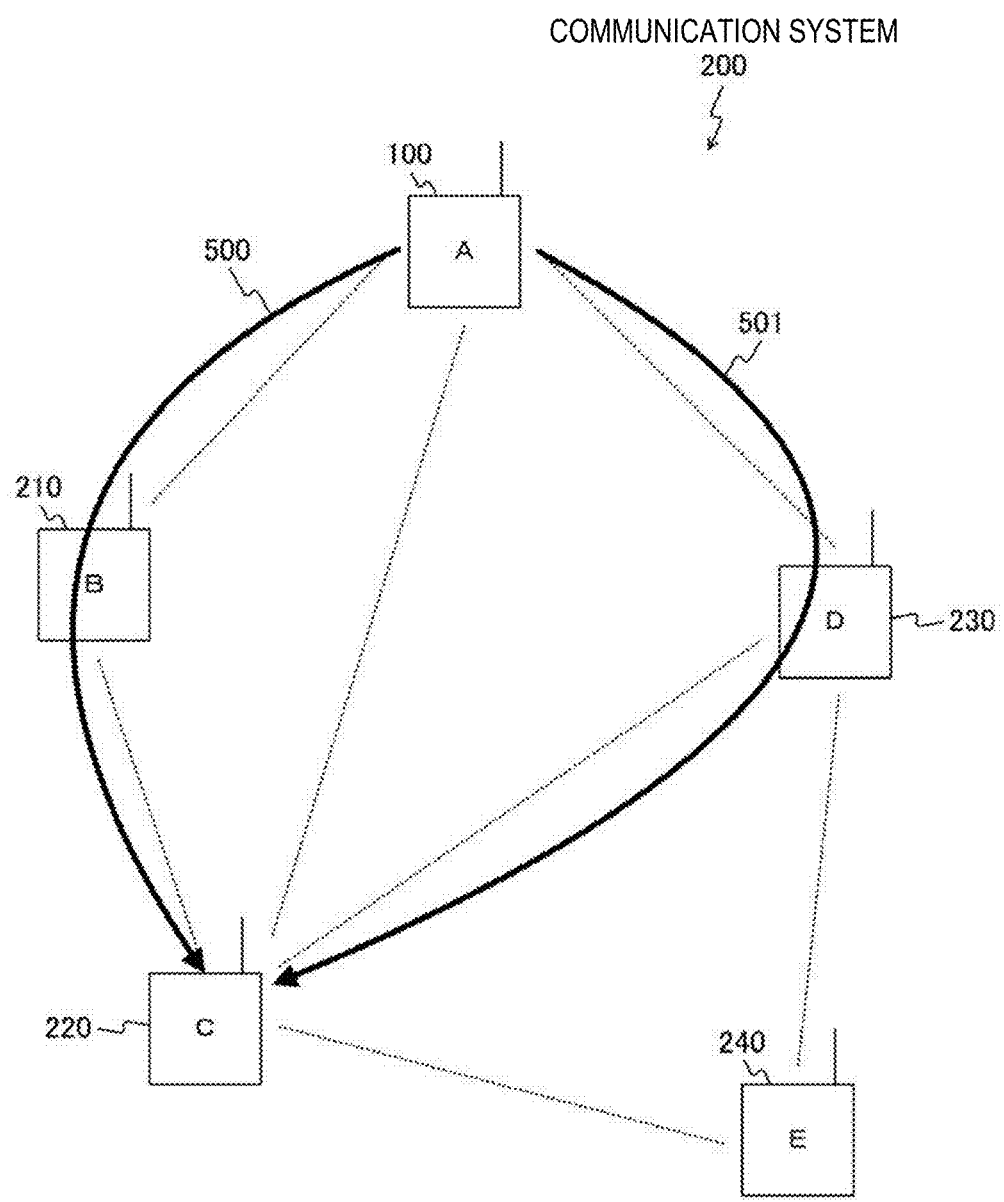
FIG. 31 is a diagram schematically showing path selection of the communication system 200 according to the second embodiment of the present technology.

FIG. 31 is a diagram schematically showing path selection of the communication system 200 according to the second embodiment of the present technology.

The arrow 500 represents a path between the information processing device 220 and the information processing device 100 passing through the information processing device 210. In addition, the path metric value computed by the information processing device 220 for the path represented by the arrow 500 is set to M1.

In addition, the arrow 501 represents a path between the information processing device 220 and the information processing device 100 passing through the information processing device 230. Furthermore, the path metric value computed by the information processing device 220 for the path represented by the arrow 501 is set to M2.

When there are two paths as paths between the information processing device 220 and the information processing device 100 as shown in FIG. 31, the path metric values M1 and M2 with respect to the two paths described above are compared and the path of the smaller path metric value (superior path) is selected.

However, a case in which two paths are frequently switched when the values M1 and M2 that are the path metric values of the two paths approximate to each other is assumed. In such a case, it is important to prevent the two paths from being frequently switched. Thus, even when the path metric value of a current path is greater than another path metric value, if the difference of the values does not exceed a threshold value H1, an original path may remain selected, without a new path being selected.

For example, in the example shown in FIG. 31, a case in which a path on which the NextHop 342 is the information processing device 210 when the destination station is set to the information processing device 100 (the path represented by the arrow 500) is selected is assumed. When M1>M2+H1 in this case, the information processing device 220 selects the path on which the NextHop is the information processing device 230 (the path represented by the arrow 501). On the other hand, when M1≤M2+H1, the information processing device 220 keeps the original path (the path represented by the arrow 500) selected.

In addition, the same operation can be applied to a case in which there are 3 or more path selection candidates. For example, a case in which the path metric value of a current path is M1 is assumed. In this case, a path corresponding to the path metric value of which the sum with the threshold value H1 is lower than M1 is set as a new selection candidate. When there are a plurality of such new selection candidates, a path with the lowest path metric value among the new selection candidates is selected as the NextHop. This example is shown in FIG. 32.

[Operation Example of an Information Processing Device]

Figure 32:
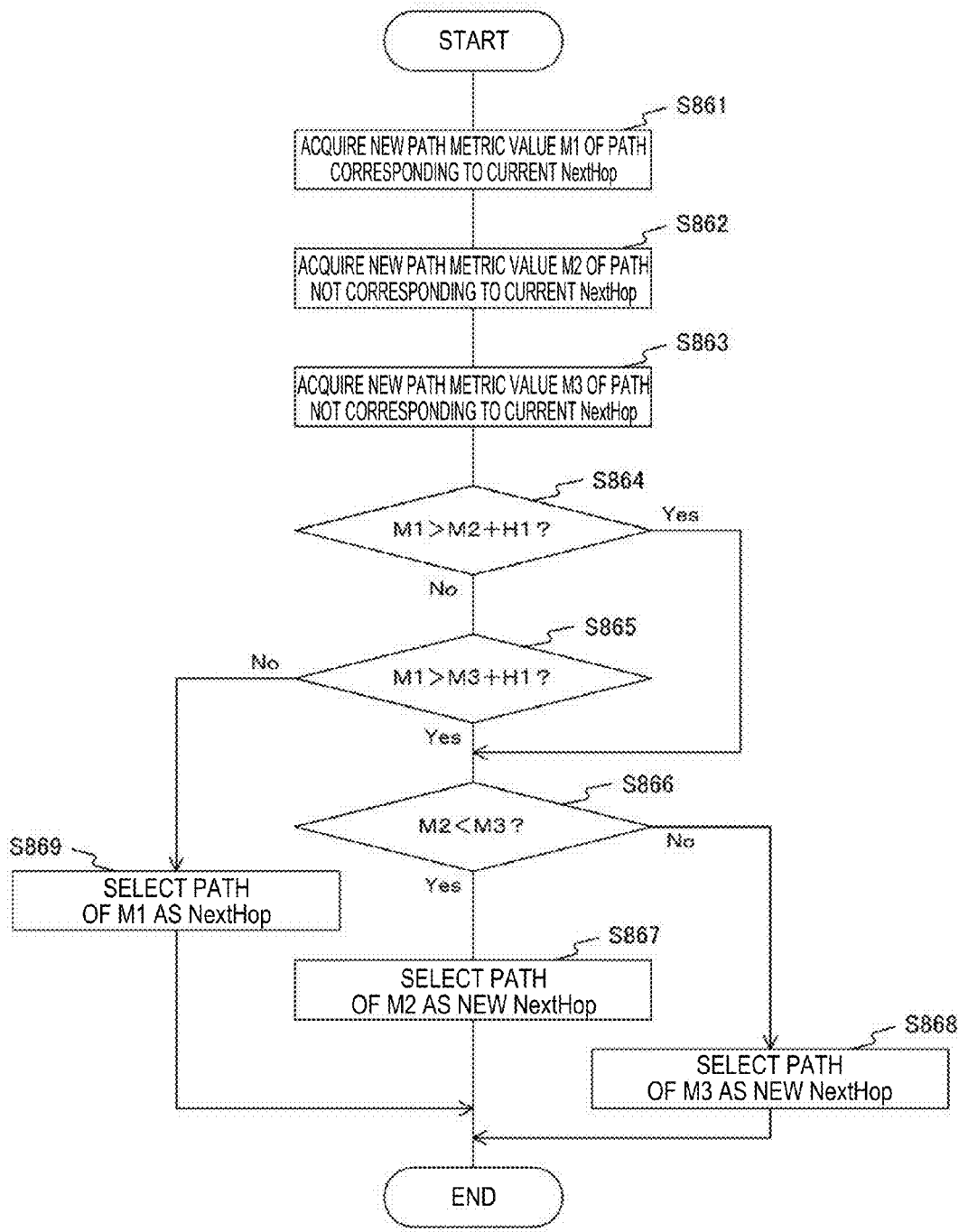
FIG. 32 is a flowchart showing an example of the procedure of signal processing by the information processing device 100 according to the second embodiment of the present technology.

FIG. 32 is a flowchart showing an example of the procedure of signal processing by the information processing device 100 according to the second embodiment of the present technology. Here, path metric values of three paths will be described as M1 to M3.

First, the control unit 140 of the information processing device 100 acquires a new path metric value M1 of a path (first path) corresponding to the current NextHop 342 (Step S861). Further, the control unit 140 of the information processing device 100 acquires a new path metric value M2 of a path (second path) not corresponding to the current NextHop 342 (Step S862). Further, the control unit 140 of the information processing device 100 acquires a new path metric value M3 of another path (third path) not corresponding to the current NextHop (Step S863).

Subsequently, the control unit 140 of the information processing device 100 determines whether or not the path metric value M1 is greater than the sum of the path metric value M2 and the threshold value H1 (Step S864). When the path metric value M1 is greater than the sum (M2+H1) (Step S864), the control unit proceeds to Step S866.

In addition, when the path metric value M1 is equal to or smaller than the sum (M2+H1) (Step S864), the control unit 140 of the information processing device 100 determines whether or not the path metric value M1 is greater than the sum of the path metric value M3 and the threshold value H1 (Step S865). When the path metric value M1 is greater than the sum (M3+H1) (Step S865), the control unit 140 of the information processing device 100 determines whether or not the path metric value M2 is smaller than the path metric value M3 (Step S866).

When the path metric value M2 is smaller than the path metric value M3 (Step S866), the control unit 140 of the information processing device 100 selects the path corresponding to the path metric value M2 as a new NextHop 342 (Step S867). On the other hand, when the path metric value M2 is equal to or greater than the path metric value M3 (Step S866), the control unit 140 of the information processing device 100 selects the path corresponding to the path metric value M3 as a new NextHop 342 (Step S868).

When the path metric value M1 is less than the sum of the path metric value M3 and the threshold value H1 (Step S865), the control unit 140 of the information processing device 100 selects the path corresponding to the current NextHop 342 (path metric value M1) (Step S869).

As described above, there are cases in which there is another communication path having a metric value that is smaller than a metric value of a current mesh path (communication path) and of which the difference from the metric value of the current mesh path (communication path) is greater than the threshold value H1. In this case, the control unit 140 sets the other communication path as a new communication path. In addition, when there are a plurality of other communication paths, the control unit 140 sets a communication path having a smallest metric value as a new communication path among the plurality of communication paths.

[Example in which Hysteresis is Set to be Small]

The example in which, even when a metric value of a selection candidate is smaller than a metric value of a current path, the selection candidate is not selected as a new NextHop is shown above. In other words, the example in which, when the metric value of the selection candidate is smaller than the metric value of the current path but the sum of the metric value of the selection candidate and the threshold value H1 is not smaller than the metric value of the current path, the selection candidate is not selected as a new NextHop has been shown.

However, if a state of presence of such a selection candidate continues for a predetermined period of time (or a predetermined number of times), the selection candidate may be considered to be selected as a new NextHop. Thus, in this example, the example in which, if a state of presence of such a selection candidate continues for a predetermined period of time (or a predetermined number of times), the selection candidate is selected as a new NextHop will be shown.

[Configuration Example of a Mesh Path Table]

FIG. 33 is a diagram schematically showing still another example of the mesh path table (mesh path table 380) retained by each of the information processing devices which constitute the communication system 200 according to the second embodiment of the present technology. It should be noted that, since the configuration of the mesh path table 380 has the same form as in the example shown in a of FIG. 11, illustration thereof will be omitted here.

Specifically, in FIG. 33, the Index 346, the data name 347, and the meaning 348 are shown as examples of the content of the mesh path table 380. The mesh path table 380 shown in FIG. 33 is obtained by adding new information to the mesh path table 350 shown in FIG. 11. Specifically, information of reference symbols g to i is newly added information. Thus, in FIG. 33, the same reference symbols are given to portions common to those of the mesh path table 350 shown in FIG. 11 and part of description thereof will be omitted. Furthermore, FIG. 33 corresponds to b of FIG. 11.

In the NextHopHy 381 of "g" of the Index 346, an identifier of an information processing device which is smaller than a path metric value passing through an information processing device whose identifier is stored in the NextHop 342 but whose difference does not become the threshold value H1 is stored. In other words, the identifier of the information processing device of which a path metric value is smaller than the path metric value passing through the information processing device whose identifier is stored in the NextHop 342 but the sum of the foregoing path metric value and the threshold value H1 is greater than the latter path metric value is stored.

In the HyCount 382 of "h" of the Index 346, the number of times which is smaller than the path metric value passing through the information processing device whose identifier is stored in the NextHop 342 but whose difference does not become the threshold value H1 is stored. In other words, the number of times in which the same identifier is consecutively stored in the NextHopHy 381 is stored.

In the NewNextCount 383 of "i" of the Index 346, the number of times in which a different path from that of the previous communication is selected is stored. For example, when a PREQ has been received and a different path from that of the previous communication has been selected, a value of the NewNextCount 383 is incremented for each time of the selection. The initial value thereof, however, is set to zero. Then, when a PREP is received, the final value of the NewNextCount 383 is copied and transmitted.

Figure 34:
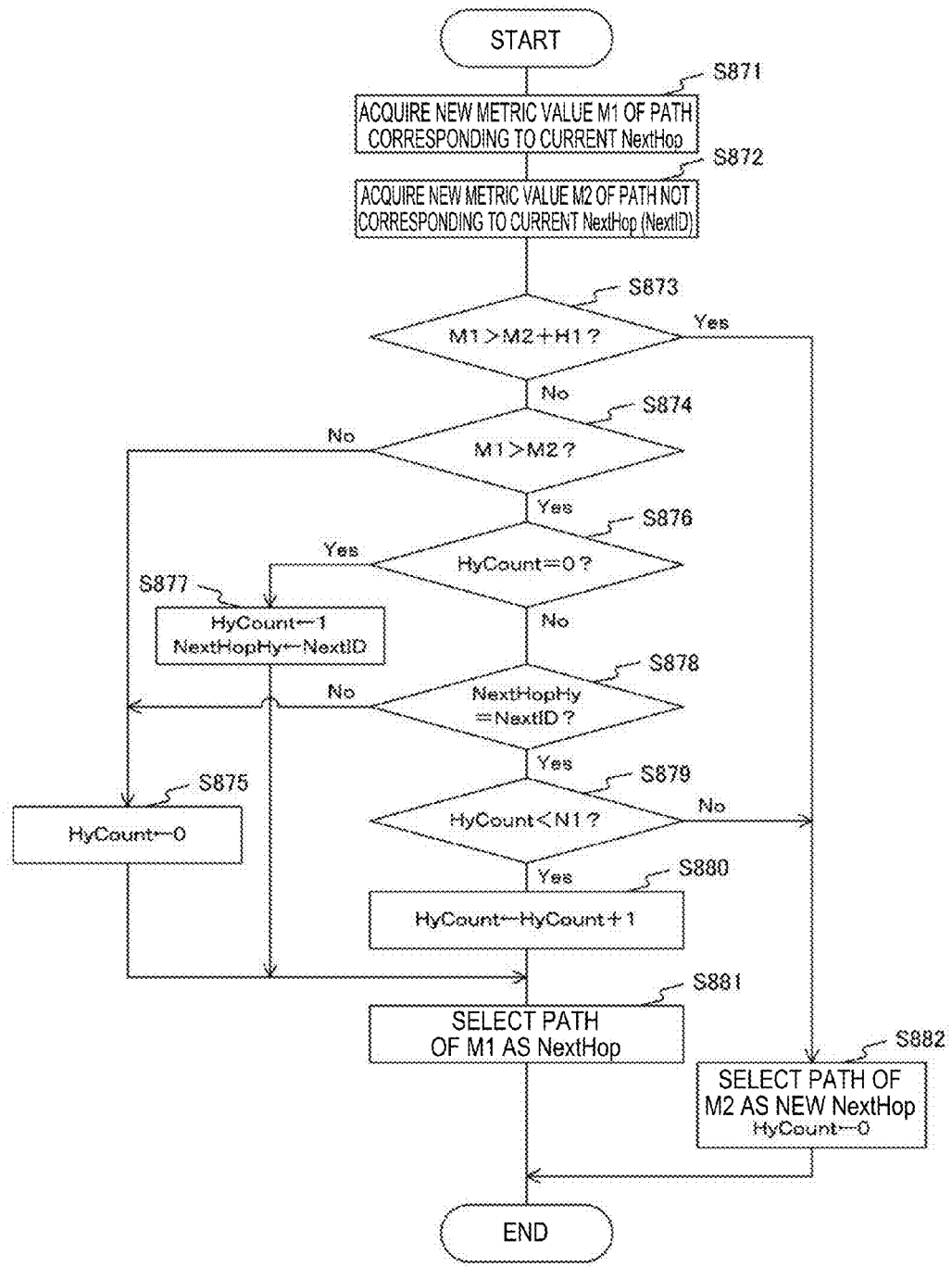
FIG. 34 is a flowchart showing an example of the procedure of signal processing by the information processing device 100 according to the second embodiment of the present technology.

FIG. 34 is a flowchart showing an example of the procedure of signal processing by the information processing device 100 according to the second embodiment of the present technology. In this example, path metric values of two paths are described as M1 and M2.

First, the control unit 140 of the information processing device 100 acquires the new path metric value M1 of a path corresponding to the current NextHop 342 (Step S871). In addition, the control unit 140 of the information processing device 100 acquires the new path metric value M2 of a path not corresponding to the current NextHop 342 (Step S872).

Subsequently, the control unit 140 of the information processing device 100 determines whether or not the path metric value M1 is greater than the sum of the path metric value M2 and the threshold value H1 (Step S873). When the path metric value M1 is greater than the sum (M2+H1) (Step S873), the control unit proceeds to Step S882.

In addition, when the path metric value M1 is equal to or smaller than the sum (M2+H1) (Step S873), the control unit 140 of the information processing device 100 determines whether or not the path metric value M1 is greater than the path metric value M2 (Step S874).

When the path metric value M2 is equal to or greater than the path metric value M1 (Step S874), the control unit 140 of the information processing device 100 stores 0 in the HyCount 382 of "h" of the Index 346 (Step S875), and then proceeds to Step S881.

In addition, when the path metric value M1 is greater than the path metric value M2 (Step S874), the control unit 140 of the information processing device 100 determines whether or not the value stored in the HyCount 382 of "h" of the Index 346 is 0 (Step S876). When the value stored in the HyCount 382 is 0 (Step S876), the control unit 140 of the information processing device 100 stores 1 in the HyCount 382 (Step S877). In addition, the control unit 140 of the information processing device 100 stores "NextID" in the NextHopHy 381 of "g" of the Index 346 (Step S877). Then, the control unit proceeds to Step S881. It should be noted that the NextID is an identifier for specifying the path of the path metric value M2 (identifier of an information processing device (adjacent information processing device) passing on the path of the path metric value M2).

In addition, when the value stored in the HyCount 382 is not 0 (Step S876), the control unit 140 of the information processing device 100 determines whether or not the "NextID" is stored in the NextHopHy 381 of "g" of the Index 346 (Step S878). When the "NextID" is not stored in the NextHopHy 381 (Step S878), the control unit proceeds to Step S875.

On the other hand, when the "NextID" is stored in the NextHopHy 381 (Step S878), the control unit 140 of the information processing device 100 determines whether or not the value stored in the HyCount 382 is smaller than a threshold value N1 (Step S879).

When the value stored in the HyCount 382 is smaller than the threshold value N1 (Step S879), the control unit 140 of the information processing device 100 adds 1 to the value stored in the HyCount 382 (Step S880). Subsequently, the control unit 140 of the information processing device 100 selects the path (path metric value M1) corresponding to the current NextHop 342 (Step S881).

When the value stored in the HyCount 382 is equal to or greater than the threshold value N1 (Step S879), the control unit 140 of the information processing device 100 selects the path corresponding to the path metric value M2 as a new NextHop (Step S882).

As described above, a case in which another communication path having a metric value smaller than a metric value of a current mesh path (communication path) but whose difference with the metric value of the current mesh path (communication path) is not greater than the threshold value H1 is also assumed. In this case, the control unit 140 sets another communication path as a new communication path on the condition that the state continues for a predetermined period of time or a predetermined number of times (for example, the number of times of the states is equal to or greater than the threshold value N1).

It should be noted that, although the example in which one path of two is selected as a new NextHop has been shown in this example, this method can also be applied to selection from three or more paths. In the selection from three or more paths, information regarding each of the paths is stored in the NextHopHy 381 and the HyCount 382. In addition, when there are a plurality of paths for which a value stored in the HyCount 382 is equal to or greater than the threshold value N1, for example, a path with the smallest path metric value can be selected as a path therefrom. Alternatively, for example, a path with the largest value stored in the HyCount 382 may be selected as a path.

[Example in which Hysteresis is Set to be Small According to a Movement State of an Information Processing Device]

The example using the fixed threshold values H1 and N1 is shown in FIG. 34. When an information processing device is moving in that case, it is also assumed that a path which is a selection candidate can change at any time.

Thus, when movement of an information processing device has been detected to correspond to the movement of the information processing device, the control unit 140 of the information processing device 100 performs a comparison process described above by setting the threshold value H1 to be small. By setting the threshold value H1 to be small as above when movement of the information processing device has been detected, it is easy to keep pace with a change of an environment. It should be noted that the threshold value N1 may be changed according to the amount of a change, a speed of a change, or the like.

In addition, when movement of an information processing device has been detected to correspond to the movement of the information processing device, the control unit 140 of the information processing device 100 performs a comparison process described above by setting the threshold value N1 to be small. By setting the threshold value N1 to be small as above when movement of the information processing device has been detected, it is easy to keep pace with a change of an environment. It should be noted that the threshold value N1 may be changed according to the amount of a change, a speed of a change, or the like.

When the information processing device 100 is moving, the control unit 140 sets the metric threshold value (threshold value H1) to be small as described above. Likewise, when the information processing device 100 is moving, the control unit 140 sets a value relating to a predetermined period of time or a predetermined number of times (threshold value N1) to be small.

[Example in which Hysteresis is Applied with Reflection of Quality of Service (QoS)]

The example in which the threshold values H1 and N1 are changed according to a movement state of the information processing device has been shown above. Here, an example in which the threshold values H1 and N1 are changed according to a priority of a packet will be shown. For example, since a communication priority order is described in a QoS header defined in IEEE 80211e or the like, this priority order can be used.

FIG. 35 is a diagram showing four access categories (ACs) of IEEE 802.11e-Enhanced Distributed Channel Access (EDCA).

As shown in FIG. 35, in the EDCA, packets are classified into the four access categories (ACs) and stored in each transmission queue. Then, the packets are transmitted according to each priority. In other words, transmission is sequentially performed from the packet with the highest (1) priority shown in FIG. 35.

Thus, in this example, the threshold value H1 is changed according to the priority order of the packets. For example, when priority is high, the threshold value H1 is set to be great to cause a path not to be easily switched. On the other hand, when priority is low, the threshold value H1 is set to be small to easily keep pace with a change of an environment. For example, with priority 3 set as a base (i.e., H1×1), the value is 1.5 times (i.e., H1×1.5) in priority 2, 2.0 times (i.e., H1×2.0) in priority 1, and 0.8 times (i.e., H1×0.8) in priority 4.

In addition, in this example, the threshold value N1 is changed according to priority order of packets. For example, when priority is high, the threshold value N1 is set to greater to cause a path not to be easily switched. On the other hand, when priority is low, the threshold value N1 is set to be small to easily keep pace with a change of an environment. For example, with priority 3 set as a base (i.e., N1×1), the value is 1.5 times (i.e., N1×1.5) in priority 2, 2.0 times (i.e., N1×2.0) in priority 1, and 0.8 times (i.e., N1×0.8) in priority 4.

The control unit 140 sets the metric threshold value (threshold value H1) to be great when priority of communication performed using a mesh path (communication path) is high, and sets the metric threshold value (threshold value H1) to be small when the priority is low, as described above. Likewise, the control unit 140 sets a value relating to the predetermined period of time or the predetermined number of times (threshold value N1) to be great when priority of communication performed using a mesh path (communication path) is high, and sets the value relating to the predetermined period of time or the predetermined number of times (threshold value N1) to be small when the priority is low.

[Example in which Hysteresis is Applied with Reflection of the Number of Hops]

Here, an example in which the threshold values H1 and N1 are changed according to the number of hops will be shown. For example, the threshold values H1 and N1 can be changed using a value stored in the HopCount 352 of the mesh path table 380.

For example, when there are many HopCounts with reference to the HopCount 352 of the mesh path table 380 shown in FIG. 33, the threshold value H1 is set to be great to cause a path not to be easily switched. For example, when a value stored in the HopCount 352 of the mesh path table 380 exceeds a threshold value (hop threshold value), the threshold value H1 is set to be great.

On the other hand, when there are few HopCounts with reference to the HopCount 352 of the mesh path table 380, the threshold value H1 is set to be small to easily keep pace with a change of an environment. For example, when a value stored in the HopCount 352 of the mesh path table 380 is equal to or smaller than the threshold value (hop threshold value), the threshold value H1 is set to be small.

In addition, the threshold value N1 can be changed in the same manner. For example, when there are many HopCounts with reference to the HopCount 352 of the mesh path table 380, the threshold value N1 is set to be great to cause a path not to be easily switched. For example, when a value stored in the HopCount 352 of the mesh path table 380 exceeds the threshold value (hop threshold value), the threshold value N1 is set to be great.

On the other hand, when there are few HopCounts with reference to the HopCount 352 of the mesh path table 380, the threshold value N1 is set to be small to easily keep pace with a change of an environment. For example, when a value stored in the HopCount 352 of the mesh path table 380 is equal to or smaller than the threshold value (hop threshold value), the threshold value N1 is set to be small.

When the number of information processing devices on a mesh path (communication path) is greater than the hop threshold value, the control unit 140 sets the metric threshold value (threshold value H1) to be small as described above. Likewise, when the number of information processing devices on a mesh path (communication path) is greater than the hop threshold value, the control unit 140 sets the value relating to the predetermined period of time or the predetermined number of times (threshold value N1) to be small.

[Example in which Hysteresis is Applied with Reflection of the Number of Times of Path Change]

Here, an example in which the threshold values H1 and N1 are changed according to the number of times of path change will be shown. For example, the threshold values H1 and N1 can be changed using a value stored in the NewNextCount 383 of the mesh path table 380 shown in FIG. 33.

When the value stored in the NewNextCount 383 is great with reference to the NewNextCount 383, for example, the threshold value H1 is set to be great to cause a path not to be easily switched. For example, when the value stored in the NewNextCount 383 exceeds a threshold value (change threshold value), the threshold value H1 is set to be great. On the other hand, when the value stored in the NewNextCount 383 is small, the value of the threshold value H1 is set to be small to easily keep pace with a change of an environment. When the value stored in the NewNextCount 383 is equal to or smaller than the threshold value (change threshold value), the threshold value H1 is set to be small.

In addition, the threshold value N1 can also be changed in the same manner. For example, when the value stored in the NewNextCount 383 is great with reference to the NewNextCount 383, the threshold value N1 is set to be great to cause a path not to be easily switched. For example, when the value stored in the NewNextCount 383 exceeds the threshold value (change threshold value), the threshold value N1 is set to be great. On the other hand, when the value stored in the NewNextCount 383 is small, the value of the threshold value N1 is set to be small to easily keep pace with a change of an environment. When the value stored in the NewNextCount 383 is equal to or smaller than the threshold value (change threshold value), the threshold value N1 is set to be small.

When the number of changes of mesh paths (communication paths) is greater than the change threshold value, the control unit 140 sets the metric threshold value (threshold value H1) to be small, as described above. Likewise, when the number of changes of mesh paths (communication paths) is greater than the change threshold value, the control unit 140 sets the value relating to the predetermined period of time or the predetermined number of times (threshold value N1) to be small.

As described above, according to the second embodiment of the present technology, metric value computation methods are changed according to states (for example, a movement state, a link state, and the like) of the information processing device. Accordingly, the information processing device 100 can be made difficult to select as a path.

In addition, when a mesh path is to be updated, an amount of hysteresis at the time of comparison of mesh paths is controlled according to a state of an information processing device. Accordingly, it is possible to respond to a case in which switching of a mesh path is strongly required and a situation in which there is no particular desire to switch a mesh path.

Accordingly, in the embodiments of the present technology, it is possible to stabilize generation and updating of a mesh path. In other words, generation and management of a communication path between a plurality of information processing devices can be properly performed.

In addition, in the embodiments of the present technology, when path setting is performed on a multi-hop network, an updating interval and a selection method can be changed according to the number of hops or a situation of an error. Accordingly, unnecessary wireless communication for the path setting can be reduced and a stable path can be selected.

<3. Application Example>

The technology of the present disclosure can be applied to various products. For example, the information processing device 100 may be realized as a mobile terminal such as a smartphone, a tablet-type personal computer (PC), a notebook PC, a portable game terminal, or a digital camera, a fixed-type terminal such as a television receiver set, a printer, a digital scanner, or a network storage, or an in-vehicle terminal such as a car navigation device. In addition, the information processing device 100 may be realized as a terminal which performs machine-to-machine (M2M) communication (which is also referred to as a machine-type communication (MTC) terminal) such as a smart meter, a vending machine, a remote monitoring device, or a point-of-sale (POS) terminal. Furthermore, the information processing device 100 may be a wireless communication module (for example, an integrated circuit module configured in one die) mounted in these terminals.

[3-1. First Application Example]

Figure 37:
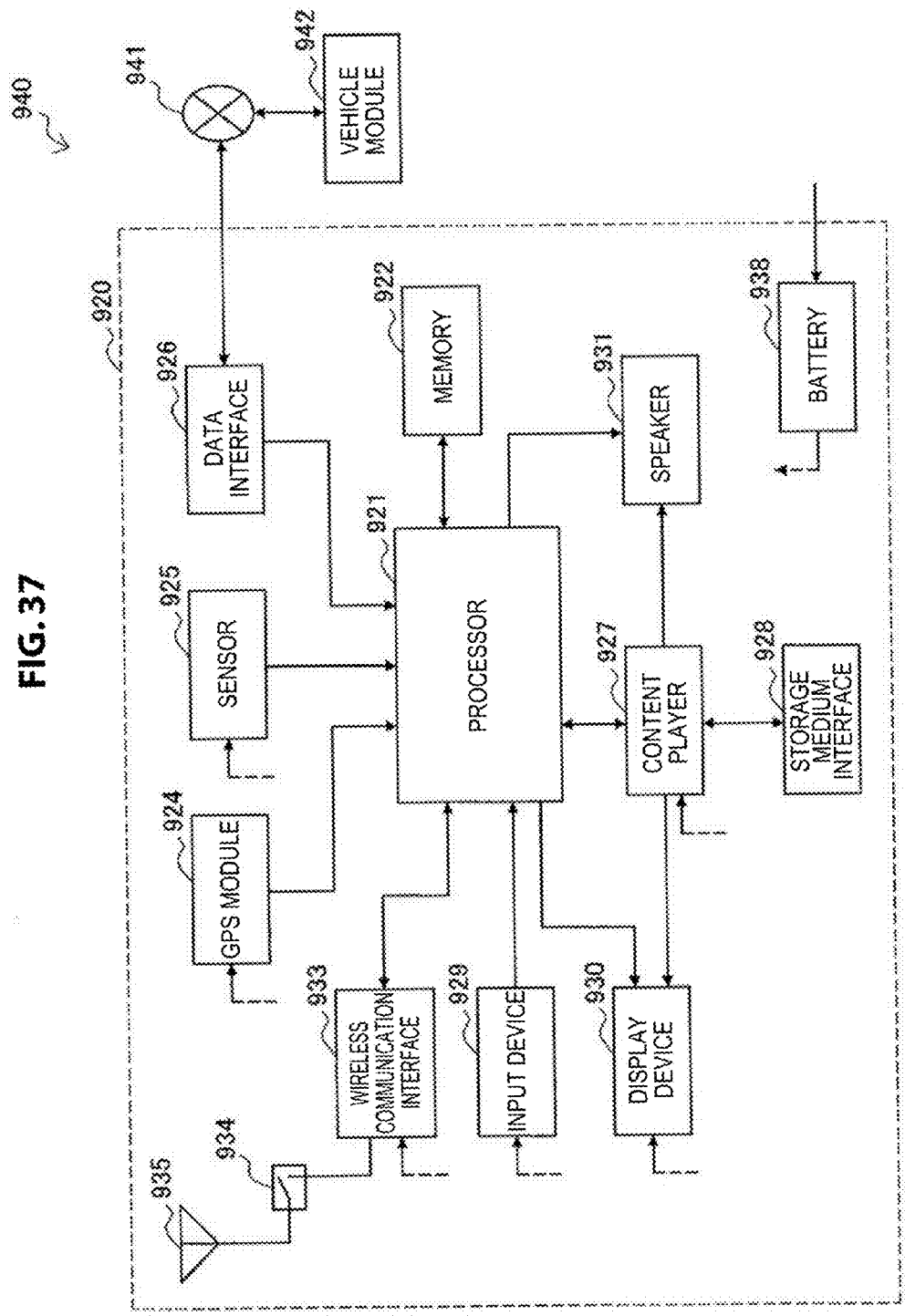
FIG. 37 is a block diagram showing an example of a schematic configuration of a car navigation device.

FIG. 37 is a block diagram showing an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on a chip (SoC), and controls functions of an application layer and another layer of the smartphone 900. The memory 902 includes a random access memory (RAM) and a read only memory (ROM), and stores a program that is executed by the processor 901, and data. The storage 903 may include a storage medium such as a semiconductor memory or a hard disk. The external connection interface 904 is an interface for connecting an external device such as a memory card or a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 913 supports one or more of wireless LAN standards such as IEEE 802.11a, 11b, 11g, 11n, 11ac, and 11ad to execute wireless communication. The wireless communication interface 913 can communicate with another device via a wireless LAN access point in an infrastructure mode. In addition, the wireless communication interface 913 can directly communicate with another device in an ad hoc mode. The wireless communication interface 913 can typically include a baseband processor, a radio frequency (RF) circuit, and a power amplifier. The wireless communication interface 913 may be a one-chip module in which a memory which stores a communication control program, a processor which executes the program and a relevant circuit are integrated. The wireless communication interface 913 may support other kinds of wireless communication schemes such as a near field wireless communication scheme, a proximity wireless communication scheme or a cellular communication scheme in addition to the wireless LAN scheme. The antenna switch 914 switches connection destinations of the antenna 915 between a plurality of circuits (for example, circuits for different wireless communication schemes) included in the wireless communication interface 913. The antenna 915 has a single or a plurality of antenna elements (for example, a plurality of antenna elements which constitute a MIMO antenna), which are used by the wireless communication interface 913 for transmission and reception of radio signals.

Figure 36:
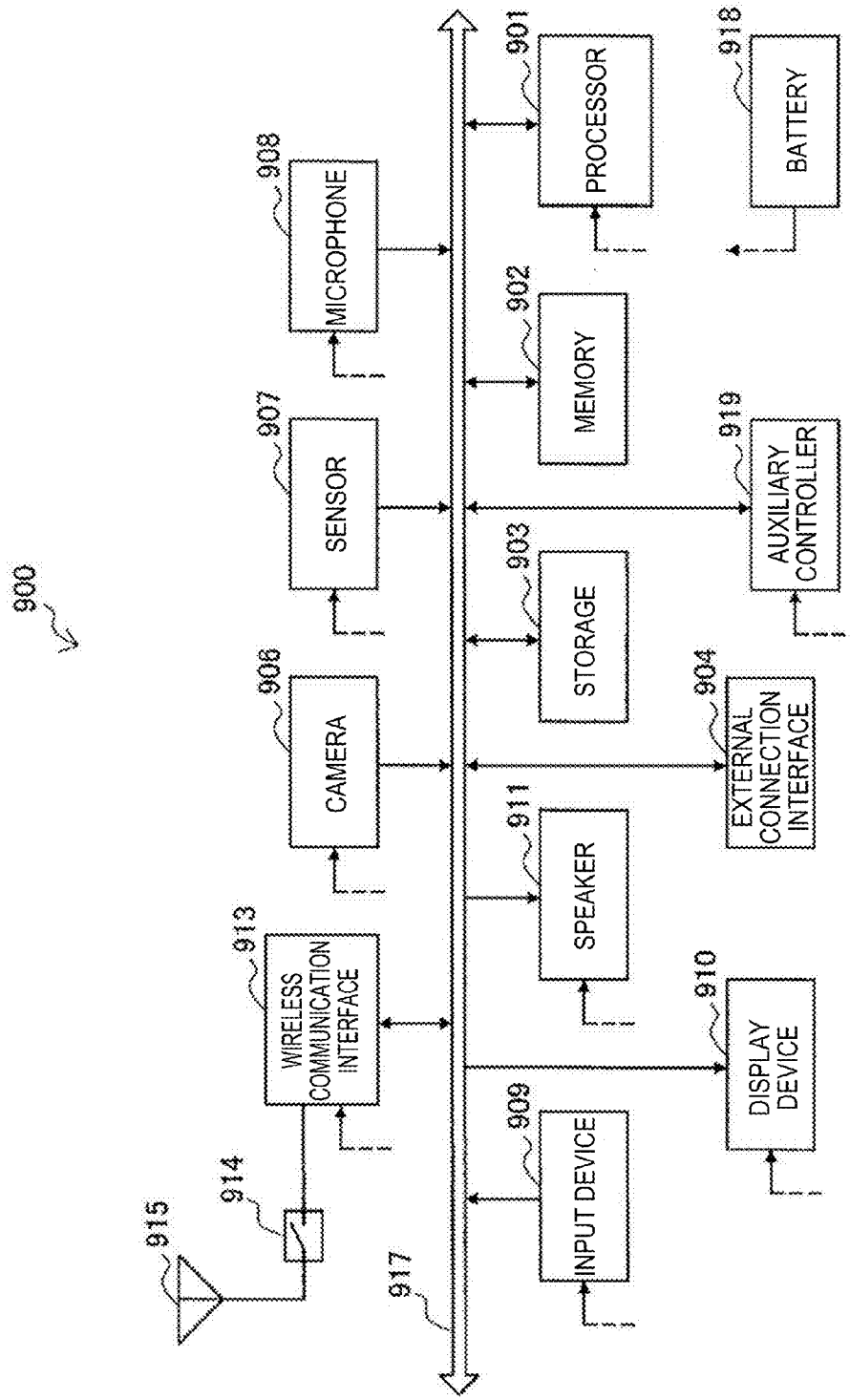
FIG. 36 is a block diagram showing an example of a schematic configuration of a smartphone.

It should be noted that the smartphone 900 is not limited to the example of FIG. 36 and may include a plurality of antennas (for example, an antenna for a wireless LAN, an antenna for the proximity wireless communication scheme, etc.). In that case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to blocks of the smartphone 900 illustrated in FIG. 36 via feeder lines, which are partially shown as dashed lines in the figure. The auxiliary controller 919 operates a minimum necessary function of the smartphone 900, for example, in a sleep mode.

In the smartphone 900 shown in FIG. 36, the communication unit 120, the control unit 140, and the memory 150 described using FIG. 2 may be implemented by the wireless communication interface 913. In addition, at least some of these functions may be implemented by the processor 901 or the auxiliary controller 919.

[3-2. Second Application Example]

FIG. 37 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports one or more of wireless LAN standards such as IEEE 802.11a, 11b, 11g, 11n, 11ac, and 11ad to execute wireless communication. The wireless communication interface 933 can communicate with another device via a wireless LAN access point in an infrastructure mode. In addition, the wireless communication interface 933 can directly communicate with another device in an ad hoc mode. The wireless communication interface 933 can typically include a baseband processor, an RF circuit, and a power amplifier. The wireless communication interface 933 may be a one-chip module in which a memory which stores a communication control program, a processor which executes the program and a relevant circuit are integrated. The wireless communication interface 933 may support other kinds of wireless communication schemes such as a near field wireless communication scheme, a proximity wireless communication scheme or a cellular communication scheme in addition to the wireless LAN scheme. The antenna switch 934 switches connection destinations of the antenna 935 between a plurality of circuits included in the wireless communication interface 933. The antenna 935 has a single or a plurality of antenna elements, which are used by the wireless communication interface 933 for transmission and reception of radio signals.

In addition, the car navigation device 920 may include a plurality of antennas, not limited to the example of FIG. 37. In that case, the antenna switches 934 may be omitted from the configuration of the car navigation device 920.

The battery 938 supplies power to blocks of the car navigation device 920 illustrated in FIG. 38 via feeder lines that are partially shown as dashed lines in the figure. The battery 938 accumulates power supplied form the vehicle.

In the car navigation device 920 illustrated in FIG. 37, the communication unit 120, the control unit 140, and the memory 150 described by using FIG. 2 may be implemented by the wireless communication interface 933. At least a part of the functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disc), a memory card, and a Blu-ray disc (registered trademark) can be used.

Effects described in the present description are just examples, the effects are not limited, and there may be other effects.

Additionally, the present technology may also be configured as below.

(1)

An information processing device including:

a communication unit configured to perform exchange of a signal for generation or updating of a multi-hop communication path using wireless communication with another information processing device; and a control unit configured to perform control to change a metric value included in the signal based on a state of the information processing device.

(2)

The information processing device according to (1), wherein, when the information processing device is moving, the control unit sets the metric value to be large.

(3)

The information processing device according to (1) or (2), wherein, when an amount of traffic of the information processing device is larger than a threshold value, the control unit sets the metric value to be large.

(4)

The information processing device according to any of (1) to (3), wherein, when an error rate of each link is lower than a threshold value, the control unit computes the metric value using the error rate, and when the error rate is higher than the threshold value, the control unit computes the metric value without using the error rate.

(5)

The information processing device according to any of (1) to (4), wherein, when a time elapsed from a final data transmission time to an information processing device which is designated as a next transmission destination on the communication path is longer than a threshold value, or when a difference between an electric field intensity at the time of the final data transmission to the information processing device and a current electric field intensity is larger than a threshold value, the control unit estimates the metric value based on the current electric field intensity.

(6)

The information processing device according to (5), wherein, when data transmission to the information processing device which is designated as the next transmission destination on the communication path is performed, the control unit computes the metric value using a value obtained by averaging a rate of the data using a low-pass filter, and when the metric value is estimated based on the current electric field intensity and a rate of the data at which transmission has succeeded has been acquired, the control unit computes the metric value using the rate of the data as an initial value of the low-pass filter.

(7)

The information processing device according to (6), wherein, when the rate of the data is used as the initial value of the low-pass filter, the control unit uses a metric value estimated based on the current electric field intensity after the setting of the initial value, then uses an average value of the estimated metric value and an output value of the low-pass filter, and then uses the output value of the low-pass filter.

(8)

The information processing device according to any of (1) to (7), wherein, when link broken is set if an error rate of each link is higher than a threshold value, the control unit lowers the error rate each time a predetermined period of time elapses from the link broken.

(9)

The information processing device according to any of (1) to (8), wherein, when there is a communication path set based on a magnitude of the metric value, and there is another communication path having a metric value which is a metric value smaller than the metric value relating to the communication path and whose difference with the metric value relating to the communication path is higher than a metric threshold value, the control unit sets the other communication path as a new communication path.

(10)

The information processing device according to (9), wherein, when there are a plurality of other communication paths, the control unit sets a communication path having a smallest metric value among the plurality of communication paths as the new communication path.

(11)

The information processing device according to (9), wherein, when there is the communication path set based on the magnitude of the metric value, and there is another communication path having a metric value which is a metric value smaller than the metric value relating to the communication path and whose difference with the metric value relating to the communication path is not higher than a metric threshold value, the control unit sets the other communication path as the new communication path on a condition that this state continues for a predetermined period of time or a predetermined number of times.

(12)

The information processing device according to (9), wherein, when the information processing device is moving, the control unit sets the metric threshold value to be small.

(13)

The information processing device according to (11), wherein, when the information processing device is moving, the control unit sets a value relating to the predetermined period of time or the predetermined number of times to be small.

(14)

The information processing device according to (9), wherein, when priority of communication performed using the communication path is high, the control unit sets the metric threshold value to be large, and when the priority is low, the control unit sets the metric threshold value to be small.

(15)

The information processing device according to (11), wherein, when priority of communication performed using the communication path is high, the control unit sets a value relating to the predetermined period of time or the predetermined number of times to be large, and when the priority is low, the control unit sets the value relating to the predetermined period of time or the predetermined number of times to be small.

(16)

The information processing device according to (9), wherein, when the number of information processing devices on the communication path is larger than a hop threshold value, the control unit sets the metric threshold value to be small.

(17)

The information processing device according to (11), wherein, when the number of information processing devices on the communication path is larger than a hop threshold value, the control unit sets a value relating to the predetermined period of time or the predetermined number of times to be small.

(18)

The information processing device according to (9), wherein, when the number of times the communication path is changed is larger than a threshold value of the change, the control unit sets the metric threshold value to be small.

(19)

The information processing device according to (11), wherein, when the number of times the communication path is changed is larger than a threshold value of the change, the control unit sets the value relating to the predetermined period of time or the predetermined number of times to be small.

(20)

An information processing method including:

a communication procedure of performing exchange of a signal for generation or updating of a multi-hop communication path using wireless communication with another information processing device; and a control procedure of performing control to change a metric value included in the signal based on a state of the information processing device.

REFERENCE SIGNS LIST 100, 210, 220, 230, 240 information processing device
110 antenna
120 communication unit
130 I/O interface
140 control unit
150 memory
160 bus
171 movement detection unit
172 operation reception unit
173 display unit
174 audio output unit
200 communication system
900 smartphone
901 processor
902 memory
903 storage
904 external connection interface
906 camera
907 sensor
908 microphone
909 input device
910 display device
911 speaker
913 wireless communication interface
914 antenna switch
915 antenna
917 bus
918 battery
919 auxiliary controller
920 car navigation device
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle module

The invention claimed is:

1. An information processing device comprising:

a transceiver configured to perform exchange of a signal for generation or updating of a multi-hop communication path using wireless communication with another information processing device; and processing circuitry configured to perform control to change a metric value included in the signal based on a state of the infoiniation processing device, wherein, when an error rate of each link is lower than a threshold value, the processing circuitry computes the metric value using the error rate, and when the error rate is higher than the threshold value, the processing circuitry computes the metric value without using the error rate.

2. The information processing device according to claim 1, wherein, when the information processing device is moving, the processing circuitry sets the metric value to be greater than an actual metric value.

3. The information processing device according to claim 1, wherein, when an amount of traffic of the information processing device is larger than a threshold value, the processing circuitry sets the metric value to be greater than an actual metric value.

4. The information processing device according to claim 1, wherein, when a time elapsed from a final data transmission time to an information processing device which is designated as a next transmission destination on the communication path is longer than a threshold value, or when a difference between an electric field intensity at the time of the final data transmission to the information processing device and a current electric field intensity is larger than a threshold value, the processing circuitry estimates the metric value based on the current electric field intensity.

5. The information processing device according to claim 4, wherein, when data transmission to the information processing device which is designated as the next transmission destination on the communication path is performed, the processing circuitry computes the metric value using a value obtained by averaging a rate of the data using a low-pass filter, and when the metric value is estimated based on the current electric field intensity and a rate of the data at which transmission has succeeded has been acquired, the processing circuitry computes the metric value using the rate of the data as an initial value of the low-pass filter.

6. The information processing device according to claim 5, wherein, when the rate of the data is used as the initial value of the low-pass filter, the processing circuitry uses a metric value estimated based on the current electric field intensity after the setting of the initial value, then uses an average value of the estimated metric value and an output value of the low-pass filter, and then uses the output value of the low-pass filter.

7. The information processing device according to claim 1, wherein, when link broken is set if an error rate of each link is higher than a threshold value, the processing circuitry lowers the error rate each time a predetermined period of time elapses from the link broken.

8. The information processing device according to claim 1, wherein, when there is a communication path set based on a magnitude of the metric value, and there is another communication path having a metric value which is a metric value smaller than the metric value relating to the communication path and whose difference with the metric value relating to the communication path is higher than a metric threshold value, the processing circuitry sets the other communication path as a new communication path.

9. The information processing device according to claim 8, wherein, when there are a plurality of other communication paths, the processing circuitry sets a communication path having a smallest metric value among the plurality of communication paths as the new communication path.

10. The information processing device according to claim 8, wherein, when there is the communication path set based on the magnitude of the metric value, and there is another communication path having a metric value which is a metric value smaller than the metric value relating to the communication path and whose difference with the metric value relating to the communication path is not higher than a metric threshold value, the processing circuitry sets the other communication path as the new communication path on a condition that his state continues for a predetermined period of time or a predetermined number of times.

11. The information processing device according to claim 8, wherein, when the information processing device is moving, the processing circuitry sets the metric threshold value to be less than an actual metric value.

12. The information processing device according to claim 10, wherein, when the information processing device is moving, the processing circuitry sets a value relating to the predetermined period of time or the predetermined number of times to be less than the actual value relating to the predetermined period of time or the predetermined number of times.

13. The information processing device according to claim 8, wherein, when priority of communication performed using the communication path is high, the processing circuitry sets the metric threshold value to be greater than an actual metric value, and when the priority is low, the processing circuitry sets the metric threshold value to be less than the actual metric value.

14. The information processing device according to claim 10, wherein, when priority of communication performed using the communication path is high, the processing circuitry sets a value relating to the predetermined period of time or the predetermined number of times to be greater than the actual value relating to the predetermined period of time or the predetermined number of times, and when the priority is low, the processing circuitry sets the value relating to the predetermined period of time or the predetermined number of times to be less than the actual value relating to the predetermined period of time or the predetermined number of times.

15. The information processing device according to claim 8, wherein, when the number of information processing devices on the communication path is larger than a hop threshold value, the processing circuitry sets the metric threshold value to be less than an actual metric value.

16. The information processing device according to claim 10, wherein, when the number of information processing devices on the communication path is larger than a hop threshold value, the processing circuitry sets a value relating to the predetermined period of time or the predetermined number of times to be less than the actual value relating to the predetermined period of time or the predetermined number of times.

17. The information processing device according to claim 8, wherein, when the number of times the communication path is changed is larger than a threshold value of the change, the processing circuitry sets the metric threshold value to be less than an actual metric value.

18. The information processing device according to claim 10, wherein, when the number of times the communication path is changed is larger than a threshold value of the change, the processing circuitry sets the value relating to the predetermined period of time or the predetermined number of times to be less than the actual value relating to the predetermined period of time or the predetermined number of times.

19. An information processing method comprising:
exchanging, by a transceiver, a signal for generation or updating of a multi-hop communication path using wireless communication with another information processing device; and
changing, by a processing circuitry, a metric value included in the signal based on a state of the information processing device, wherein, when an error rate of each link is lower than a threshold value, the processing circuitry computes the metric value using the error rate, and when the error rate is higher than the threshold value, the processing circuitry computes the metric value without using the error rate.

* * * * *